(12) United States Patent
Velev et al.

(10) Patent No.: US 10,477,445 B2
(45) Date of Patent: *Nov. 12, 2019

(54) SHORT MESSAGE TRANSMISSION AND HANDOVER PROCEDURES

(71) Applicant: SUN PATENT TRUST, New York, NY (US)

(72) Inventors: Genadi Velev, Darmstadt (DE); Jens Bachmann, Oberursel (DE); Shinkichi Ikeda, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,010

(22) Filed: Dec. 27, 2017

(65) Prior Publication Data

US 2018/0139671 A1    May 17, 2018

Related U.S. Application Data

(63) Continuation of application No. 14/995,978, filed on Jan. 14, 2016, now Pat. No. 9,894,579, which is a
(Continued)

(30) Foreign Application Priority Data

Apr. 5, 2011   (EP) ..................................... 11002842
Jun. 27, 2011  (EP) ..................................... 11171561

(51) Int. Cl.
*H04W 88/02*       (2009.01)
*H04W 36/16*       (2009.01)
(Continued)

(52) U.S. Cl.
CPC .......... *H04W 36/165* (2013.01); *H04W 4/14* (2013.01); *H04W 4/50* (2018.02); *H04W 4/70* (2018.02);
(Continued)

(58) Field of Classification Search
CPC ......... H04W 4/005; H04W 4/14; H04W 8/18; H04W 36/14; H04W 36/16;
(Continued)

(56) References Cited

U.S. PATENT DOCUMENTS 8,032,164 B2    10/2011  Aghili et al.
8,565,100 B2 *  10/2013  Jokimies ................. H04W 4/38
                                                   370/242
(Continued)

FOREIGN PATENT DOCUMENTS

EP      1376950 A1    1/2004
JP      2008-98951 A  4/2008
(Continued)

OTHER PUBLICATIONS

3rd Generation Partnership Project; Technical Specification Group Radio Access Network; Radio Resource Control (RRC); Protocol Specification (Release 9), 3GPP Standard; 3GPP TS 25.331, 3GPP, Mobile competence Centre; 650, Route Des Lucioles; F-06921 Sophia-Antipolis Cedex; France, No. V9.0.0, Sep. 1, 2009, pp. 1-1710, XP050368029.
(Continued)

*Primary Examiner* — Frank Duong
(74) *Attorney, Agent, or Firm* — Seed IP Law Group LLP

(57) ABSTRACT

The present invention relates to an improved method for handover of a mobile node from E-UTRAN to UTRAN in a scenario where SMS is the only service of the mobile node. The improved handover method allows saving radio resources by establishing the signalling connection for SMS exchange in the target network, and avoiding the data connection in the target network, since it is not used. The MME takes the decision to establish or not the data connection in the target UTRAN, and accordingly instructs the SGSN and UE to set the corresponding PDP contexts for the
(Continued)

data connection to a "preserved" state, so as to avoid the establishment of same. Embodiments further relate to improved SMS delivery for IDLE mode UEs that activate ISR so as to avoid the involvement of the MSC server. Instead, packet-switched domain nodes are to be involved only.

14 Claims, 31 Drawing Sheets

Related U.S. Application Data continuation of application No. 13/978,301, filed as application No. PCT/EP2012/001524 on Apr. 5, 2012, now Pat. No. 9,247,471.

(51) Int. Cl.
| | |
|---|---|
| H04W 4/70 | (2018.01) |
| H04W 76/10 | (2018.01) |
| H04W 76/38 | (2018.01) |
| H04W 76/27 | (2018.01) |
| H04W 4/14 | (2009.01) |
| H04W 36/14 | (2009.01) |
| H04W 68/00 | (2009.01) |
| H04W 72/04 | (2009.01) |
| H04W 76/36 | (2018.01) |
| H04W 4/50 | (2018.01) |
| H04W 76/30 | (2018.01) |
| H04W 36/00 | (2009.01) |
| H04W 76/12 | (2018.01) |

(52) U.S. Cl.
CPC ......... *H04W 36/14* (2013.01); *H04W 68/005* (2013.01); *H04W 72/042* (2013.01); *H04W 76/10* (2018.02); *H04W 76/27* (2018.02); *H04W 76/36* (2018.02); *H04W 76/38* (2018.02); *H04W 36/0055* (2013.01); *H04W 68/00* (2013.01); *H04W 76/12* (2018.02); *H04W 76/30* (2018.02)

(58) Field of Classification Search
CPC . H04W 36/165; H04W 68/005; H04W 76/02; H04W 76/04; H04W 76/042; H04W 76/06; H04W 76/068
See application file for complete search history.

(56) References Cited

U.S. PATENT DOCUMENTS

| | | | |
|---|---|---|---|
| 8,755,825 | B2 | 6/2014 | Pinheiro et al. |
| 9,020,540 | B2 | 4/2015 | Karampatsis et al. |
| 9,401,820 | B2 | 7/2016 | Kim |
| 2003/0152030 | A1 | 8/2003 | Hershey |
| 2010/0099443 | A1 | 4/2010 | King et al. |
| 2011/0292893 | A1 | 12/2011 | Lee et al. |
| 2012/0207094 | A1 | 8/2012 | Liao |
| 2012/0252518 | A1 | 10/2012 | Karampatsis et al. |
| 2013/0051338 | A1 | 2/2013 | Ryu et al. |
| 2016/0255544 | A1* | 9/2016 | Watfa ................ H04W 36/0022 370/331 |

FOREIGN PATENT DOCUMENTS

| | | |
|---|---|---|
| JP | 2010-536283 A | 11/2010 |
| JP | 2011-049795 A | 3/2011 |
| JP | 5956557 B2 | 6/2016 |
| WO | 99/18742 A1 | 4/1999 |
| WO | 2005/022781 A1 | 3/2005 |
| WO | 2009/121023 A1 | 10/2009 |
| WO | 2011/099774 A2 | 8/2011 |

OTHER PUBLICATIONS

3rd Generation Partnership Project; Technical Specification Group Core Network and Terminals; Point-to-Point (PP) Short Message Service (SMS) support on mobile radio interface (Release 9), 3GPP Standard; 3GPP TS 24.011, 3GPP, Mobile Competence Centre; 650, Route Des Lucioles; F-06921 Sophia-Antipolis Cedex; France, No. V9.0.0, Dec. 14, 2009, pp. 1-108, XP050400797.

3rd Generation Partnership Project; Technical Specification Group Radio Access Network; Evolved Universal Terrestrial Radio Access Network (E-UTRAN); S1 Application Protocol (S1AP) (Release 10), 3GPP Standard; 3GPP TS 36.413, 3GPP, Mobile Competence Centre; 650, Route Des Lucioles; F-06921 Sophia-Antipolis Cedex; France, No. V10.0.1, Jan. 5, 2011, pp. 1-250, XP050462529.

Kaaranen H et al: UMTS Networks, Architecture, Mobility and Services Passage, UMTS Networks. Architecture, Mobility and Services, Wiley , US, Jan. 1, 2001, pp. 213-214-265-270, XP000002658895.

3rd Generation Partnership Project; Technical Specification Group Core Network and Terminals; Technical realization of the Short Message Service (SMS) (Release 9), 3GPP Standard; 3GPP TS 23.040, 3GPP, Mobile Competence Centre; 650, Route Des Lucioles; F-06921 Sophia-Antipolis Cedex; France, No. V9.0.0, Jun. 1, 2009, pp. 1-202, XP050362164.

3rd Generation Partnership Project; Technical Specification Group Core Network and Terminals; Non-Access-Stratum (NAS) protocol for Evolved Packet System (EPS); Stage 3 (Release 10), 3GPP Standard; 3GPP TS 24.301, 3GPP, Mobile Competence Centre; 650, Route Des Lucioles; F-06921 Sophia-Antipolis Cedex; France, No. V10.2.0, Mar. 1, 2011, pp. 1-315, XP050476784.

NTT Communicationware: Using MM sublayer for PS-SMS message transfer, 3GPP Draft, IW-99053, 3GPP, Mobile Competence Centre; 650, Route Des Lucioles; F-06921 Sophia-Antipolis Cedex; France, vol. CN WG1, No. Oulu; Nov. 22, 1999, Nov. 24, 1999, XP050060627, p. 8 lines 34-35.

Ericcson et al: Correction to Fast Dormancy, 3GPP Draft; R2-101726, 3GPP, Mobile Competence Centre; 650, Route Des Lucioles; F-06921 Sophia-Antipolis Cedex; France, vol. RAN WG2, No. San Francisco, USA; Feb. 22, 2010, Feb. 27, 2010, XP050422143, p. 5, paragraph 8.1.14.4.

NOKIA: Delayed Transition from DCH/DCH to RACH/FACH substate, 3GPP Draft; R2-99889, 3GPP, Mobile Competence Centre; 650, Route Des Lucioles; F-06921 Sophia-Antipolis Cedex; France, vol. RAN WG2, No. Sophia Antipolis; Aug. 17, 1999, Aug. 17, 1999, XP050113190, p. 1, paragraph 2.

3rd Generation Partnership Project; Technical Specification Group Services and Systems Aspects; General Packet Radio Service (GPRS) enhancements for Evolved Universal Terrestrial Radio Access Network (E-UTRAN) access (Release 10), 3GPP Standard; 3GPP TS 23.401, 3GPP, Mobile Competence Centre; 650, Route Des Lucioles; F-06921 Sophia-Antipolis Cedex; France, No. V10.3.0, Mar. 18, 2011, pp. 1-278, XP050476358, cited in application p. 120, lines 4-21 figures 5.3.5-1.

Panasonic: Optimized SMS Transmission over NAS Connection, 3GPP Draft; S2-113304_SIMTC_SMS_Transport_V0-3, 3rd Generation Partnership Project (3GPP), Mobile Competence Centre; 650, Route Des Lucioles; F-06921 Sophia-Antipolis Cedex; France, vol. SA WG2, No. Naantali; Jul. 11, 2011, Jul. 5, 2011, XP050548590.

Extended European Search Report for Application No. 11171561. 1-1249 dated May 23, 2012.

Extended European Search Report for Application No. 11002842. 0-1249 dated Oct. 12, 2011.

International Search Report for PCT International Application No. PCT/EP2012/000789 dated May 10, 2012.

3rd Generation Partnership Project; Technical Specification Group Services and System Aspects; General Packet Radio Service (GPRS) enhancements for Evolved Universal Terrestrial Radio Access Network (E-UTRAN) access (Release 11), 3GPP Standard; 3GPP TS 23.401, No. V11.1.0, Mar. 2012, XP002675861.

3rd Generation Partnership Project; Technical Specification Group Core Network and Terminals; Technical realization of the Short

(56) References Cited

OTHER PUBLICATIONS

Message Service (SMS) (Release 10), 3GPP Standard; 3GPP TS 23.040, No. V10.0.0, Mar. 2011, XP050476761.
Panasonic: Optimized SMS Transmission over NAS Signaling, 3GPP Draft; S2-112501, vol. SA WG2, Meeting # 85, Xi'An; May 16-20, 2011, XP050525490.
Notice of Reasons for Rejection for Application No. JP 2014-503031 dated Oct. 6, 2015.
Notice of Reason for Rejection issued in Japanese Patent Application No. 2016-119552 dated Jun. 20, 2017.
3GPP TSG-RAN WG2 #70, R2-102892, "Fast MTC data transmission procedure", May 10-14, 2010.
3GPP TSG SA WG2 Meeting #78, TD S2-101204, "Online Small Data Transmission" Feb. 22-26, 2010.
3GPP TSG RAN WG2 #73bis R2-111919, "Analysis on high priority MTC requirements" Apr. 11-15, 2011.

\* cited by examiner

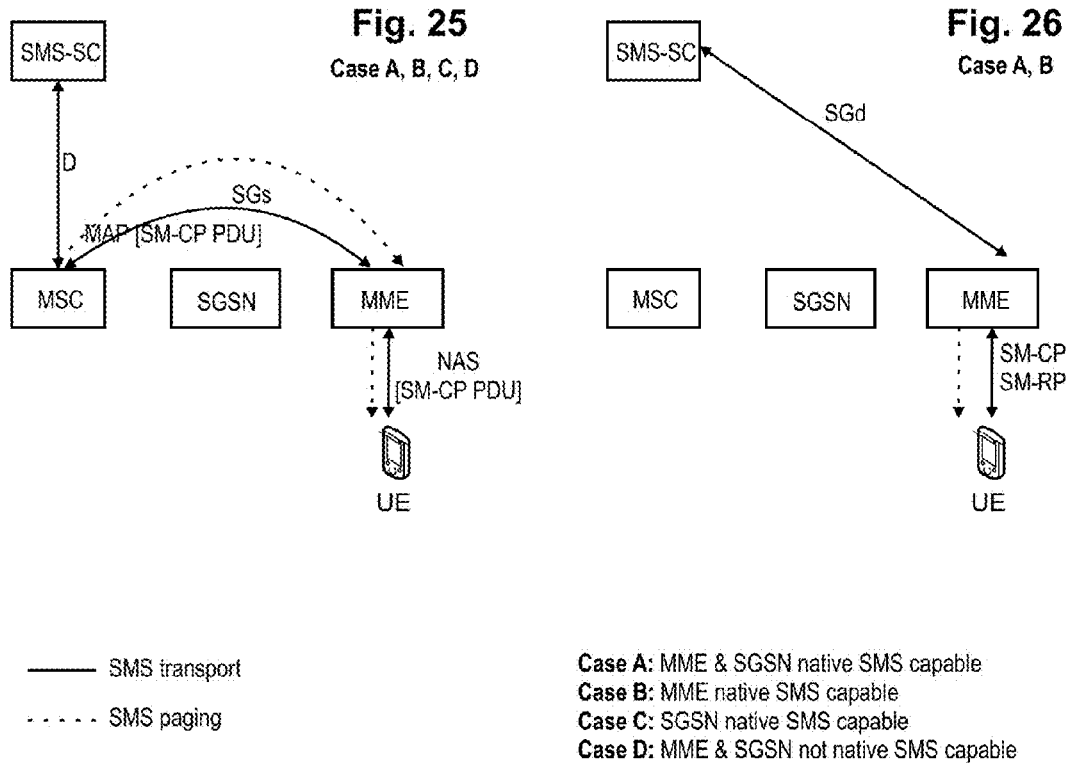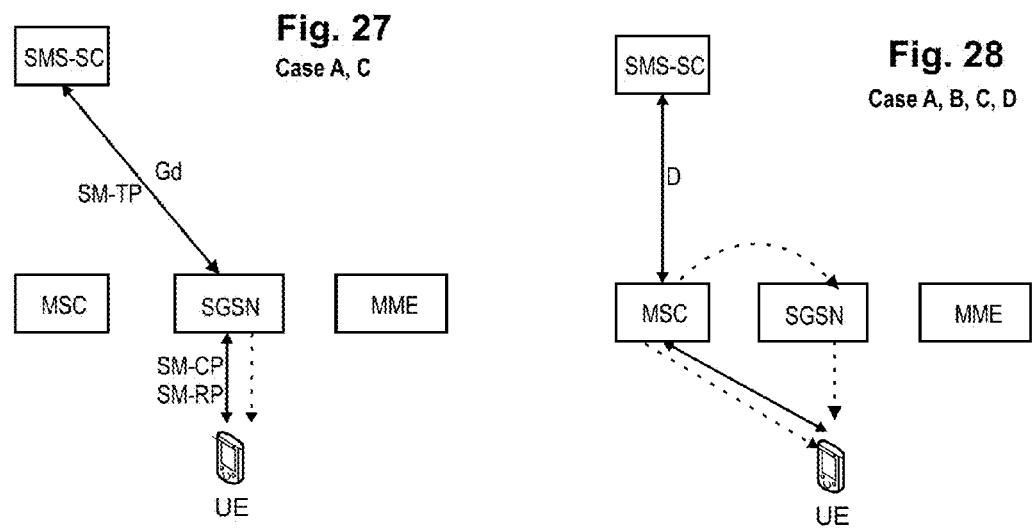

SHORT MESSAGE TRANSMISSION AND HANDOVER PROCEDURES

RELATED APPLICATIONS

This application is a continuation of U.S. patent application Ser. No. 14/995,978 filed Jan. 14, 2016, which is a continuation of U.S. patent application Ser. No. 13/978,301 filed Sep. 19, 2013, which is incorporated herein by reference in its entirety.

FIELD OF THE INVENTION

One aspect of the invention relates to a method for performing a handover of a mobile node. It further relates to a mobile node, and other entities participating in the method of the invention.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In a longer time perspective it is however necessary to be prepared for further increasing user demands and be competitive against new radio access technologies. To meet this challenge, 3GPP has initiated the study item Evolved UTRA and UTRAN, aiming at studying means for achieve additional substantial leaps in terms of service provisioning and cost reduction. As a basis for this word, 3GPP has concluded on a set of targets and requirements for a new mobile communication system which is called Long Term Evolution (LTE). LTE is designed to meet the subscriber and network operator needs for high speed data and media transport as well as high capacity voice support to the next decade.

LTE Architecture

The overall architecture is shown in FIG. 1 and a more detailed representation of the E-UTRAN architecture is given in FIG. 2.

The E-UTRAN consists of eNodeBs, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interfaces to the EPC (Evolved Packet Core), more specifically to the MME (Mobility Management Entity) by means of the S1-MME and to the Serving Gateway (SGW) by means of the S1-U. The S1 interfaces support a many-to-many relation between MMEs/Serving Gateways and eNodeBs.

The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signalling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signalling and handles the security key management. Lawful interception of signalling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

The control signalling between a mobile node (MN or also referred to as User Equipment UE) and the Radio Access is done by Radio Resource Control (RRC) messages. The RRC protocol is located in Layer 3 and provides functions for UE specific signalling, paging of idle mode UEs and system information broadcast. The RRC layer also supports retransmission functions to assure the correct transmission of control information of higher layers (e.g. NAS).

FIG. 3 shows a control-plane protocol stack between the UE and the MME for an exemplary LTE system. Layer 2 may be split in Medium Access Control (MAC), Radio Link Control (RLC) and Packet Data Convergence Protocol (PDCP), wherein the RLC and PDCP sublayers are terminated in the eNodeB at network side. The NAS layer is terminated in the UE and MME. The service the RLC layer provides in the control plane between UE and eNodeB is called Signaling Radio Bearer (SRB). In the user plane, the service provided by RLC layer between the UE and the eNodeB is called a Radio Bearer (RB) or Data Radio Bearer (DRB).

Amongst others, higher layer, i.e. Non Access Stratum (NAS), messages are carried by the RRC messages (e.g. using RRC Direct Information Transfer message) between the user equipment and the eNodeB. The Non Access Stratum is a functional layer running between the UE and the Core Network (CN) and located above the RRC. Furthermore, the NAS is the functional grouping of protocols aimed at Call Control (CC) for circuit switched voice and data, at Session Management (SM) for packet switched data and Mobility Management (MM) and at Short Message Services (SMS) for packet switched and circuit switched domains. The control messages the NAS layer generates are called NAS messages. Such messages are for example used to control Mobility Management, Session Management, SMS Transport and Call Management. NAS messages are transported transparently through the Access Stratum layers (layers 3-2-1, RRC, PDCP, RLC, MAC, PHY) that include the function and protocols to support the NAS transport.

The Access Stratum is the functional grouping of protocols specific to the access technique, in this case, the RRC, PDCP, RLC, MAC and PHY. It includes protocols for supporting transfer of radio-related information, for coordinating the use of radio resources between UE and access network, and for supporting access from the serving network to the resources provided by the access network. The Access Stratum offers services through Service Access Points (SAP) to the Non-Access Stratum (CN-related signaling and services), i.e. provides the Access Link between UE and core network, which consists of one or more independent and simultaneous UE-core network radio access bearer services, and only one signaling connection between the upper layer entities of UE and the core network.

After a non-access stratum signalling connection is established between the user equipment and the MME, e.g. due to service request procedure when data has to be transmitted, the user equipment and the MME enter the CONNECTED state. Initial uplink non-access stratum messages that initiate a transition from IDLE to CONNECTED state are Attach Request, Tracking Area Update Request, Service Request (or Extended Service Request) or Detach Request. In order to send the initial non-access stratum message, the user equipment first establishes a Radio Resource Control (RRC) connection to the eNodeB over the air interface (Uu interface). During the RRC connection establishment the user equipment and eNodeB get synchronized and establish the Signalling Radio Bearers (SRB) that can be used for the transport of the non-access stratum messages. This will be explained in more detail later with reference to FIG. 5.

FIG. 4 discloses the E-UTRAN user-plane protocol stack between UE, eNodeB, Serving-Gateway and PDN-Gateway. The protocol stack consists of the PDCP (Packet Data Convergence Protocol), RLC (Radio Link Control), and MAC (Medium Access Control) sublayers which are terminated in the eNodeB on the network side. An IP packet for a UE is encapsulated in an EPC-specific protocol and tunnelled between the PDN-GW and the eNodeB for transmission to the UE.

EPS Mobility and Connection Management States

When a mobile terminal (or user equipment, UE) is attached to the network, the UE is in the so called REGISTERED state, i.e. EPS Mobility Management (EMM) context has been established and a default EPS bearer context has been activated in the network and in the UE. When the UE is REGISTERED to mobile network, the UE can be in two different connections management states: IDLE and CONNECTED state. When the UE is switched-off or not attached to the mobile network, the UE is in DEREGISTERED state. In DEREGISTERED state, no EMM context exists and the UE location is unknown to an MME and hence it is unreachable by an MME.

The UE is in IDLE state when there is no data for transmission and the radio resources are released, but the UE still has a valid IP configuration. A UE in IDLE state doesn't have a radio association (i.e. Radio Resource Connection, RRC) with the eNB, and therefore, there are no established signalling and data radio bearers. Further, there is no Non-Access Stratum (NAS) signalling connection between the UE and the network (e.g. to the MME) and also, there is no S1-U connection between the eNB and the SGW.

When the UE is in CONNECTED state and the network (usually the eNB) detects that the UE is not sending/receiving data for a certain period of time, the network (usually the eNB) decides to release the radio resources and the S1 connection. As a result, the UE transits from CONNECTED to IDLE state. Also the MME changes its internal state for the UE to IDLE and informs the SGW to release the S1-U connection to the eNB.

When uplink or downlink data or signalling (NAS signalling, e.g. due to the TAU procedure with active flag) needs to be exchanged between the UE and the network, the UE and the MME shall enter the CONNECTED state. It is possible in case of TAU procedure without active flag that the UE sends and receives respectively a single NAS message without entering the CONNECTED state. In order to transfer to CONNECTED state, the UE firstly needs to establish a Radio Resource Control (RRC) connection to the eNB over the Uu interface. During the RRC connection establishment the UE and eNB get synchronized and establish the Signalling Radio Bearers (SRB) and Data Radio Bearers (DRBs) that can be used for the transport of the NAS messages and uplink and downlink data.

The above described IDLE and CONNECTED states are related to the NAS layer state diagram. On the other hand, in the AS layer the IDLE and CONNECTED states are also defined. The AS IDLE and CONNECTED states are similar but not completely analogical to NAS IDLE and CONNECTED states, i.e. if the RRC connection is established, the AS state is CONNECTED, otherwise if the RRC connection is released, the AS state is IDLE. Not always when the AS state is CONNECTED, the NAS state is also CONNECTED (e.g. for TAU procedure without active flag). The establishment of the RRC connection, and thus, the transition to AS CONNECTED state, is initiated by the UE, as only the UE can send "RRCConnectionRequest" message. The UE initiates the RRC connections establishment either due to the availability of uplink data or uplink signalling; or due to paging from the network in order to receive downlink data or downlink signalling. Below there are more details about the 2 cases:

If the UE has uplink data or uplink ESM NAS signalling to send, the UE initiates the NAS Service Request procedure (described in the technical Standard TS 23.401 incorporated herein by reference). The UE generates a Service request message and triggers the AS to establish a corresponding RRC connection. The RRC establishment cause sent to the eNB in the "RRCConnectionRequest" message is set to "mo-Data" (mobile originated-data, meaning the UE would like to send uplink data) or "mo-Signalling" (mobile originated-signalling, meaning the UE would like to send uplink signalling).

If the network has downlink data or downlink NAS signalling to the UE, the network initiates the Paging procedure as described in Technical Specification TS 36.413 and TS 36.331, incorporate herein by reference. When the UE receives the paging, the UE initiates the NAS Service Request procedure by generating a Service request message to the MME. The Service request message triggers the AS layer to establish an RRC connection with the eNB. The RRC establishment cause is set to "mt-Access" which means Mobile Terminated access, i.e. mobile terminated communication is to be set up.

The NAS Mobility Management (MM) and Session Management (SM) signalling in LTE/SAE are usually called EMM (EPS MM) and ESM (EPS SM) signalling. In contrary, in the UTRAN/UMTS the NAS signalling between the UE and SGSN is called GPRS Mobility Management (GMM) and GPRS Session Management (GSM) signalling. The terminology of EMM/ESM vs. GMM/GSM is introduced because for some aspects of this invention it is important to notice the difference between the SAE/LTE and UTRAN/UMTS systems. Depending on the 'PS' (packet switched domain) or 'CS' (packet switched domain) indication in the paging message, the UE can send either Service request message or Extended Service Request message for establishing the NAS connection. In the following the format and content of an Extended Service Request message, according to Chapter 8.2.15 of the Technical Specification TS 24.301 is shown.

| IEI | Information Element | Type/Reference | Presence | Format | Length |
| --- | --- | --- | --- | --- | --- |
| | Protocol discriminator | Protocol discriminator 9.2 | M | V | ½ |
| | Security header type | Security header type 9.3.1 | M | V | ½ |
| | Extended service request message identity | Message type 9.8 | M | V | 1 |
| | Service type | Service type 9.9.3.27 | M | V | ½ |
| | NAS key set identifier | NAS key set identifier 9.9.3.21 | M | V | ½ |
| | M-TMSI | Mobile identity 9.9.2.3 | M | LV | 6 |
| B- | CSFB response | CSFB response 9.9.3.5 | C | TV | 1 |
| 57 | EPS bearer context status | EPS bearer context status 9.9.2.1 | O | TLV | 4 |

RRC

The RRC protocol supports the transfer of NAS information. In addition, for UEs in RRC_IDLE, RRC supports notification from the network of incoming calls. RRC connection control covers all procedures related to the establishment, modification and release of an RRC connection, including paging, initial security activation, establishment of Signalling Radio Bearer and of radio bearers carrying user data (Data Radio Bearers).

Dedicated RRC messages are transferred across Signalling Radio Bearers, which are mapped via the PDCP and RLC layers onto logical channels-either the Common Control Channel (CCCH) during connection establishment or a Dedicated Control Channel (DCCH) in RRC_CONNECTED. System information and paging messages are mapped directly to logical channels, the Broadcast Control Channel (BCCH) and Paging Control Channel (PCCH) respectively.

The main difference between SRB1 and SRB2 is the priority handling in the eNB, i.e. RRC messages sent over SRB2 have lower priority than the RRC messages sent over SRB1. Usually, the NAS Transport messages are carried over the SRB2 (as Uplink/Downlink Information Transfer messages); however, initial NAS messages, e.g. Service Request, can be piggybacked to the RRC messages carried over SRB1. Please note that the RRC messages over SRB1 contain control information for the RRC layer, whereas the RRC messages over SRB2 are like transport messages for NAS messages.

SRB0 is used for RRC messages which use the CCCH; SRB1 is for RRC messages using the DCCH; SRB2 is for the (lower-priority) RRC messages using the DCCH which only include NAS dedicated information. Prior to SRB2 establishment, SRB1 is also used for RRC messages which only include NAS dedicated information. In addition, SRB1 is used for higher-priority RRC messages which only include NAS dedicated information.

All RRC messages using DCCH are integrity-protected and ciphered by the PDCP layer (after security activation). The RRC messages using CCCH are not integrity-protected.

FIG. 5 is a signalling diagram illustrating the RRC connection establishment procedure of the Signalling Radio Bearers SRB0, 1 and 2, also including the initial security activation. RRC connection establishment involves the establishment of the SRB1 and the transfer of the initial uplink NAS message. This NAS message triggers the establishment of the S1 connection, which normally initiates a subsequent step during which e-UTRAN activates AS-security and establishes SRB2 and one or more DRBs (corresponding to the default and optionally dedicated EPS bearers).

In particular, upper layers (e.g. NAS) in the UE trigger connection establishment (e.g. in response to paging). The UE checks if access is barred. If this is not the case, the lower layers in the UE perform a random access procedure and the UE starts a timer (known as T300) and sends the RRCConnectionRequest message. This message includes an initial identity (S-TMSI or a random number) and establishment cause.

If E-UTRAN accepts the connection, it returns the RRCConnectionSetup message that includes the initial radio resource configuration including SRB1. Instead of signalling each individual parameter, E-UTRAN may order the UE to apply a default configuration, i.e. a configuration for which the parameter values are specified in the RRC specification.

The UE returns the RRCConnectionSetupComplete message and includes the NAS message, an identifier of the selected PLMN (used to support network sharing) and, if provided by upper layers, an identifier of the registered MME. Based on the last two parameters, the eNodeB decides on the core network node to which it should establish the S1-connection. A NAS Service Request or Extended Service Request message is included in the RRCConnectionSetupComplete message.

The purpose of the Initial Context Setup procedure between the eNodeB and the MME is to establish the necessary overall initial UE Context including E-RAB context, the Security Key, Handover Restriction List, UE Radio capability and UE Security Capabilities etc. The procedure uses UE-associated signalling.

E-UTRAN sends the SecurityModeCommand message to activate integrity protection and ciphering. This message, which is integrity-protected but not ciphered, indicates which algorithms shall be used.

The UE verifies the integrity protection of the SecurityModeCommand message, and, if this succeeds, it configures lower layers to apply integrity protection and ciphering to all subsequent messages (with exception that ciphering is not applied to the response message, i.e. the SecurityModeComplete (or SecurityModeFailure) message).

E-UTRAN sends the RRCConnectionReconfiguration message including a radio resource configuration used to establish SRB2 and one or more DRBs. This message may also include information such as a piggybacked NAS message or measurement configuration. E-UTRAN may send the RRCConnectionReconfiguration message prior to receiving the SecurityModeComplete message. In this case, E-UTRAN should release the connection when one (or both) procedures fail.

The UE finally returns the RRCConnectionReconfigurationComplete message.

FIG. 5 also discloses the transmission of a NAS Service Request or NAS Extended Service Request message transmitted to the MME, using the RRCConnectionSetupComplete message and an S1-AP message. The user equipment starts the timer T3417 or T3417ext as described in Technical Specification TS 24.301, section 5.6.1. The user equipment stops these timers T3417 or T3417ext when an indication from the Access Stratum is received accordingly. For instance, the user equipment shall receive the bearer establishment for user plane indication from the Access Stratum in order to stop timer T3417. To stop the timer T3417ext, the user equipment shall receive the system change indication from the Access Stratum.

Paging

To receive paging messages from E-UTRAN, UEs in idle mode monitor the PDCCH channel for an RNTI (radio network temporary identity) value used to indicate the paging: the P-RNTI. The UE needs to monitor the PDCCH channel only at certain UE-specific occasions. At other times, the UE may apply DRX (Discontinued Reception), meaning that it can switch off its receiver to preserve batter power.

In order to re-establish a connection towards a UE in idle mode, the MME distributes a paging request to the relevant eNodeBs, based on the tracking areas where the UE is expected to be located. When receiving the Paging Request message, the eNodeB sends a page over the radio interface in the cells which are contained within one of the tracking areas provided in that message. The UE is normally paged using its SAW-Temporary Mobile Subscriber Identity (S-TMSI).

The Paging Request message sent from the MME to the eNodeB is defined in the Technical Specification TS 36.413 Chapter 9.1.6 (incorporated herein by reference), as follows.

Short Message Service (SMS)

The Short Message Service (SMS) was intended in the beginning of the GSM standardization as a mechanism to send Short Messages from the network operator to the UE for configuration of the user equipment and information services (e.g. to inform about new prices or new tariff plans). Later, the Short Message service was specified to carry messages between the users (mobile-to-mobile text messages), as the service is of the type store-and-forward. The maximum SMS size is specified to 140 bytes, or 160 seven-bit characters, in order to fit into existing signalling formats at that time. Larger content can be sent in concatenated SMSs, where each SMS will start with a user data header (UDH) containing segmentation information. Since UDH is part of the payload, the number of available characters per segment is lower: 153 for 7-bit encoding (instead of 160 characters).

FIG. 12A shows the architecture for SMS transport in a mobile network. For simplicity the SM-SC, SMS-GMSC and SMS-IWMSC can be implemented in the same box and may be referred to as SM-SC. The SM service is regarded as circuit-switched service, and thus, the SMS is delivered from the SM-SC to the Mobile Switching Center (MSC) of the circuit-switched domain.

Two types of SMS are specified: mobile-originated (MO, sent in the uplink from the user to the network) and mobile-terminated (MT, sent in the downlink from the network to the user).

The protocol layered model of the SMS communication can be seen in FIG. 13, and will be explained in the following. The abbreviation "SM" used in this figure means "Short Message".

It should be noted that FIG. 13 mainly discloses the protocol stacks for native SMS support in MME/SGSN. In other words, the protocol layer model for SMS communication using "SMS over SGs" is not depicted and different from the one of FIG. 13.

In FIG. 13 the shown SM-SC node may implement the functional entities SMS gateway MSC (SMS-GMSC) and SMS Interworking MSC (SMS-IWMSC) as it was already depicted in FIGS. 12A and 12B. The SMS-GMSC is used e.g. to connect to the serving MSC/SGSN for MT-SMS, i.e.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to <maxnoofTAIs> | | | EACH | ignore |
| >>TAI | M | | 9.2.3.16 | | — | |
| CSG Id List | | 0..1 | | | GLOBAL | ignore |
| >CSG Id | | 1 to <maxnoofCSGId> | 9.2.1.62 | | — | |
| Paging Priority | O | | 9.2.1.78 | | YES | ignore |

The Paging message transmitted from the eNodeB to the user equipment is defined in Technical Specification 36.331 (incorporated herein by reference).

the SMS-GMSC sends the MAP message containing the MT TPDU to the MSC/SGSN (such a MAP message is called MAP_MT_FORWARD_SHORT_MESSAGE carrying the TPDU or shortly "mt-ForwardSM(TPDU)"). The SMS-IWMSC is used e.g. to connect to the serving MSC/SGSN for MO-SMS, i.e. the serving MSC/SGSN sends the MAP message containing the MO TPDU to the SMS-IWMSC (MAP_MO_FORWARD_SHORT_MESSAGE carrying the TPDU or shortly "mo-ForwardSM(TPDU)").

Please note that the implementation of the SMS protocol entities (e.g. SMR and SMC entities) as shown in FIG. 13 is an example. In future systems or systems other than 3GPP the implementation of the SMS functional entities may be done in physical nodes different from the depicted ones.

Regarding a MT-SMS, the SM-SC prepares in the Short Message Transfer Layer (SM-TL) the MT-SMS for sending. The SM-TL message (TPDU, Transfer Packet Data Units) is received in the Short Message Relay (SMR) Entity of the Short Message Relay Layer (SM-RL). The Packet Data Units (PDU) of the SM-RL layer are called RPDU (Relay Layer PDU). The MT-SMS itself is encapsulated in the RP-DATA RPDU, and the corresponding Acknowledgement or Error messages are called RP-ACK or RP-ERROR. Consequently, there are three kinds of RPUDs.

The SM-TP and the SM-RP protocols are implemented correspondingly in the SM-SC and MSC/MME on the network side and in the UE. Thus, the SMR entities implementing the Relay protocol are implemented in the MSC/MME and UE and exchange RPDUs among themselves.

In case of the classic transmission of SMS over the circuit-switched domain the SM-SC is usually connected to the MSC, and the MSC with the SGSN/MME through MAP/SS7 signalling. As explained later, In the future there will be a direct interface between the SM-SC and SGSN/MME for transmission of the SMS when the UE is attached to the packet-switched domain only, in addition or as an alternative. The SS7 signalling is part of the MAP protocol that is used to carry the TPDUs between the SM-SC and the SGSN/MME. SS7 signalling is actually used between the SM-SC and the Mobile Switching Center (MSC). The signalling over the direct interfaces between the SM-SC and SGSN or MME could be either based on MAP/SS7 signalling or based on IP specific protocols like DIAMETER.

When the TPDUs encapsulated e.g. in the MAP or DIAMETER protocols arrive at the serving MSC/SGSN/MME, the TPDUs are forwarded internally in the MSC/SGSN/MME's to the SMR entity and further to the SMC entity which is part of the Short Message Control Protocol (SM-CP) terminated in the UE and SGSN/MME in the Connection Management (CM) Sublayer. The protocol entities in this sublayer are called SMC (Short Message Control) entity. The PDUs exchanged at this sublayer are called CPDUs, which can be one of CP-DATA, CP-ACK and CP-ERROR. The CP-DATA PDU carries the RPDUs generated in the SMR entity. The CM sublayer can be considered as part of the NAS layer. The CM sublayer uses the services of the NAS Mobility Management (MM) sublayer. Depending on the 3GPP mobile system, the MM sublayer is called GMM (GPRS MM) or EMM (EPS MM). FIG. 14 illustrates an exemplary signalling flow for mobile originated (MO) SMS between the UE and the SM-SC for exchanging CPDUs and RPDUs. It is assumed that the UE is initially in IDLE mode. When the SMR entity in the UE generates an RP-DATA RPDU, the SMR entity triggers the SMC entity to establish a CM signalling (i.e. NAS) connection to the SGSN/MME.

In order to establish the NAS MM connection between UE and MME and the RRC connection between the UE and eNB, the UE sends a NAS Service Request message to the MME. Furthermore, the NAS layer in the UE requests the RRC layer to establish the RRC connection. After the RRC connection is established and the Service Request is transmitted, usually the Data Radio Bearer(s) are established, and the RRC layer indicates the NAS layer that the NAS MM connection is established. Afterwards the NAS MM layer informs the SMC entity about the established NAS MM connection and the SMC entity can sent and receive CPDUs.

After the NAS signalling connection is established, the SMC entity sends the CPDU CP-DATA containing the RP-DATA to the SMC entity in the SGSN/MME. The SMC entity forwards the RP-DATA to the SMR entity which encapsulates the RP-DATA into a TPDU. After internal forwarding, the SGSN/MME's MAP entity forwards the RP-DATA encapsulated in TPDU as a mo-ForwardSM (TPDU) to the MAP entity in the SM-SC.

The SMC entity in the SGSN/MME acknowledges the reception of CP-DATA with a CP-ACK message. When the SMC entity in the SGSN/MME receives an RPDU (e.g. RP-ACK) from the SMR entity, the SMC entity generates a CP-DATA CPDU containing the RPDU and transmits it to the SMC entity in the UE. When the SMR entities (in both UE and MME) do not have any more RPDUs to send, the SMR entity informs the SMC entity that the CM signalling connection is not any longer needed by sending a release request (Rel Req). In other words, the release of the CM connection (which could result in NAS MM connection release) is controlled by the SM-RL (with the exception of error situations).

In more detail, when the SMC entity in the MME/SGSN receives both the Rel Req from the SMR entity and the last CP-ACK from the UE, the SMC entity triggers the MM entity to start NAS MM connection release. For that purpose the MM entity in the MME/SGSN sends to the eNB a UE CONTEXT RELEASE COMMAND. In consequence the MME's MM entity transfers to IDLE state for that UE (but keeps the EMM and ESM context for that UE). On the other side, the eNB deletes the UE context and sends "RRC Connection Release" message to the UE. After reception of this message, the RRC layer in the UE indicates to the NAS layer that the RRC connection was released and the NAS layer transfers to IDLE state.

Similar signalling procedures are performed for mobile terminated (MT) SMS, as depicted in FIG. 15. In this case, the initial MT-SMS is encapsulated in a TPDU forwarded from the SM-SC towards the UE. When the mt-FSM carrying the TPDU arrives at the SGSN/MME, the message is internally processed and forwarded to SMR entity and to the SMC entity that triggers the establishment of a NAS MM signalling connection. To said end, the SGSN/MME pages the UE, and the UE responds with a Service Request message to initiate the Service Request procedure. Once the NAS MM connection is established, the SGSN/MME's SMC entity can send the CP-DATA CPDU containing the RP-DATA of the SMR layer to the UE. The UE's SMC entity processes the CP-DATA message and forwards the RP-DATA to the SMR entity. The SMC entity then sends the corresponding CP-ACK message to the SGSN/MME.

The SMR entity of the UE sends an RP-ACK message down to the SMC entity, which in turn puts the RP-ACK within a CP-Data CPDU and transmits same to the SMC entity in the SGSN/MME. When the SMR entity of the UE and/or the MME has no more RPDUs to send, it sends a release request message to its corresponding SMC entity to inform it that the CM connection is not any longer needed.

FIG. 16 illustrates in a more comprehensive way the signalling diagrams of FIG. 14 and FIG. 15 for the MO and MT SMS. Specifically, in the upper part the signalling procedure for the MO SMS is depicted; in the lower part, the one for MT SMS.

SMS Transmission in the Packet Switched Domain

In most of the cases a current UE that uses voice services and IP services is attached to the mobile network for both circuit switched and packet switched services. The mobile network (e.g. UTRAN) can support circuit-switched services and packet-switched services at the same time; accordingly, the mobile node may attach to the UTRAN also for either or both of circuit-switched and packet-switched services. E-UTRAN was specifically designed to only support packet-switched services, and thus a UE in the E-UTRAN cannot attach to circuit-switched services. Nevertheless, also for UEs in LTE network SMS delivery is possible, as will be explained below.

In 3GPP terminology it is said that the UE is "EPS/IMSI attached" (used in LTE/SAE systems terminology) or "GPRS/IMSI attached" (used in GSM/UMTS systems terminology). The term IMSI relates to the CS services, and the terms EPS and GPRS relate to PS services. In general, network nodes or entities and their corresponding interfaces, being used for CS services, are said to belong to the CS domain; accordingly, network nodes or entities and their corresponding interfaces, being used for PS services, are said to belong to the PS domain.

FIG. 12B discloses an exemplary system architecture and the interfaces between entities involved in the SMS transmission; the architecture depicted in FIG. 12B is more recent than the one of FIG. 12A. When the UE is connected over the LTE access to the MME, the function "native SMS-in-MME" shall be specified making it possible to forward the SMS directly via the SGd interface between the SM-SC and the MME (called SGd in analogy to the already existing interface Gd between the SM-SC and the SGSN). The only interface currently not finally defined in the standard is the SGd interface between the SM-SC and the MME, though it has been already agreed to set up such an interface; for that reason the name "SGd" is written in quotation marks in FIG. 12B, and the interface between SMS-SC and MME might be named differently in the standard.

The transmission of an SMS, when the UE is registered with the SGSN via the GERAN (also called 2G) or via UTRAN (also called 3G) can be performed in two different ways, generally; either in the PS domain (i.e. SMS over Gd interface) or in the CS domain (i.e. SMS over D interface and via the MSC entity). FIGS. 25-28 illustrate in general the various routes possible for SMS delivery, involving the CS domain and/or PS domain. The particular case where the UE is registered to the SGSN via GERAN and UTRAN is depicted in FIGS. 27 and 28.

SMS in PS domain (also called SMS over Gd interface): the SGSN implements an SMS protocol stack for the SM-RP and SM-CP protocols, such that a native SMS transmission is possible between the SMS-SC and the SGSN over the Gd interface. In this context, native SMS transmission means that the serving node to which the UE is attached supports the SMS protocols SM-RP and SM-CP to form RP-DATA and CP-DATA PDUs. Correspondingly, the SMS-SC transmits the SMS to the SGSN via the Gd interface using the SM-TP protocol, and in turn the SGSN can forward the SMS via the Gb or Iups interface to the UE respectively in the GERAN or UTRAN access using the SM-CP and SM-RP protocols. This is depicted in FIG. 27, and may be referred to as "native-SMS-in-SGSN" delivery. FIG. 27 also illustrates with dashed lines how the UE is paged by the SGSN, upon receiving the MT SMS from the SMS-SC.

When the mobile node is in the LTE network, the SMS may be transmitted via the "new" SGd interface between the SMS-SC and the MME, and from the MME to the UE via the S1 interface using the SM-CP and SM-RP protocols. This is depicted in FIG. 26, and may be referred to as "native-SMS-in-MME" delivery. FIG. 26 also shows with dashed lines how the UE is paged by the MME, upon receiving from the SMS-SC the MT SMS in the MME.

Accordingly, the SMS is delivered in the core network using the PS domain entities only in FIGS. 26 and 27; the CS domain is not used. Please note that in such case the UE is not required to have MSISDN number. Thus, the MO and MT SMS can be routed (and possibly stored) in the core network without the presence of MSISDN identifier, but instead another UE identifier, e.g. IMSI, can be used.

In the recent 3GPP activities it was specified that the SGSN indicates to the UE the support for "PS only" SMS by sending the "SMS supported" flag in NAS GMM accept messages. This is mainly performed for MO SMS transmission, where the UE knows that the MO SMS can be transmitted over the SGSN serving node (i.e. no need to connect to the MSC for SMS transmission). Also, this NAS GMM "SMS supported" indication from the SGSN indicates to the UE that the MT SMS can be transmitted directly from the SGSN to the UE. Further, please note that the UE having only PS domain services and capable of NAS based SMS indicates "SMS-only" to the SGSN during combined Attach/RAU procedures.

SMS in CS domain: In general, the transport of SMS in the CS domain can be accomplished by using the MSC server, which then can transmit the SMS to the UE in the UTRAN or GERAN respectively. This is illustrated in FIG. 28, where the SMS is delivered only in the CS domain; thus, it can be referred to as "SMS-over-CS". The SMS-SC, when receiving an MT SMS, forwards same via the D interface to the MSC server. When the UE receives the paging, the UE may change to the CS domain (i.e. the UE registers with the MSC). The MSC server then can directly transmit the SMS to the UE via the SMS CP/RP protocol (see FIG. 28). FIG. 28 also depicts the possible paging routes when an MT SMS arrives at the MSC and the UE is registered at the SGSN. Paging is possible over the Gs interface, such that the MSC generates a paging message, forwards same to the SGSN to be broadcast in the UTRAN network. Alternatively, the MSC may directly page in the GERAN and UTRAN. Please note that SMS transport is not possible over Gs interface from the MSC to the SGSN.

SMS in combined PS+CS domain: The MSC server (and thus the circuit-switched domain) is also involved in case the SMS is exchanged via the MSC server and over the SGs interface with the MME using the MAP protocol. In this case, the UE being located in the LTE network, receives the SMS from the MME over the S1 interface using the NAS protocol encapsulating the SM-CP PDU, transporting the SMS. FIG. 25 shows this SMS delivery which may be referred to as "SMS-over-SGs". FIG. 25 also illustrates the paging with dashed lines; upon receiving an MT SMS from the SMS-SC, the MSC transmits a paging to the MME over the SGs interface. The MME in turn pages the UE in its network.

It should be noted that for the UE registered with the MME there is no difference between exchanging the SMS via SGs interface (i.e. "SMS-over-SGs" from the MSC, as specified in release 9 of the standard), or using the "native SMS-in-MME" function (directly from the SM-SC, as specified in release 11 of the standard).

The MME shall support SMS procedures, including SMC and SMR functions, as well as usual combined EPS/IMSI procedures for "SMS-only". Additionally, the MME:

provides a non-broadcasted LAI (Location Area ID) to the UE (which is needed in the UE in order to be correctly combined CS+PS attached);

indicates in the Attach/TAU Accept message that the IMSI attach is for "SMS-only";

notifies the HSS that the MME is capable of SMS transfer without the need of establishing an SGs association with an MSC.

When a PS-only attached UE is connected over 2G/3G (i.e. GERAN/UTRAN) access to the SGSN, the following is specified for the SMS transmission:

With respect to the interface between SGSN and HSS/HLR:

The support of SMS service via PS domain NAS is optional and depends on the HSS subscription, SGSN support and UE indication.

If the subscriber data doesn't contain CS subscription, HSS indicates to the SGSN "PS-only-enforced", SGSN doesn't perform combined GMM procedures and doesn't establish Gs association.

If HSS indicates to the SGSN "PS-only-enabled" and the SGSN supports NAS based SMS, the SGSN does not to establish Gs association.

With respect to the interface between SGSN and UE:

UE having only PS domain services and capable of NAS based SMS indicates "SMS-only" to the SGSN during combined Attach/RAU procedures.

SGSN indicates "SMS-Supported" to the UE during Attach/RAU procedures. UE with only PS domain services and NAS based SMS capability and when receiving "SMS-Supported" should not perform IMSI Attach/LAU procedures.

In summary, four different cases can be identified regarding which entities support the native SMS exchange functionality, influencing how an SMS can be transmitted in the network architecture depending on the SMS functionality implement in the different nodes and depending on the network configuration actually used.

|            | SMS in SGSN |    |
|------------|-------------|----|
| SMS in MME | YES         | NO |
| YES        | A           | B  |
| NO         | C           | D  |

The expressions "SMS in SGSN" and "SMS in MME" mean that the SGSN respectively the MME implements SM-RP and SM-CP protocols, i.e. the SMS native transmission is supported.

FIG. 25-28 are marked with the different cases so as to indicate which route of SMS exchange is possible for which case. For instance, the route of exchange according to FIG. 25 is actually possible for all cases. In Case A, where the SGSN as well as the MME implement the SM-CP/RP protocols, all of the routes of FIG. 25-28 are possible. Which one is actually used depends e.g. on network configuration and the location of the UE. In more detail, the HSS/HLR will store the entity which shall serve the UE for the SMS delivery; for example, the MSC, MME or SGSN. Correspondingly, when an SMS arrives at the SMS-SC, the SMS-SC contacts the HSS/HLR to learn the SMS serving node for the mobile node. Thus, assuming the UE is located in the LTE network, even though the MME might be capable of native SMS exchange (i.e. has the corresponding SM-CP/RP protocols), the network configuration is such that the HSS informs the SMS-SC about the MSC; in this case, this native SMS capability of the MME is not exploited and thus the SMS is not transmitted via the SGd interface directly to the MME. Instead, the SMS-SC learns the address of the MSC associated with the UE and transmits the SMS over the D interface to the MSC for further forwarding, as explained already above (see FIG. 25).

Similarly, despite the SGSN being able to natively send SMS, the SMS-SC might be instructed by the HSS/HLR to also use the MSC server instead when the UE is located in UTRAN (see FIG. 28).

The four Cases and possible SMS delivery routes are summarized below.

Case A: native SMS transmission is possible in the PS domain (no MSC involvement), when the UE is registered with either the SGSN or the MME (over LTE or 2G/3G). In this Case A the UE can natively send and receive SMS, when registered with the SGSN or with the MME, according to FIGS. 26 and 27. However, also the routes for SMS delivery according to FIG. 25 and FIG. 28 are possible, if the network configuration requires the SMS-SC to involve the CS domain.

Problems or uncertainties can occur in the following situations:

1) during the handover between GERAN/UTRAN and LTE: it is not specified how the SMS PDU are forwarded 2) when ISR is activated, the routing of the MT SMS should be clarified as the SM-SC needs to know a single entity for SMS routing (SM-SC inquires the routing information from HLR/HSS).

Case B: native SMS transmission over the MME is possible. Since the SGSN does not support native SMS transmission, the route according to FIG. 27 is not possible. Instead, when the UE is located in the UTRAN network, the SMS has to be exchanged according to the route of FIG. 28. Correspondingly, in this Case B, when the UE is located in the UTRAN, the SMS transfer is only possible over the CS domain.

Problems or uncertainties can occur if the network operator would like to avoid the use of CS domain entities, e.g. MSC. It is unclear how the SMS PDUs are delivered to/from the UE when the UE is connected over the GERAN and UTRAN accesses. Case C: native SMS transmission over the SGSN is possible. The MME does not support native SMS transmission, for which reason the route exchange according to FIG. 26 is not possible for Case C. Instead, when located in the LTE network, the UE needs to receive the SMS according to route of FIG. 25 for which the MSC server is involved.

Problems or uncertainties can occur if the network operator would like to avoid the use of CS domain entities, e.g. MSC. It is unclear how the SMS PDUs are delivered to/from the UE when the UE is connected over the LTE access.

Case D: When neither the SGSN nor the MME support the native SMS capability, the exchange according to FIGS. 26 and 27 is not possible. Correspondingly, the MSC server is always involved to transfer the SMS to the UE as illustrated in FIGS. 25 and 28. This case D is not very relevant for the present application, since no SMS transmission in the PS domain is possible.

Recently the 3GPP standardization decided to implement the transmission of an SMS for UEs that are subscribed and/or attached for PS-services only (PS-only); this is even though SMS is considered a circuit switched service, which usually would involve the mobile switching center (MSC) as explained above and illustrated in FIGS. 25 and 28.

As shown above, the MSC server is involved in the SMS transmission according to FIGS. 25 and 28. In case Case B, when the UE is located in UTRAN an SMS transmission without MSC server is not possible. Correspondingly, in Case C, when the UE is located in LTE, an SMS transmission without the MSC server is also not possible. This is however in contrast to the goal of having a PS-only exchange of SMS for the UE where the MSC is no longer involved.

Idle State Signaling Reduction (ISR) Functionality

3GPP defined an optimization for the case of IDLE mode mobility between the LTE and UTRAN/GERAN access, i.e. when the UE moves between the serving nodes MME and SGSN. This optimization is called IDLE mode signaling reduction (abbreviated as ISR) and allows that the UE does not initiate any signaling when changing between different radio access technologies (RATs). In the following, a brief summary of the ISR functioning will be given; a more detailed discussion of ISR can be found in Annex J of 3GPP TS 23.401 v11.1.0 which can be downloaded from the 3GPP server and which is incorporated herein by reference.

ISR aims at reducing the frequency of TAU and RAU procedures caused by UE reselection between E-UTRAN (LTE) and GERAN/UTRAN, which are operated together. Especially, the update signaling between UE and the network is reduced; but also the network internal signaling is reduced.

The dependency between 2G/3G and EPC is minimized at the cost of ISR-specific node and interface functionality. The idea behind ISR feature is that UE can be registered in UTRAN/GERAN RA at the same time it is registered in an E-UTRAN TA or list of TAs. The UE keeps the two registrations in parallel and runs periodic timers for both registrations independently. Similarly, the network keeps the two registrations in parallel, also ensuring that the UE can be paged in both the RA and the TAs it is registered in.

ISR support is mandatory for E-UTRAN UEs that support GERAN and/or UTRAN and optional for the network. ISR requires special functionality in both the UE and the network (i.e. in the SGSN, MME, Serving GW and HSS) to activate ISR for a UE. The network can decide for ISR activation individually for each UE. Gn/Gp SGSNs do not support ISR functionality.

ISR is activated at handover from LTE to 2G/3G, or 2G/3G to LTE, provided the S-GW supports ISR. When downlink data arrives at the S-GW, the S-GW sends a Downlink Data Notification (DDN) request to both serving nodes, SGSN and MME.

When ISR is activated this means the UE is registered with both MME and SGSN. Both the SGSN and the MME have a control connection with the Serving GW. MME and SGSN are both registered at HSS. The UE stores MM parameters from SGSN (e.g. P-TMSI and RA) and from MME (e.g. GUTI and TA(s)), and the UE stores session management (bearer) contexts that are common for E-UTRAN and GERAN/UTRAN accesses. In idle state the UE can reselect between E-UTRAN and GERAN/UTRAN (within the registered RA and TAs) without any need to perform TAU or RAU procedures with the network. SGSN and MME store each other's address when ISR is activated.

Implicit detach by one CN node (either SGSN or MME) deactivates ISR in the network. ISR is deactivated in the UE when the UE cannot perform periodic updates in time.

As explained before, a recently establish goal for standardization is to allow SMS delivery for PS-only, i.e. without involvement of the MSC server. However, when the mobile is IDLE and activates ISR, SMS delivery is not yet properly defined. Since the UE avoids RAU and TAU with activated ISR, the HSS does not know whether the UE is located in LTE or UTRAN. Consequently, the SMS-SC would get two addresses from the HSS, namely the ones of SGSN and MME. The SMS-SC would then have to multicast the MT SMS to SGSN and MME, which is however currently not possible, since the SMS-SC needs one specific target to which it transfers the SMS.

There is the need for procedures to deliver SMS when the UE is in IDLE state and has ISR activated.

When ISR is not activated for the UE, then the HSS always knows exactly in which network the UE is located and thus may inform the SMS-SC about the corresponding serving node, be it the MME or the SGSN.

Handover from LTE to UTRAN Radio Access

Above, a short description was given of UE mobility when the UE is in IDLE mode, using the ISR to avoid unnecessary signaling, and the problems resulting therefrom. A description of UE mobility when the UE is in CONNECTED mode follows, and in particular the inter-RAT handover from LTE to UTRAN. Chapter 5.5.2 of 3GPP TS 23.401 v11.1.0 gives a very detailed explanation of inter RAT handovers and are incorporated herewith by reference; Chapter 5.5.2.1 and 5.5.2.2. in particular refer to Inter RAT handovers between the E-UTRAN (LTE) and UTRAN. Chapter 5.5.2.1, being the one mainly relevant for the present application, will be summarized in the following as far as helpful for the understanding.

FIG. 26 illustrates the message exchange performed in the network for the preparation phase of the inter-RAT handover, and corresponds to FIG. 5.5.2.1.2-1 of TS 23.401. The various steps of FIG. 26 are explained in great detail in Chapter 5.5.2.1.2 of TS 23.401, and will be repeated in the following.

1. The source eNodeB decides to initiate an Inter-RAT handover to the target access network, UTRAN Iu mode. At this point both uplink and downlink user data is transmitted via the following: Bearer(s) between UE and source eNodeB, GTP tunnel(s) between source eNodeB, Serving GW and PDN GW.
   If the UE has an ongoing emergency bearer service the source eNodeB shall not initiate PS handover to a UTRAN cell that is not IMS voice capable.
   NOTE 1: The process leading to the handover decision is outside of the scope of this specification.
2. The source eNodeB sends a Handover Required (S1AP Cause, Target RNC Identifier, CSG ID, CSG access mode, Source to Target Transparent Container) message to the source MME to request the CN to establish resources in the target RNC, target SGSN and the Serving GW. The bearers that will be subject to data forwarding (if any) are identified by the target SGSN in a later step (see step 7 below). When the target cell is a CSG cell or a hybrid cell, the source eNodeB shall include the CSG ID of the target cell. If the target cell is a hybrid cell, the CSG access mode shall be indicated.
3. The source MME determines from the 'Target RNC Identifier' IE that the type of handover is IRAT Handover to UTRAN Iu mode. The Source MME initiates the Handover resource allocation procedure by sending a Forward Relocation Request (IMSI, Target Identification, CSG ID, CSG Membership Indication, MM Context, PDN Connections, MME Tunnel Endpoint Identifier for Control Plane, MME Address for Control plane, Source to Target Transparent Container, RAN Cause, MS Info Change Reporting Action (if available), CSG Information Reporting Action (if available), UE Time Zone, ISR Supported, Serving Network) message to the target SGSN. The information ISR Supported is indicated if the source MME and associated Serving GW are capable to activate ISR for the UE. When ISR is activated the message should be sent to the SGSN that maintains ISR for the UE when this SGSN is serving the target identified by the Target Identification. This message includes all PDN Connections active in the source system and for each PDN Connection includes the associated APN, the address and the uplink Tunnel endpoint parameters of the Serving GW for control plane, and a list of EPS Bearer Contexts. RAN Cause indicates the S1AP Cause as received from source eNodeB. The old Serving Network is sent to target MME to support the target MME to resolve if Serving Network is changed.

The source MME shall perform access control by checking the UE's CSG subscription when CSG ID is provided by the source eNodeB. If there is no subscription data for this CSG ID or the CSG subscription is expired, and the target cell is a CSG cell, the source MME shall reject the handover with an appropriate cause unless the UE has emergency bearer services.

The source MME includes the CSG ID in the Forward Relocation Request when the target cell is a CSG cell or hybrid cell. When the target cell is a hybrid cell, or if there are one or several emergency bearers and the target cell is a CSG cell, the CSG Membership Indication indicating whether the UE is a CSG member shall be included in the Forward Relocation Request message.

The target SGSN maps the EPS bearers to PDP contexts 1-to-1 and maps the EPS Bearer QoS parameter values of an EPS bearer to the Release 99 QoS parameter values of a bearer context as defined in Annex E of TS 23.401.

Prioritization of PDP Contexts is performed by the target core network node, i.e. target SGSN.

The MM context contains security related information, e.g. supported ciphering algorithms as described in TS 29.274. Handling of security keys is described in TS 33.401.

The target SGSN shall determine the Maximum APN restriction based on the APN Restriction of each bearer context in the Forward Relocation Request, and shall subsequently store the new Maximum APN restriction value.

4. The target SGSN determines if the Serving GW is to be relocated, e.g., due to PLMN change. If the Serving GW is to be relocated, the target SGSN selects the target Serving GW as described under clause 4.3.8.2 of TS 23.401 on "Serving GW selection function", and sends a Create Session Request message (IMSI, SGSN Tunnel Endpoint Identifier for Control Plane, SGSN Address for Control plane, PDN GW address(es) for user plane, PDN GW UL TEID(s) for user plane, PDN GW address(es) for control plane, and PDN GW TEID(s) for control plane, the Protocol Type over S5/S8, Serving Network) per PDN connection to the target Serving GW. The Protocol Type over S5/S8 is provided to Serving GW which protocol should be used over S5/S8 interface.

The target SGSN establishes the EPS Bearer context(s) in the indicated order. The SGSN deactivates, as provided in step 7 of the execution phase, the EPS Bearer contexts which cannot be established.

4a. The target Serving GW allocates its local resources and returns a Create Session Response (Serving GW address (es) for user plane, Serving GW UL TEID(s) for user plane, Serving GW Address for control plane, Serving GW TEID for control plane) message to the target SGSN.

5. The target SGSN requests the target RNC to establish the radio network resources (RABs) by sending the message Relocation Request (UE Identifier, Cause, CN Domain Indicator, Integrity protection information (i.e. IK and allowed Integrity Protection algorithms), Encryption information (i.e. CK and allowed Ciphering algorithms), RAB to be setup list, CSG ID, CSG Membership Indication, Source RNC to Target RNC Transparent Container, Service Handover related information). If the Access Restriction is present in the MM context, the Service Handover related information shall be included by the target SGSN for the Relocation Request message in order for RNC to restrict the UE in connected mode to handover to the RAT prohibited by the Access Restriction.

For each RAB requested to be established, RABs To Be Setup shall contain information such as RAB ID, RAB parameters, Transport Layer Address, and Iu Transport Association. The RAB ID information element contains the NSAPI value, and the RAB parameters information element gives the QoS profile. The Transport Layer Address is the Serving GW Address for user plane (if Direct Tunnel is used) or the SGSN Address for user plane (if Direct Tunnel is not used), and the Iu Transport Association corresponds to the uplink Tunnel Endpoint Identifier Data in Serving GW or SGSN respectively.

Ciphering and integrity protection keys are sent to the target RNC to allow data transfer to continue in the new RAT/mode target cell without requiring a new AKA (Authentication and Key Agreement) procedure. Information that is required to be sent to the UE (either in the Relocation Command message or after the handover completion message) from RRC in the target RNC shall be included in the RRC message sent from the target RNC to the UE via the transparent container. More details are described in TS 33.401.

The Target SGSN shall include the CSG ID and CSG Membership Indication when provided by the source MME in the Forward Relocation Request message.

In the target RNC radio and Iu user plane resources are reserved for the accepted RABs. Cause indicates the RAN Cause as received from source MME. The Source RNC to Target RNC Transparent Container includes the value from the Source to Target Transparent Container received from the source eNodeB.

If the target cell is a CSG cell, the target RNC shall verify the CSG ID provided by the target SGSN, and reject the handover with an appropriate cause if it does not match the CSG ID for the target cell. If the target cell is in hybrid mode, the target RNC may use the CSG Membership Indication to perform differentiated treatment for CSG and non-CSG members. If the target cell is a CSG cell, and if the CSG Membership Indication is "non member", the target RNC only accepts the emergency bearers.

5a. The target RNC allocates the resources and returns the applicable parameters to the target SGSN in the message Relocation Request Acknowledge (Target RNC to Source RNC Transparent Container, RABs setup list, RABs failed to setup list).

Upon sending the Relocation Request Acknowledge message the target RNC shall be prepared to receive downlink GTP PDUs from the Serving GW, or Target SGSN if Direct Tunnel is not used, for the accepted RABs.

Each RABs setup list is defined by a Transport Layer Address, which is the target RNC Address for user data, and the Iu Transport Association, which corresponds to the downlink Tunnel Endpoint Identifier for user data.

Any EPS Bearer contexts for which a RAB was not established are maintained in the target SGSN and the UE. These EPS Bearer contexts shall be deactivated by the target SGSN via explicit SM procedures upon the completion of the routing area update (RAU) procedure.

6. If 'Indirect Forwarding' and relocation of Serving GW apply and Direct Tunnel is used the target SGSN sends a Create Indirect Data Forwarding Tunnel Request message (Target RNC Address and TEID(s) for DL data forwarding) to the Serving GW. If 'Indirect Forwarding' and relocation of Serving GW apply and Direct Tunnel is not used, then the target SGSN sends a Create Indirect Data Forwarding Tunnel Request message (SGSN Address and TEID(s) for DL data forwarding) to the Serving GW.

Indirect forwarding may be performed via a Serving GW which is different from the Serving GW used as the anchor point for the UE.

6a. The Serving GW returns a Create Indirect Data Forwarding Tunnel Response (Cause, Serving GW Address(es) and Serving GW DL TEID(s) for data forwarding) message to the target SGSN.

7. The target SGSN sends the message Forward Relocation Response (Cause, SGSN Tunnel Endpoint Identifier for Control Plane, SGSN Address for Control Plane, Target to Source Transparent Container, Cause, RAB Setup Information, Additional RAB Setup Information, Address(es) and TEID(s) for User Traffic Data Forwarding, Serving GW change indication) to the source MME. Serving GW change indication indicates a new Serving GW has been selected. The Target to Source Transparent Container contains the value from the Target RNC to Source RNC Transparent Container received from the target RNC.

The IE 'Address(es) and TEID(s) for User Traffic Data Forwarding' defines the destination tunnelling endpoint for data forwarding in target system, and it is set as follows:

If 'Direct Forwarding' applies, or if 'Indirect Forwarding' and no relocation of Serving GW apply and Direct Tunnel is used, then the IE 'Address(es) and TEID(s) for User Traffic Data Forwarding' contains the addresses and GTP-U tunnel endpoint parameters to the Target RNC received in step 5a.

If 'Indirect Forwarding' and relocation of Serving GW apply, then the IE 'Address(es) and TEID(s) for User Traffic Data Forwarding' contains the addresses and DL GTP-U tunnel endpoint parameters to the Serving GW received in step 6. This is independent from using Direct Tunnel or not.

If 'Indirect Forwarding' applies and Direct Tunnel is not used and relocation of Serving GW does not apply, then the IE 'Address(es) and TEID(s) for User Traffic Data Forwarding' contains the DL GTP-U tunnel endpoint parameters to the Target SGSN.

8. If "Indirect Forwarding" applies, the Source MME sends the message Create Indirect Data Forwarding Tunnel Request (Address(es) and TEID(s) for Data Forwarding (received in step 7)), EPS Bearer ID(s)) to the Serving GW used for indirect forwarding.

Indirect forwarding may be performed via a Serving GW which is different from the Serving GW used as the anchor point for the UE.

8a. The Serving GW returns the forwarding parameters by sending the message Create Indirect Data Forwarding Tunnel Response (Cause, Serving GW Address(es) and TEID(s) for Data Forwarding). If the Serving GW doesn't support data forwarding, an appropriate cause value shall be returned and the Serving GW Address(es) and TEID(s) will not be included in the message.

FIG. 27 depicts the execution phase for the E-UTRAN to UTRAN Iu mode Inter-RAT handover as defined in TS 23.401, and corresponds to FIG. 5.5.2.1.3-1 of TS 23.401. The various steps of FIG. 27 are explained in great detail in Chapter 5.5.2.1.3 of TS 23.401, and will be repeated in the following.

The source eNodeB continues to receive downlink and uplink user plane PDUs.

1. The source MME completes the preparation phase towards source eNodeB by sending the message Handover Command (Target to Source Transparent Container, E-RABs to Release List, Bearers Subject to Data Forwarding List). The "Bearers Subject to Data forwarding list" IE may be included in the message and it shall be a list of 'Address(es) and TEID(s) for user traffic data forwarding' received from target side in the preparation phase (Step 7 of the preparation phase) when 'Direct Forwarding' applies, or the parameters received in Step 8a of the preparation phase when 'Indirect Forwarding' applies.

The source eNodeB initiates data forwarding for bearers specified in the "Bearers Subject to Data Forwarding List". The data forwarding may go directly to target RNC or alternatively go via the Serving GW if so decided by source MME and or/target SGSN in the preparation phase.

2. The source eNodeB will give a command to the UE to handover to the target access network via the message HO from E-UTRAN Command. This message includes a transparent container including radio aspect parameters that the target RNC has set-up in the preparation phase. The details of this E-UTRAN specific signalling are described in TS 36.300.

Upon the reception of the HO from E-UTRAN Command message containing the Handover Command message, the UE shall associate its bearer IDs to the respective RABs based on the relation with the NSAPI and shall suspend the uplink transmission of the user plane data.

3. Void.
4. The UE moves to the target UTRAN Iu (3G) system and executes the handover according to the parameters provided in the message delivered in step 2. The procedure is the same as in step 6 and 8 in clause 5.2.2.2 in TS 43.129 with the additional function of association of the received RABs and existing Bearer Id related to the particular NSAPI.

The UE may resume the user data transfer only for those NSAPIs for which there are radio resources allocated in the target RNC.

5. When the new source RNC-ID+S-RNTI are successfully exchanged with the UE, the target RNC shall send the Relocation Complete message to the target SGSN. The purpose of the Relocation Complete procedure is to indicate by the target RNC the completion of the relocation from the source E-UTRAN to the RNC. After the reception of the Relocation Complete message the target SGSN shall be prepared to receive data from the target RNC. Each uplink N-PDU received by the target SGSN is forwarded directly to the Serving GW.

6. Then the target SGSN knows that the UE has arrived to the target side and target SGSN informs the source MME by sending the Forward Relocation Complete Notification (ISR Activated, Serving GW change) message. If indicated, ISR Activated indicates to the source MME that it shall maintain the UE's context and that it shall activate ISR, which is only possible when the S GW is not changed. The source MME will also acknowledge that information. A timer in source MME is started to supervise when resources in Source eNodeB and Source Serving GW (for Serving GW relocation) shall be released.

When the timer expires and ISR Activated is not indicated by the target SGSN the source MME releases all bearer resources of the UE. If Serving GW change is indicated and this timer expires the source MME deletes the EPS bearer resources by sending Delete Session Request (Cause, Operation Indication) messages to the Source Serving GW. The operation Indication flag is not set, that indicates to the Source Serving GW that the Source Serving GW shall not initiate a delete procedure towards the PDN GW. If ISR has been activated before this procedure, the cause indicates to the Source S GW that the Source S GW shall delete the bearer resources on the other old CN node by sending Delete Bearer Request message(s) to that CN node.

Upon receipt of the Forward Relocation Complete Acknowledge message the target SGSN starts a timer if the target SGSN allocated S GW resources for indirect forwarding.

7. The target SGSN will now complete the Handover procedure by informing the Serving GW (for Serving GW relocation this will be the Target Serving GW) that the target SGSN is now responsible for all the EPS Bearer Contexts the UE has established. This is performed in the message Modify Bearer Request (SGSN Tunnel Endpoint Identifier for Control Plane, NSAPI(s), SGSN Address for Control Plane, SGSN Address(es) and TEID(s) for User Traffic for the accepted EPS bearers (if Direct Tunnel is not used) or RNC Address(es) and TEID(s) for User Traffic for the accepted EPS bearers (if Direct Tunnel is used) and RAT type, ISR Activated) per PDN connection. If the PDN GW requested UE's location and/or User CSG information (determined from the UE context), the SGSN also includes the User Location Information IE and/or User CSG Information IE in this message. If the UE Time Zone has changed, the SGSN includes the UE Time Zone IE in this message. If Serving GW is not relocated but the Serving Network has changed or if the SGSN has not received any old Serving Network information from the old MME, the SGSN includes the new Serving Network IE in this message. In network sharing scenarios Serving Network denotes the serving core network. If indicated, the information ISR Activated indicates that ISR is activated, which is only possible when the S GW is not changed. When the Modify Bearer Request does not indicate ISR Activated and S GW is not changed, the S GW deletes any ISR resources by sending a Delete Bearer Request to the other CN node that has bearer resources on the S GW reserved.

The SGSN releases the non-accepted EPS Bearer contexts by triggering the Bearer Context deactivation procedure. If the Serving GW receives a DL packet for a non-accepted bearer, the Serving GW drops the DL packet and does not send a Downlink Data Notification to the SGSN.

8. The Serving GW (for Serving GW relocation this will be the Target Serving GW) may inform the PDN GW(s) the change of for example for Serving GW relocation or the RAT type that e.g. can be used for charging, by sending the message Modify Bearer Request per PDN connection. The S GW also includes User Location Information IE and/or UE Time Zone IE and/or User CSG Information IE if they are present in step 7. Serving Network should be included if it is received in step 7 or in step 4 in clause 5.5.2.1.2 of TS 23.401. For Serving GW relocation, the Serving GW allocates DL TEIDs on S5/S8 even for non-accepted bearers. The PDN GW must acknowledge the request with the message Modify Bearer Response. In the case of Serving GW relocation, the PDN GW updates its context field and returns a Modify Bearer Response (Charging Id, MSISDN, etc.) message to the Serving GW. The MSISDN is included if the PDN GW has it stored in its UE context.

If PCC infrastructure is used, the PDN GW informs the PCRF about the change of, for example, the RAT type.

9. The Serving GW (for Serving GW relocation this will be the Target Serving GW) acknowledges the user plane switch to the target SGSN via the message Modify Bearer Response (Cause, Serving GW Tunnel Endpoint Identifier for Control Plane, Serving GW Address for Control Plane, Protocol Configuration Options). At this stage the user plane path is established for all EPS Bearer contexts between the UE, target RNC, target SGSN if Direct Tunnel is not used, Serving GW (for Serving GW relocation this will be the Target Serving GW) and PDN GW.

If the Serving GW does not change, the Serving GW shall send one or more "end marker" packets on the old path immediately after switching the path.

10. When the UE recognises that its current Routing Area is not registered with the network, or when the UE's TIN indicates "GUTI", the UE initiates a Routing Area Update procedure with the target SGSN informing it that the UE is located in a new routing area. It is RAN functionality to provide the PMM-CONNECTED UE with Routing Area information.

The target SGSN knows that an IRAT Handover has been performed for this UE as it received the bearer context(s) by handover messages and therefore the target SGSN performs only a subset of the RAU procedure, specifically it excludes the context transfer procedures between source MME and target SGSN.

11. When the timer started at step 6 expires, the source MME sends a Release Resources message to the Source eNodeB. The Source eNodeB releases its resources related to the UE.

When the timer started in step 6 expires and if the source MME received the Serving GW change indication in the Forward Relocation Response message, it deletes the EPS bearer resources by sending Delete Session Request (Cause, Operation Indication) messages to the Source Serving GW. The operation indication flag is not set, that indicates to the Source Serving GW that the Source Serving GW shall not initiate a delete procedure towards the PDN GW. The Source Serving GW acknowledges with Delete Session Response (Cause) messages. If ISR has been activated before this procedure, the cause indicates to the Source S GW that the Source S GW shall delete the bearer resources on the other old CN node by sending Delete Bearer Request message(s) to that CN node.

12. If indirect forwarding was used then the expiry of the timer at source MME started at step 6 triggers the source MME to send a Delete Indirect Data Forwarding Tunnel Request message to the S GW to release the temporary resources used for indirect forwarding.

13. If indirect forwarding was used and the Serving GW is relocated, then the expiry of the timer at target SGSN started at step 6 triggers the target SGSN to send a Delete Indirect Data Forwarding Tunnel Request message to the target S GW to release temporary resources used for indirect forwarding.

Above, the currently used handover procedure for the Inter-RAT handover from E-UTRAN (LTE) to UTRAN was explained. Considering now the scenario in which the UE is in CONNECTED mode and currently receiving an SMS, when the UE performs a handover from the LTE to UTRAN, it is unclear how the SMS are further exchanged after the handover.

In more detail, considering a currently used route according to FIG. 26, after the UE handovers to the SGSN, and provided a PS-only delivery shall be ensured (route according to FIG. 28 not possible), it is not yet defined how the SMS can be exchanged. Similarly, considering a currently used route according to FIG. 27, and provided a PS-only delivery shall be ensured (route according to FIG. 25 not possible), it is not yet defined how the SMS can be exchanged.

Furthermore, in the LTE system at least the default bearer is established and activated, even though it is not used and only SMS transmission is performed between MME and UE over the NAS signaling connection. This is not the case for UTRAN, where a signaling may be established alone, independent from a data connection (data bearer), i.e. a data connection is not mandatory in UTRAN. In this case however, when handing over from E-UTRAN to UTRAN, the default bearer activated in E-UTRAN is automatically mapped to a corresponding PDN connection in UTRAN, even though it is not needed and not mandatory. It should be also noted that this problem exists not only for the Release 11, but already for Release 8 and 9 of the 3GPP standard; in particular for the cases of 1) SMS transmission over the SGs interface and of 2) CS fallback during SMS transmission over SGs (see also TS 23.272, section 8.2.5d).

The present application provides a solution to these problems.

Machine to Machine

The current mobile networks are optimally designed for Human-to-Human communications, but are less optimal for M2M (Machine-2-Machine) applications, which according to 3GPP is also termed MTC (Machine-Type-Communication).

M2M Communication can be seen as a form of data communication between entities that do not necessarily need human interaction. It is different to current communication models as it involves new or different market scenarios, lower costs and effort, a potentially very large number of communicating terminals and little traffic per terminal to a large extent.

Some MTC applications are for example:
Security (e.g. Alarm Systems, Backup for landline, Access Control, Car/Driver security)
Tracking & Tracing (e.g. Fleet Management, Order Management, Pay as you drive, Road Tolling, Traffic information)
Payment (Point of Sales, Vending machines, Loyalty Concepts, Gaming machines)
Health (Monitoring vital signs, Remote diagnostics, Web Access Telemedicine point)
Remote Maintenance/Control (Sensors, Lighting, Pumps, Valves, Elevator control)
Metering (e.g. Power, Gas, Water, Heating, Grid Control)

A study item on M2M communications (3GPP TR 22.868) was completed in 2007. For Rel-10 and beyond, 3GPP intends to take the results on network improvements from the study item forward into a specification phase and address the architectural impacts and security aspects to support MTC scenarios and applications. As such, 3GPP has defined a work item on Network Improvements for Machine-Type Communication (NIMTC) with different goals and objectives such as to reduce the impact and effort of handling large machine-type communication groups, optimize network operations to minimize impact on device battery power usage, stimulate new machine-type communication applications by enabling operators to offer services tailored to machine-type communication requirements or provide network operators with lower operational costs when offering machine-type communication services.

The MTC has some specifics that are different from the usual human-to-human communication. 3GPP tries to identify these specifics in order to optimize the network operations. These specifics are called "MTC features" and are explained in the technical standard TS 22.368 available from http://www.3gpp.org and incorporated herein by reference. For example, one of the mentioned MTC feature can be "small data transmissions", meaning that the MTC device sends or receives small amounts of data. Small amount of data means that the data is smaller or comparable with the size of the exchanged signalling needed to establish the data connection. The exact definition of "small data" is subject of the 3GPP standardization stage 1 and can be a part of the UE's subscription or by network operator policy. Furthermore, the MTC devices may be attached to or detached from the network, before transmission of a small amount of data.

The requirement for UEs subscribed or configured for "small data transmission" is to transmit the small amounts of data with minimal network impact (e.g. signalling overhead, network resources, delay for reallocation). The small data shall be efficiently transmitted in the uplink and in the downlink.

There could be several possible solutions to optimize the small data transmission:
The small data can be encapsulated in a usual Short Message Service (SMS). There are 3 main mechanisms to transmit SMS when the UE is attached to a packet switched (PS) EPS network:
SMS over Circuit Switched Fall-back (CSFB) mechanism. The CSFB mechanism is explained in 3GPP TS 23.272. When there is SMS in the downlink the UE is paged from the network to attach to the circuit switched (CS) domain, i.e. either to the GERAN or the UTRAN access system. Since the MTC Devices are expected to be not expensive mobile devices, it is expected that they would implement only one radio access technology, and thus, would be no capable of CS and PS domain switching. Further, it is expected that many MTC Device would be PS only capable, so CSFB is not a possible general solution;
SMS over IP Multimedia Subsystem (IMS) mechanism. The IMS system is mainly designed for transport of voice and other real time services over IP using Session Initiation Protocol (SIP) and Session Description Protocol (SDP). As mentioned above, the MTC Devices are expected to be low cost device and the implementation of an IMS client could be expensive. Thus, SMS over IMS solution may not be always a desirable solution;

SMS over SGs mechanism. The SGs is the interface between the Mobile Switching Center (MSC) and the MME. The MSC constitutes the interface between the radio system and the fixed networks. It performs all necessary functions in order to handle CS services to and from the mobile stations. This is shown in FIG. 6 which is described below in detail.

The small data is encapsulated in NAS transport messages, similar as SMS-o-SGs mechanism. The difference to SMS-o-SGs is that the small data is small IP packets that somehow are routed to the MME and then the MME encapsulates the IP packets in NAS packets.

FIG. 6 is a signaling diagram depicting the transport of SMS using the SMS-o-SGs mechanism. It is assumed that the UE is configured for EPS services and for the feature of "SMS only". "SMS only" means that the SMS (which is considered as Circuit Switched service) is transported over the LTE access system using SMS-o-SGs mechanism. For this purpose the UE and network exchange their capabilities regarding the SMS transport during the attach procedure. If both, the UE and the network implement SMS-o-SGs and agree to use this mechanism, then the UE's status in the MME is attached for PS services and "SMS-only". Thus, when a downlink SMS arrives at the MME, the MME pages the UE with a "PS" indicator as describe above.

Furthermore, it is assumed that the UE is in an IDLE mode, thus does not have any radio resources configured for receiving or transmitting data.

In step (1), when an SMS with small data arrives at the MME, a paging message is transmitted to the UE in order to alert the UE that downlink data is to be received. The paging message may include a core network domain indicator set to "PS", i.e. packet switched, which means that the user equipment is triggered to establish a connection to the EPS system via the LTE access technology.

In step (2) the user equipment responds with a service request message, starts the timer T3417 and waits for the establishment of the data radio bearers (DRBs). This service request message is one of the EPS mobility management messages and initiates the service request procedure. The purpose of the service request procedure is to transfer the EMM mode from EMM-IDLE to EMM-CONNECTED mode and establish the radio and S1 bearers when uplink user data or signalling is to be sent. Another purpose of this procedure is to invoke MO/MT (Mobile Terminated) circuit switched fallback procedures.

This procedure is used e.g. when the network has downlink signalling pending, when the UE has uplink signalling pending or when—the UE or the network has user data pending and the UE is in EMM-IDLE mode. The service request procedure is initiated by the UE, however, for the downlink transfer of signalling or user data in EMM-IDLE mode, the trigger is given by the network by means of the paging procedure.

No particular acknowledgment will be received by the UE for the service request message. Acknowledgment is thus provided by the establishment of radio bearers. The timer T3417 is terminated when the UE obtains an indication by the Access Stratum (AS) that the Data Radio Bearer (DRB) over the radio interface is established. The default value of the timer T3417 is 6 s. If the UE doesn't receive an indication from the AS before the timer T3417 expires, the user equipment retransmits the ServiceRequest message to the MME.

After the MME receives the ServiceRequest message from the UE, in step (3) the MME triggers the eNB to set up the data radio bearers between the UE and the eNB (see step 3.2). In particular, the MME triggers the S1-AP "Initial Context Setup" procedure towards the eNB to set up radio bearers (SRBs and DRBs), establish security protection over the radio interface, to configure the UE's context for the establishment of S1-U bearer and other functions. Furthermore, an RRCConnectionReconfiguration message is transmitted from the eNB to the UE, including configuration information for the one or more data radio bearer. The user equipment responds with an RRCConnectionReconfigurationComplete message after configuring the data radio bearers as instructed.

The data radio bearer(s) established between the user equipment and the eNodeB however are not used to transmit the small data. Instead, the small data is transmitted from the MME to the UE using the NAS protocol messages (see FIG. 3, illustrating that NAS terminates in UE and MME). In step (4) the SMS is encapsulated in a DOWNLINK NAS TRANSPORT message. The NAS exchange in general and the NAS transport in particular is performed when the UE is in CONNECTED mode, and thus, not only the SRBs but also the corresponding DRB(s) are established. Analogically, the S1-U bearers between the eNB and the S-GW are established as well.

As seen from above, a possible solution for transmitting small data is to use NAS protocol message between MME and user equipment. However, there are problems involved with this prior art solution.

For one thing, though the small data is transmitted using NAS messages, data radio bearers are established between the user equipment and the eNodeB. The reason is that the NAS Service Request message transmitted in step (2) triggers the establishment of the data radio bearers according to steps 3.1 and 3.2. In general, it should be noted that it is not efficient to send small data using EPS bearers, because the signalling overhead for constructing/keeping EPS bearers is large relative to the content size of small data. Furthermore, when the data radio bearers are not even used for small data transport, the signalling is in vain.

The establishment of the EPS bearers (i.e. DRBs and S1-U bearers) and the later release of those bearers consume signalling exchange between the involved nodes and also signalling processing in the nodes itself. Therefore, it is desirable to avoid the establishment of EPS bearers when the UE establishes RRC connection and transfers from IDLE to CONNECTED state.

It should be noted that in an UMTS system, when the user equipment is attached to the network, only context for the control plane is established in the UE and in the Core network (SGSN). When an IDLE UE transfers to CONNECTED state, first only the control plane connection is established, and later the UE initiates the PDP context activation for establishment of data bearers. To the contrary, in EPS system, at least one default EPS data bearer is established when the UE attaches to the network. Thus, when the user equipment transfers from IDLE to CONNECTED state, the EPS bearer (in user plane) is established in parallel to the control plane connection. Therefore, the specific problem targeted by this invention is how to avoid the establishment of user plane bearers when a user equipment attached to EPS system transfers from IDLE to CON- NECTED state and the user equipment has already default EPS bearer context, but only small data over control should be transmitted.

Another possibility to transmit small data is to use the SMS procedure as explained in FIG. 14-16. Correspondingly, the SMS would be transmitted as RP-Data RPDU to or from the UE. If the small data is bigger then 140 bytes, the small data can be transmitted in a concatenated SMS consisting of multiple segments, i.e. SMS.

The release of the radio resources established for the SMS transport according to FIG. 14-16 may not be most advantageous as will be explained in the following.

Usually, for data transmission the eNB initiates to release the RRC connection established between the UE and the eNB, after an inactivity time i.e. when non packets transmission over the radio interface has been performed for a particular time. The eNB sends an S1-AP signalling to the MME to request the radio resource release. Then, the MME instructs the eNB to delete the UE-specific context which results in the RRC connection release.

When the UE's lower layers (i.e. access stratum) indicate RRC connection release, the UE relases the NAS signalling connection too.

It should be noted that the release of the RRC connection as described above, also means the transition from CONNECTED to IDLE state in the NAS layer for both the UE and the MME.

The signalling procedure for the release of the NAS MM signalling connection between the UE and the MME is initiated by the network, i.e. MME.

Concerning SMS transmission, the current 3GPP specification describes procedures for NAS mobility management connection release. One such example of NAS Mobility Management connection release is given below assuming a Mobile Terminated SMS. For MT SMS, the SMC entity in the UE has the following states: MT-Idle, MT-Wait for CO-Ack, and MT-MM-connection established. The SMC entity in the UE triggers the NAS Mobility Management layer for NAS connection release in some of the following cases:

- When the SMC-entity in "MT-MM-connection established" state receives a CM-connection release request message from the SM-RL layer (SMR entity). For example, the CM-connection release request from the SM-RL layer can be indicated to the SMC entity when the SMR entity sends an RP-Ack to acknowledge the reception of an MT SMS;
- When the SMC entity enters the MT-Idle state;
- When an error occurs, e.g. in the SM-RL layer. For instance, this could happen when the Relay Layer does not receive from the Transfer Layer an indication to send the RP-Ack for the MT SMS.

The NAS radio resource release procedure is initiated when the SMC entity in the MME receives the CP-Ack and the Release Request indication from the SM-SC. After the successful transmission of the small data, the quick release of the radio resources is advantageous in order to save capacity in the radio access network.

However, the quick release might not be beneficial at all times. It may e.g. lead to a consecutive re-establishment of the radio connection, e.g. when the UE has to transmit data in response to the SMS. For instance, the MT SMS may be used as a trigger for the MTC application to perform some actions, and in particular to send a data report (which could be one or more MO SMSs) or to establish data connection (i.e. EPS data bearer) to the MTC server. In these and other cases, if the NAS MM connection termination as described above is applied, then the UE would need to re-initiate the RRC connection to send the MO SMS or to establish the data bearers shortly after the connection was released. Put differently, the NAS MM connection, and also the RRC connection, might be terminated too early.

SUMMARY OF THE INVENTION

Therefore, in view of the above problems in the state of the art, one object of the invention is to provide an improved handover procedure in a communication system for a mobile node exchanging only small data.

One aspect of the invention relates to the problem of how to support a handover between the E-UTRAN and UTRAN, when the small data delivery shall only be performed using the packet-switched domain; particularly in the case when the handover between the access systems occurs during the small data transmission. This problem is explained in the background section, in Chapter "Handover from LTE to UTRAN radio access".

According to this aspect, an optimized handover is performed for the mobile node for inter-RAT from E-UTRAN to UTRAN during an ongoing small data (e.g. SMS) transmission. As explained in the background section, a problem occurs for this kind of handover when only the signaling connection is actually used in the E-UTRAN; although the data connection is not used in the E-UTRAN, a corresponding data connection would also be established in the UTRAN during the handover. In order to avoid this unnecessary data connection in UTRAN and the associated resource waste, this aspect of the invention checks in the source network of the E-UTRAN whether the data connection in the target network, UTRAN, shall be established or not.

To give an overview, only if it is determined that the data connection shall be established in the UTRAN, a data connection corresponding to the data connection of the LTE network is established in the UTRAN during the handover (in addition to a signaling connection corresponding to the signaling connection in LTE). Otherwise, if it is determined that the data connection shall not be established in the UTRAN, it is not established in the UTRAN and only a signaling connection corresponding to the signaling connection in LTE is established in UTRAN.

Further details for this aspect of the invention are given in the following.

The check as to whether to establish or not the data connection in the UTRAN can be performed in various ways. For example, it may be checked whether the data connection in the source E-UTRAN is used for data exchange or not. This may be done based on data exchange statistics stored at the UE, Serving-Gateway or eNB. The data statistics for example may relate to the amount of user data exchanged over the S1-U bearer, e.g. after start of SMS transmission.

Other parameters can be considered for the check in addition or alternatively. For example, when the UE was is CONNECTED state before the SMS transmission began, it can be considered as an indication that data exchange was performed over the data bearer in the past, and is currently or will be in the future performed again. A data connection in the UTRAN thus might be needed, and shall thus be established during the handover.

Each data bearer in E-UTRAN is assigned a priority value. This priority value of the default bearer can be also considered for the determination of whether or not to establish a data connection in UTRAN; for instance, when the priority value is high (i.e. surpasses a pre-defined threshold value), it may be determined that a data connection in UTRAN shall be established. Preferably, this may be determined independently from whether the data connection is currently used in the E-UTRAN or not.

According to a further option, it may be considered whether the UE will start a data transmission in response to the SMS it is currently receiving. In more detail, if the MT SMS is used for device triggering, a data connection in the UTRAN shall be established even though at the moment no data exchange is performed over the data bearer in E-UTRAN.

This check as to whether establish or not a data connection in the UTRAN may be performed by an entity, preferably one that is involved in the small data exchange performed in the E-UTRAN. This may be one or a combination of the following: the MME, the eNodeB and the UE.

As explained above, the determination can be based on various parameters and data. The data and/or parameters needed for the determination shall be exchanged from the entity storing that data and/or parameters to the entity actually taking the decision. Assuming for example that the MME is taking the decision whether or not to establish the data connection in the UTRAN, the MME may request data statistics from either the UE, serving-gateway or eNB.

In any case, the entity taking the decision as to whether or not establish a data connection in the UTRAN corresponding to the data connection in the E-UTRAN is provided with the information necessary for the determination as explained above.

Assuming that a data connection shall be established, the handover is performed as usual; including the PDP context activation in the UE and SGSN.

More interesting for this application is the case where no data connection shall be established. In this case, the handover shall be performed such that only the signaling connection is established in the target network, the UTRAN; a corresponding data connection shall be avoided. In order to achieve this, the bearer contexts in the SGSN and UE relating to the data connection in the UTRAN are set to the state "preserved". The term "preserved" shall mean that the PDP contexts are stored in the network and in the UE but are not activated, i.e. not used; furthermore, the SGSN might contact the Serving-Gateway to establish a S4 association even in "preserved" state, but no radio access bearers are established in the radio access network in UTRAN. Correspondingly, during the handover the source MME instructs the SGSN and the UE to not set up a data connection in UTRAN, but to keep the corresponding PDP contexts in preserved state. For instance, the MME might inform the SGSN and the UE about each data connection and the state it shall have; in this case, the MME would inform the SGSN and the UE about the default bearer in E-UTRAN and its state being "preserved".

Alternatively, in the communication from the MME to the UE during the handover, the state information as explained above does not need to be explicitly transmitted to the UE. In case the UE receives no information on corresponding data bearers established by the SGSN (in previous steps of the handover)(i.e. no RAB IDs), the UE can infer that only signaling connection is to be established in the UTRAN.

The present invention provides a method for performing a handover of a mobile node from a first network to a second network in a mobile communication system. The mobile node is attached with the first network to receive packet-switched services and small data. A signalling connection established in the first network is used by the mobile node to exchange the small data, and a data connection is established in the first network for the mobile node. The handover of the mobile node from the first network to the second network is initiated to attach the mobile node for packet-switched services and small data with the second network. A node involved in the small data exchange between the mobile node and the first network determines whether a second data connection corresponding to the data connection is to be established in the second network. A second signalling connection in the second network, corresponding to the signalling connection in the first network is established. The second data connection in the second network corresponding to the data connection in the first network is established or not, depending on the result of the determining step. Then, the initiated handover of the mobile node from the first network to the second network is finalized.

According to an advantageous embodiment of the invention which can be used in addition or alternatively to the above, in case it is determined to not establish the corresponding second data connection, the corresponding second data connection in the second network is not established during the handover. In case it is determined to establish the corresponding second data connection, the corresponding second data connection in the second network is established during the handover.

According to an advantageous embodiment of the invention which can be used in addition or alternatively to the above, wherein the first network is an Evolved UMTS Terrestrial Radio Access Network, E-UTRAN, and the second network is an UMTS Terrestrial Radio Access Network, UTRAN or a GSM EDGE Radio Access Network, GERAN.

According to an advantageous embodiment of the invention which can be used in addition or alternatively to the above, a forwarding connection is established between a mobility management entity of the first network and a Serving GPRS Support Node of the second network over which the small data is exchanged after finalizing the handover.

According to an advantageous embodiment of the invention which can be used in addition or alternatively to the above, the determining determines whether the data connection in the first network is used by the mobile node for user data exchange. In case the data connection is not used by mobile node for user data exchange, the corresponding second data connection is not established in the second network. In case the data connection is used by the mobile node for user data exchange, the corresponding second data connection is established in the second network.

According to an advantageous embodiment of the invention which can be used in addition or alternatively to the above, the determining is performed based on data statistics about user data exchanged by the mobile node over the data connection in the first network. Preferably the determining is performed at a mobility management entity in the first network, and the data statistics are acquired by the mobility management entity from either a core network node or a radio access node in the first network. Preferably, the step of determining is performed at a radio access node of the first network.

According to an advantageous embodiment of the invention which can be used in addition or alternatively to the above, the step considers at least one of the following:
  information on a priority value assigned to the data connection,
  information on whether the small data transmitted to the mobile node triggers the mobile node to respond by transmitting user data using the data connection, information on whether the mobility management entity is transmitting the small data using small data protocols or using non-small data protocols indication from the mobile node whether a data connection is needed by the mobile node or not.

According to an advantageous embodiment of the invention which can be used in addition or alternatively to the above, state information on the data connection is generated, based on the result of the determination. Preferably, a first state indicates that the corresponding second data connection shall not be established, and a second state indicates that the corresponding second data connection shall be established. The generated state information on the data connection is transmitted during the handover from a mobility management entity of the first network to a Serving GPRS Support Node of the second network. The Serving GPRS Support Node of the second network establishes the corresponding second data connection in the second network or not depending on the received state information on the data connection in the first network.

According to an advantageous embodiment of the invention which can be used in addition or alternatively to the above, the Serving GPRS Support Node receives from the mobility management entity of the first network context information relating to the data connection in the first network. The Serving GPRS Support Node generates second context information based on the received context information for the data connection from the mobility management entity. Advantageously, an association between the Serving GPRS Support Node and a serving gateway in the core network is established based on the second context information. In case the second data connection is not to be established in the second network, the Serving GPRS Support Node stores the second context information but does not establish the second data connection in the second network. In case the second data connection is to be established in the second network, the Serving GPRS Support Node stores the second context information and establishes the second data connection in the second network based on the generated second context information.

According to an advantageous embodiment of the invention which can be used in addition or alternatively to the above, the generated state information on the data connection is transmitted during the handover from a mobility management entity of the first network to the mobile node. The mobile node establishes the corresponding second data connection in the second network or not depending on the received state information on the data connection in the first network. Alternatively, the mobile node receives a handover instruction from the mobility management entity, and establishes or not the corresponding second data connection in the second network depending on whether particular information is missing in the received handover instruction or not. This particular information is the RAB ID(s) normally generated by the target RNC during the establishment of data bearers in the target radio network.

According to an advantageous embodiment of the invention which can be used in addition or alternatively to the above, the mobile node stores the context information relating to the data connection in the first network. The mobile node generates second context information relating to the second data connection based on the stored context information for the data connection.

According to an advantageous embodiment of the invention which can be used in addition or alternatively to the above, the handover is finalized successfully even in case the second data connection is not established in the second network.

The present invention further provides a mobility management entity for participating in a handover procedure of a mobile node from a first network served by the mobility management entity to a second network. The mobile node is attached with the first network to receive packet-switched services and small data. A signaling connection established in the first network is used by the mobile node to exchange the small data, and a data connection is established in the first network for the mobile node. The handover is performed to attach the mobile node for packet-switched services and small data with the second network. A processor of the mobility management entity determines whether a second data connection corresponding to the data connection is to be established in the second network, when the handover is performed. A transmitter of the mobility management entity instructs the second network and the mobile node to establish a second signaling connection in the second network, corresponding to the signaling connection in the first network. The transmitter further instructs the second network and the mobile node to establish or not the second data connection in the second network corresponding to the data connection in the first network, depending on the result of the determination.

According to an advantageous embodiment of the invention which can be used in addition or alternatively to the above, the processor, the transmitter and a receiver establish a forwarding connection between the mobility management entity and a Serving GPRS Support Node of the second network. The transmitter forwards the small data to the Serving GPRS Support Node after the handover is finalized.

According to an advantageous embodiment of the invention which can be used in addition or alternatively to the above, the processor performs the determining by determining whether the data connection in the first network is used by the mobile node for user data exchange. In case the data connection is not used by the mobile node for user data exchange, the transmitter instructs to not establish the second data connection in the second network, and in case the data connection is used by the mobile node for user data exchange, the transmitter instructs to establish the corresponding second data connection in the second network.

According to an advantageous embodiment of the invention which can be used in addition or alternatively to the above, the processor performs the determining based on data statistics about user data exchanged by the mobile node over the data connection in the first network, wherein a receiver receives the data statistics from either a core network node or a radio access node in the first network.

According to an advantageous embodiment of the invention which can be used in addition or alternatively to the above, the processor performs the determining based on at least one of the following:

Information on a priority value assigned to the data connection,

Information on whether the small data transmitted to the mobile node triggers the mobile node to respond by transmitting user data using the data connection, Information on whether the mobility management entity is transmitting the small data using small data protocols or using non-small data protocols, indication from the mobile node whether a data connection is needed by the mobile node or not.

According to an advantageous embodiment of the invention which can be used in addition or alternatively to the above, the processor generates state information on the data connection, based on the results of the determination. Preferably, a first state indicates that the corresponding second data connection shall not be established, and a second state indicates that the second data connection shall be established. The transmitter further transmits the generated state information on the data connection to a Serving GPRS Support Node of the second network.

According to an advantageous embodiment of the invention which can be used in addition or alternatively to the above, the transmitter further transmits the generated state information on the data connection during the handover to the mobile node.

One further aspect somewhat related to the above aspect of the improved handover is that the mobile node shall assist the determination in the source network as to whether or not to establish a second data connection in the target access. In particular, the mobile node knows whether it will use the data connection for user data exchange or not. In case only MO SMS data is to be transmitted in the uplink, or in case the MT SMS is not used for device triggering (mobile node does not transmit uplink user data in response to the MT SMS), the mobile node can transmit an indication to the MME or eNB in order to indicate this fact. The eNB or MME receiving this indication from the mobile node can thus infer therefrom that from the viewpoint of the mobile node only signaling connection is necessary. This inference can be useful when a handover from E-UTRAN to UTRAN (as explained in the previous aspect) is performed, and the eNB or MME needs to determine whether or whether not to establish a data connection in the target network (UTRAN), corresponding to the data connection in the E-UTRAN.

This indication to the eNB or MME can be transmitted e.g. when the mobile node transfers from IDLE to CONNECTED due to a MO SMS transmission; in this case, no data connection would be necessary, and when a handover to the UTRAN is performed, no data connection in the UTRAN shall be established.

Or, the indication to the eNB or MME can also be transmitted when the mobile node realizes from the measurements regularly transmitted to the eNodeB that a handover is imminent. In particular, the mobile node can infer from the inter-RAT measurements that the signals from another RAT are fulfilling the conditions for handover. Thus, the UE can anticipate that the eNodeB might initiate an inter-RAT handover to this better RAT. Especially in case the mobile node is currently attached to E-UTRAN and the other RAT is UTRAN (where no data connection is mandatory), the mobile node can indicate (to the MME) in addition to the measurements information that only SMS/signaling is used by the mobile node.

One further aspect of the invention relates to specific network scenarios where a PS-only delivery shall be ensured and where the mobile node uses ISR, i.e. is attached to the SGSN and MME at the same time but without the network knowing exactly in which network (either UTRAN of SGSN or E-UTRAN of MME) the mobile node is located. This scenario and the resulting problem were discussed in the Background Section in the chapter explaining ISR.

For ease of explanation, it is assumed in the following that the small data is encapsulated, i.e. transported, using a short message, SMS, although this must not always be the case as explained further. The following principles of this aspect shall not be considered to be restricted to only SMS, but may apply to other ways of small data exchange too.

According to this aspect of the invention, a default SMS serving node is defined for the SMS delivery to the mobile node, in case ISR is activated. In general, the default SMS serving node may be either the MME or the SGSN, and information on the default SMS serving node is stored in the network, such that when the SMS arrives, it is immediately clear to which serving node the SMS is to be transmitted for further delivery. How exactly the default SMS serving node is defined depends for example on the network configuration. For instance, the default SMS serving node is UE-specific, i.e. for each UE a different default SMS serving node can be specified in the HSS. Alternatively or in combination, the default SMS serving node is not (only) UE-specific, but also depends on the geographical area. Further, the native SMS capabilities of the nodes (SGSN and MME) are considered for specifying the default SMS serving node. Only a serving node supporting native SMS can be specified as default SMS serving node for a UE and/or area.

In order to allow paging and SMS transport between the MME and SGSN for SMS delivery as explained above, an association should be established similar to the SGs interface between the MME and MSC server. This can be part of the activation of the ISR mode. In particular, during the ISR mode activation, the MME and SGSN learn from each other and thus establish the S3 association during which the MM and SM context is established in both SGSN and MME. The S3 association could however be extended to allow for an SGs-like exchange of paging and SMS data transmission.

Considering the above, this aspect of the invention explained in the following allows to deliver the SMS in the packet-switched domain only, when the UE is in IDLE and has ISR activated. In general, the default SMS serving node receives the SMS destined to the mobile node, initiates the paging mechanism for its own network and also generates a paging message to be broadcast in the other network, this comprising the forwarding of the paging message to the other node. Depending on where the UE is located, either the default SMS serving node can directly forward the SMS to the UE, or the other node first retrieves the SMS from the default SMS serving node and then forwards the retrieved SMS to the UE in its network.

Assuming that the MME is configured to be the default SMS serving node for small data delivery for this particular mobile node, the network (i.e. SMS-SC) would direct the SMS to the MME being the default SMS serving node. The MME would receive the SMS from the SMS-SC over the SGd interface, and would page the UE in its own LTE network. Further, the MME would generate a paging message for being broadcast in the UTRAN and forwards this paging message to the SGSN, which in turn broadcasts the paging message in the UTRAN. This paging message may also indicate that the UE is paged for SMS transmission over the PS domain.

The UE responds to the paging received either in the UTRAN or E-UTRAN, depending on where the UE is located. The UE correspondingly transfers to CONNECTED mode and ISR is deactivated. The UE either attaches to SGSN or MME, depending on its location.

In case the UE is located in E-UTRAN, the UE responds to the paging of the MME in E-UTRAN. The MME can then transmit the SMS directly to the UE using the SM-CP/RP protocols.

In case the UE is located in UTRAN, the UE responds to the paging of the SGSN, and the SGSN informs the MME that the UE is located in the UTRAN and is being served by the SGSN. Further, when the paging message includes the indication as to the paging referring to SMS transmission over PS domain, only the signaling connection may be established in the UTRAN. The MME in response forwards the SMS over the S3 interface to the SGSN, which in turn may forward the SMS to the UE in UTRAN using the NAS protocols (NAS container) via the signaling connection.

Conversely, in case the SGSN is defined to be the default SMS serving node, the SGSN pages the UE in its own network and generates a paging message for paging in E-UTRAN, in response to receiving an MT SMS from the SMS-SC. The generated paging message is forwarded to the MME over the S3 interface, which in turn broadcasts same in its E-UTRAN network.

In case the UE is located in UTRAN, the UE responds to the paging of the SGSN, and the SGSN can directly transmit the SMS to the UE using the SM-CP/RP protocols terminated in the SGSN. In case the UE is located in E-UTRAN, the UE responds to the paging of the MME, the MME accordingly informs the SGSN that the UE is located in the E-UTRAN of the MME. The SGSN forwards the SMS to the MME over the S3 interface, and the MME may encapsulate the SMS in a transparent NAS container and then transmits the encapsulated NAS container to the UE in its network using the NAS protocol.

An alternative for this aspect is that the UE shall not attach to the network of the non-default SMS serving node (even if it currently camps therein), but instead that the UE shall perform a inter-RAT re-selection to the network of the default SMS serving node, if possible. In particular, it is assumed that the MME is the default SMS serving node, which receives the SMS and initiates the paging in its own network and in the network of the SGSN being the non-default SMS serving node. In case the UE is camping in UTRAN and thus receives the paging from the SGSN, the UE does not attach with the SGSN, but performs inter-RAT re-selection to be able to attach to the MME. Thus, the UE can receive the SMS directly from the MME. The same applies correspondingly, in case the SGSN is the default SMS serving node and the UE is camping at the E-UTRAN of the MME.

A further object of the invention is to provide an improved method of releasing radio resources in a communication system.

According to another aspect of the invention, the release of radio resources is controlled by the mobile node and postponed to make sure that the radio resources are only released when they are indeed not needed anymore. This avoids the problem that radio resources are released too early, such that radio resources need to be re-established shortly after their release.

The following scenario is assumed for explaining the main principles of the invention. A mobile node is in idle mode and is about to receive or transmit a short message, i.e. an SMS. The SMS may include small data destined for or originating from an MTC application of the mobile node (e.g. MTC device).

A first general embodiment of the invention is given in the following.

In more detail, the mobile node monitors incoming data traffic. When it receives an SMS or the acknowledgment for an SMS, that it previously transmitted to the core network, it starts a timer. The purpose of the timer is to postpone the radio resource release for a particular time. The timer can be aborted through various events, such as an imminent further uplink/downlink transmission from/to the mobile node. Or, in case the received SMS triggers user plane data bearer establishment for user data transmission, the timer is aborted too. In general, it can be said that the timer is aborted, or not even started, by the mobile node, if it is clear that the radio resources will be used, further to the data exchange which initiated the timer in the first place.

If no such events occur, i.e. if it is not apparent that the radio resources will be used in the near future, the timer eventually expires and triggers the transmission of a radio resource release indication to the core network, and in particular to the mobility management entity responsible for the mobile node and responsible for initiating the radio resource release procedure.

The radio resource release indication may be transmitted to the mobility management entity in various ways. For instance, it might be transmitted in a separate message or may be included in a message that is already to be transmitted to the mobility management entity, such as an acknowledgement of the received short message. The indication itself may be in any appropriate format, such as indication to change into idle state or indicating that the uplink buffer in the mobile node is zero.

The particular time of the radio resource release timer in the mobile node is implementation specific, and may be for example in the range of several hundreds or thousands of milliseconds.

The present invention provides a method for controlling the release of radio resources in a communication system, wherein a user equipment is able to receive and/or transmit short messages of the short message service using the radio resources. In the user equipment incoming data is monitored to determine reception of a downlink short message or an acknowledgement for an uplink short message previously transmitted by the user equipment. When the reception of the downlink short message or the uplink short message acknowledgement is determined, a radio resource release timer is started. The radio resource release timer is stopped in case uplink data is to be transmitted from the user equipment to the core network. When the radio resource release timer expires, the core network is instructed to release the radio resources for the user equipment.

According to an advantageous embodiment of the invention which can be used in addition or alternatively to the above, the radio resource release timer is started, additionally or alternatively to the reception of the downlink short message or the uplink short message acknowledgement, when an upper layer of the user equipment indicates the radio resource release.

According to an advantageous embodiment of the invention which can be used in addition or alternatively to the above, the radio resource release timer is stopped in case a further uplink short message is to be transmitted from the user equipment to the core network, or in case user plane radio resources are to be established.

According to an advantageous embodiment of the invention which can be used in addition or alternatively to the above, the step of instructing the core network to release the radio resources includes the step of:

transmitting a release message including an idle-indication to the mobility management entity responsible for the user equipment, or transmitting a release message including information about the uplink transport buffer in the user equipment being zero to the mobility management entity responsible for the user equipment.

According to an advantageous embodiment of the invention which can be used in addition or alternatively to the above, the release message further includes the acknowledgement of the received short message. Alternatively, the release message is the acknowledgement of the received downlink short message. Alternatively, when the release message does not include the acknowledgement of the received downlink short message, the acknowledgement of the received downlink short message is transmitted to the mobility management entity in a separate message before the expiry of the radio resource release timer.

According to an advantageous embodiment of the invention which can be used in addition or alternatively to the above, the radio resource release timer expires before a maximum time for expecting the acknowledgement to be received in the core network from the user equipment for a downlink short message received in the user equipment. Additionally or as an alternative, the radio resource release timer expires before an inactivity timer in a eNodeB.

According to an advantageous embodiment of the invention which can be used in addition or alternatively to the above, the mobility management entity responsible for the user equipment initiates a radio resource release procedure with an eNodeB and the user equipment in response to an instruction to release the radio resources from an upper layer.

According to an advantageous embodiment of the invention which can be used in addition or alternatively to the above, the mobility management entity initiates the radio resource release procedure only in response to a resource release indication from a short message upper layer entity.

According to an advantageous embodiment of the invention which can be used in addition or alternatively to the above, the radio resource release timer is only started for a downlink short message that is not part of a set of concatenated downlink short messages or for a downlink short message that is the last one out of a set of concatenated downlink short messages.

According to an advantageous embodiment of the invention which can be used in addition or alternatively to the above, the user equipment processes the header information of a received downlink short message to determine whether the received downlink short message is part or not of the set of concatenated downlink short messages, or is the last one out of the set of concatenated downlink short messages.

According to an advantageous embodiment of the invention which can be used in addition or alternatively to the above, at least one upper layer application exchanges data with the core network. In said case, the step of instructing the core network to release radio resources is also performed when the at least one upper layer application indicates the end of the data exchange.

The present invention provides a user equipment for controlling the release of radio resources in a communication system, wherein the user equipment is able to receive and/or transmit short messages of the short message service using the radio resources. A receiver and a processor of the user equipment monitor incoming data to determine reception of a downlink short message or an acknowledgment for a uplink short message previously transmitted by the user equipment. The processor starts a radio resource release timer, when the processor determines the reception of the downlink short message or the uplink short message acknowledgement. The processor stops the radio resource release timer, in case uplink data is to be transmitted from the user equipment to the core network. The processor and a transmitter instruct the core network to release the radio resources for the user equipment, when the radio resource release timer expires.

According to an advantageous embodiment of the invention which can be used in addition or alternatively to the above, additionally or alternatively to the reception of the downlink short message or the uplink short message acknowledgement, the processor starts the radio resource release timer when an upper layer of the user equipment indicates the radio resource release.

According to an advantageous embodiment of the invention which can be used in addition or alternatively to the above, the processor stops the radio resource release timer in case a further uplink short message is to be transmitted from the user equipment to the core network, or in case user plane radio resources are to be established.

According to an advantageous embodiment of the invention which can be used in addition or alternatively to the above, the processor and transmitter instruct the core network to release the radio resources for the user equipment by:
transmitting a release message including an idle indication to the mobility management entity responsible for the user equipment, or
transmitting the release message as the acknowledgement of the received downlink short message, or
transmitting a release message including information about the uplink transport buffer in the user equipment being zero to the mobility management entity responsible for the user equipment.

According to an advantageous embodiment of the invention which can be used in addition or alternatively to the above, the processor and transmitter transmit the acknowledgement of the received downlink short message to the mobility management entity in a separate message before the expiry of the radio resource release timer, when the release message does not include the acknowledgement of the received downlink short message.

According to an advantageous embodiment of the invention which can be used in addition or alternatively to the above, the processor configures the radio resource release timer to expire before a maximum time for expecting the acknowledgement to be received in the core network from the user equipment for a short message received in the user equipment. Additionally or as an alternative, the processor configures the radio resource release timer to expire before an inactivity timer in an eNodeB.

According to an advantageous embodiment of the invention which can be used in addition or alternatively to the above, the processor, receiver and transmitter participate in a radio resource release procedure initiated by a mobility management entity in response to the instruction to the core network to release the radio resources for the user equipment.

According to an advantageous embodiment of the invention which can be used in addition or alternatively to the above, the processor starts the radio resource release timer only for a short message determined to be not part of a set of concatenated downlink short messages or the last one out of a set of concatenated downlink short messages, preferably by processing the header information of the received downlink short message.

According to an advantageous embodiment of the invention which can be used in addition or alternatively to the above, at least one upper layer application exchanges data with the core network. In said case, the processor instructs the core network to release radio resources when the at least one upper layer application indicates the end of data exchange.

The invention further provides a mobility management entity for controlling the release of radio resources in a communication system, wherein a user equipment is able to receive and/or transmit short messages of the short message service using the radio resources. A processor and a transmitter of the mobility management entity initiate a radio resource release procedure with an eNodeB and the user equipment to release the radio resources for the user equipment in response to an instruction to release the radio resources for the user equipment from an upper layer and an indication from the user equipment.

According to an advantageous embodiment of the invention which can be used in addition or alternatively to the above, only in response to a resource release indication from a short message upper layer entity and an idle indication from the user equipment, the processor and transmitter initiate the radio resource release procedure.

The invention further provides a mobility management entity for controlling the release of radio resources in a communication system, wherein a user equipment is able to receive and/or transmit short messages of the short message service using the radio resources. A processor of the mobility management entity starts a radio resource release timer, when a receiver receives a resource release indication from a short message service center. The processor stops the radio resource release timer, in case uplink or downlink data is to be transmitted for the user equipment. The processor generates an internal instruction to release the radio resources for the user equipment, when the radio resource release timer expires. The processor and a transmitter initiate a radio resource release procedure with an eNodeB and the user equipment to release the radio resources for the user equipment in response to the generated internal instruction.

According to an advantageous embodiment of the invention which can be used in addition or alternatively to the above, the processor stops the radio resource release timer when the receiver receives a message from the user equipment relating to the establishment of user plane radio resources.

According to an advantageous embodiment of the invention which can be used in addition or alternatively to the above, the processor starts the radio resource release timer only when the receiver receives an acknowledgment message from the user equipment for acknowledging the downlink short message.

A further object of the invention is to provide an improved method of transmitting small data to a user equipment.

This is solved by triggering the user equipment to only establish a connection for the control plane and not the user plane, when the small data is to be pending for the user equipment.

These principles can be applied to user equipments that are in IDLE mode or in DEREGISTERED mode. When the user equipment is in IDLE mode, then the user equipment does not have any control plane or user plane connectivity with the core network; however, the core network has UE contexts stored, including information on the location, bearers etc of the user equipment. When the user equipment is in DEREGISTERED mode, then the user equipment also does not have any control plane or user plane connectivity with the core network; furthermore, the core network usually does not store any contexts from the user equipment, apart from a identification and general location where the user equipment may be.

It is assumed that the user equipment is in IDLE mode or DEREGISTERED. The core network receives small data destined for the user equipment. However, since the user equipment is not connected to the core network, the small data cannot be forwarded to the user equipment. Correspondingly, the user equipment needs to be triggered by the core network so as to connect to the core network for receiving the small data. Since the data destined for the user equipment is only small data, the small data is to be transmitted only using the control plane, i.e. without using user plane.

Correspondingly, the trigger message that is sent to the user equipment includes an indication for informing the user equipment that it should only establish control plane connectivity with the core network. In accordance with the trigger message and the included control plane only indication, the user equipment can begin establishing bearer in the control plane. The established control plane connectivity, i.e. the bearer in the control plane, can then be used by the core network to provide the small data to the user equipment.

In case the user equipment is in IDLE mode, the above-mentioned trigger message is a paging message transmitted from the core network, which is extended by an indication, such as a flag, for distinguishing whether the user equipment should establish control plane only connectivity, or should establish both control plane and user plane connections.

In case the user equipment is to transmit uplink data, e.g. in response to the received small data in the downlink, is the uplink data is sufficiently small, the user equipment can also transmit the uplink data using the bearer in the control plane, i.e. without needing to established user data bearer of the user plane for said purpose.

One entity of the control network is usually responsible for triggering the user equipment, when the user equipment is either not attached (DEREGISTERED) to the core network or in IDLE mode. The entity, in the following also called connectivity-related network entity, is usually the mobility management entity (MME) in the core network. The MME transmits the paging request message to the eNodeBs so as to page the user equipment(s). The MME could also be the entity for triggering the user equipment when the user equipment is DEREGISTERED so that the user equipment attaches to the base station (eNodeB).

The small data may be received in the connectivity-related network entity, which then identifies the user equipment to which the small data is destined. Then, it triggers (e.g. pages) the corresponding user equipment in order to transit from IDLE/DEREGISTERED mode to CONNECTED mode for receiving the small data. In this case, the small data may be either received from the circuit-switched network via an SMS or from the packet-switched circuit from a PDN gateway and a serving gateway.

Alternatively, the connectivity-related network entity may not receive the small data itself but another trigger message or indication relating to the small data. For instance, in case the small data is received via the packet-switched network and is forwarded from the PDN-gateway to the serving gateway, the serving gateway may identify the small data as small data, and may thus trigger the connectivity-related network entity (e.g. MME) to trigger/page the user equipment for control plane connectivity only.

The advantage provided by the procedure of the first aspect is that no data bearers, i.e. user plane, is established, since the user equipment knows from the trigger message that only control plane connectivity is necessary for receiving the downlink small data from the network.

According to further aspects, the above-explained transmission of the small data is changed in order to also consider the uplink data which is to be transmitted from the user equipment. For instance, it may be assumed that the user equipment has to transmit uplink data to the core network, e.g. in response to the small data that it receives or simply because uplink data is pending in the user equipment which should be transmitted the next opportunity when the user equipment attaches to the network.

Correspondingly, in case the user equipment receives the trigger message from the core network so as to connect to the network for receiving downlink small data, the user equipment determines whether there is uplink data pending to be transmitted to the network. Furthermore, the user equipment determines whether uplink data is to be transmitted to the network in response to the small data. In particular, though the user equipment does not receive the small data (but only the trigger message including an indication), it may estimate from previous statistics or depending on application configurations whether uplink data is to be transmitted, and if so, may also determine further details of the uplink data, such as how much uplink data and how often (periodicity) the uplink data should be transmitted.

Based on that determined information the user equipment can decide on whether control plane connectivity suffices or not to also transmit the uplink data towards the core network. If the user equipment decides that control plane signalling is enough to support the transmission of the uplink data, then the user equipment merely initiates the establishment of the control plane connectivity and, after establishing same, transmits the uplink data using the control plane only, i.e. without user plane connectivity. Additionally, the user equipment may transmit within one of the messages for control plane establishment an indication that control plane only connectivity is enough. In this way, the connectivity-related network entity may learn that also the user equipment only wants to establish the control plane without the user plane.

However, if the user equipment determines that the control plane is not enough for transmitting the pending or estimated future uplink data, control plane and user plane connectivity should be established. Accordingly, the user equipment may transmit within one of the messages for control plane establishment an indication that user plane connectivity is desired/needed.

The connectivity-related network entity therefore not only establishes the signalling bearers of the control plane but also data bearers of the user plane.

Alternatively, instead of determining in the user equipment the need for user plane or not, the user equipment may also include information on the pending or estimated future uplink data within one of the messages for control plane establishment. In said case, the connectivity-related network entity receives that information and can itself decide on whether user plane connectivity is also needed to allow transmission of the uplink data from the user equipment. The connectivity-related network entity can base its decision on the received information, and in addition, may optionally also consider further parameters such as possible limitations in the connectivity-related network entity for processing the uplink data. In more detail, when the uplink data is transmitted using control plane signalling, the uplink data would be transmitted via the base station to the connectivity-related network entity. Depending on the load or configurations (e.g. max uplink data etc) in the connectivity-related network entity, the connectivity-related network entity may decide for or against transmitting the uplink data via control plane.

In any way, control plane and user plane connectivity is established between the user equipment and the network. The downlink data and the uplink data can thus be transmitted over the established user plane connection.

According to a still further aspect, the above-explained procedure is extended such that the user equipment also may take the decision on whether to establish a user plane connection, in case no such decision has been taken. In particular, it is assumed that the user equipment, upon receiving the trigger message did not decide to establish the user plane, and also the connectivity-related network entity did not take decision to establish the user plane, then the user equipment can again decide whether a user plane connection is necessary to transmit the uplink data or not, upon receiving the downlink small data.

This is particularly advantageous for the case in which the estimation on the possible future uplink data (in response to the downlink small data to be received) is incorrect, and more uplink data will be transmitted. The control plane is already established, and the downlink small data is transmitted from the connectivity-related network entity to the user equipment. Upon receiving the small data, the user equipment can exactly determine the uplink data which is to be transmitted to the network now and in the near future. Therefore, the user equipment can decide again on basis of the new information on the uplink data, whether user plane connections would be necessary or not.

The decision by the user equipment can also be based on further information, e.g. relating to the processing in the connectivity-related network entity. In particular, as explained before, limitation or configuration parameters may be also considered for deciding on whether the uplink data can be transmitted over the control plane or over the user plane. The connectivity-related network entity can determine such limitation information and can transmit it to the user equipment during the control-plane establishment procedure.

The user equipment thus can check the "exact" uplink data against the information from the connectivity-related network entity for determining whether the connectivity-related network entity can process the amount of uplink data over the control plane or not.

If no user plane connection is necessary, the user equipment just proceeds with transmitting the uplink data using control plane signalling. On the other hand, if the user equipment decides that the uplink data should be transmitted over the user plane, it triggers the establishment of the user plane connection. After having user-plane connectivity, the uplink data and possible further downlink small data is transmitted via the user plane connections.

In summary, according to the various aspects, the transmission of downlink small data is initially planed via control plane signalling. However, in the course of establishing the control plane and also after the establishing, it is possible to decide (either in the connectivity-related network entity or the user equipment) on whether a user plane is to be transmitted as well (e.g. in view of the uplink data to be transmitted from the user equipment). For said purpose, different information is exchanged between the user equipment and the connectivity-related network entity for taking said decision.

According to an example to better understand the invention, a method is provided for transmitting downlink small data packets to a user equipment subscribed to a mobile communication network comprising a base station. The user equipment is triggered by a connectivity-related network entity to establish connectivity with the mobile communication network via the control plane only. The user equipment and the connectivity-related network entity establish control plane connectivity for the user equipment, in response to the triggering. The downlink small data packets are transmitted to the user equipment using the established control plane connectivity.

According to an advantageous example which can be used in addition or alternatively to the above, when the user equipment is in an IDLE state, the triggering includes transmitting to the user equipment a paging message comprising a control-plane-only indication. In said case, the connectivity-related network entity is a mobility management entity of the user equipment. Or, when the user equipment is in a DEREGISTERED state, the triggering includes transmitting to the user equipment a device trigger message comprising a control-plane-only indication. In said case, the connectivity-related network entity is a mobility management entity.

According to an advantageous example which can be used in addition or alternatively to the above, the downlink small data packets are transmitted to the user equipment using non-access stratum messages of the control plane.

According to an advantageous example which can be used in addition or alternatively to the above, the downlink small data packets are received in the connectivity-related network entity, and are transmitted from the connectivity-related network entity to the base station using signalling messages, and are transmitted from the base station to the user equipment using RRC, Radio Resource Control, messages.

According to an advantageous example which can be used in addition or alternatively to the above, the connectivity-related network entity determines to trigger the user equipment for control plane connectivity only, based on the time point of the connectivity establishment, and/or on the interface from which the connectivity-related network entity receives a trigger to trigger the user equipment.

According to an advantageous example which can be used in addition or alternatively to the above, the user equipment and the connectivity-related network entity have context information stored, relating to the establishment of user plane connectivity and control plane connectivity. Nevertheless, the connectivity-related network entity decides to establish control plane connectivity only. And the connectivity-related network entity makes sure that only the control plane is established.

According to an advantageous example which can be used in addition or alternatively to the above, in case the downlink small data packets are received by the connectivity-related network entity, the triggering by the connectivity-related network entity is triggered by receiving the downlink small data packets. In case the downlink small data packets are received by a gateway, the triggering by the connectivity-related network entity is triggered by receiving a connection initiation message from the gateway, the connection initiation message including information on the downlink small data packets.

According to an advantageous example which can be used in addition or alternatively to the above, in case the downlink small data packets are received by a gateway, the downlink small data packets are transmitted from the gateway to the connectivity-related network entity using control plane signalling.

According to an advantageous example which can be used in addition or alternatively to the above, the user equipment starts a control-plane establishment timer when initiating the establishing of the control plane connectivity, in response to the triggering. The control-plane establishment timer is stopped, upon establishing the control plane connectivity with the mobile communication network.

According to an advantageous example which can be used in addition or alternatively to the above, the user equipment estimates characteristics of uplink data to be transmitted in response to the downlink small data packets, in response to the triggering. The user equipment transmits the estimated characteristics of the uplink data to the connectivity-related network entity. The connectivity-related network entity decides on whether to establish data bearers, based on the received characteristics of the uplink data. In case the connectivity-related network entity decides to establish data bearers, downlink small data packets are transmitted to the user equipment using the established data bearers. Also, the uplink data is transmitted from the user equipment using the established data bearers. In case the connectivity-related network entity decides not to establish data bearers, downlink small data packets are transmitted to the user equipment using the established control plane connectivity.

According to an advantageous example which can be used in addition or alternatively to the above, the decision by the connectivity-related network entity is further based on limitation parameters related to the processing of uplink data received in the connectivity-related network entity.

According to an advantageous example which can be used in addition or alternatively to the above, in case the connectivity-related network entity decides to not establish data bearers, the connectivity-related network entity determines limitation parameters related to the processing of uplink data received in the connectivity-related network entity. The connectivity-related network entity transmits the determined limitation parameters to the user equipment. The user equipment determines the uplink data to be transmitted, based on the received downlink small data packets. The user equipment decides on whether to establish data bearers to transmit the uplink data, depending on the received limitation parameters and based on the determined uplink data to be transmitted. Then, in case the user equipment decides to establish data bearers, the uplink data is transmitted using the established data bearers, and the downlink small data packets are transmitted using the established data bearers. In case the user equipment decides not to establish data bearers, the uplink data is transmitted using the established control-plane connectivity.

According to an advantageous example which can be used in addition or alternatively to the above, the characteristics of the uplink data includes information on the amount and/or periodicity of the uplink data and/or an indication on whether the uplink data is small or large.

A user equipment is provided for receiving downlink small data packets, the user equipment being subscribed to a mobile communication network comprising a base station. A receiver of the user equipment receives a trigger message from a connectivity-related network entity to establish connectivity with the mobile communication network via the control plane only. A processor of the user equipment, a transmitter of the user equipment and the receiver establish control plane connectivity with the connectivity-related network entity, in response to the trigger message. The receiver receives the downlink small data packets using the established control plane connectivity.

According to an advantageous example which can be used in addition or alternatively to the above, when the user equipment is in an IDLE state, the receiver is adapted to receive a paging message as trigger message.

According to an advantageous example which can be used in addition or alternatively to the above, the receiver receives the downlink small data packets from the base station using RRC, Radio Resource Control, messages.

According to an advantageous example which can be used in addition or alternatively to the above, the processor starts a control-plane establishment timer when initiating the establishing of the control plane connectivity. The processor then stops the control-plane establishment timer, upon establishing control plane connectivity with the mobile communication network.

According to an advantageous example which can be used in addition or alternatively to the above, the processor of the user equipment estimates characteristics of uplink data to be transmitted in response to the downlink small data packets, in response to receiving the trigger message. The transmitter transmits the estimated characteristics of the uplink data to the connectivity-related network entity, such that the connectivity-related network entity decides on whether to establish data bearers, based on the transmitted characteristics of the uplink data. In case the connectivity-related network entity decides to establish data bearers, the receiver, transmitter and processor establish the data bearers. The receiver receives downlink small data packets using the established data bearer. The transmitter transmits the uplink data using the established data bearer.

According to an advantageous example which can be used in addition or alternatively to the above, in case the connectivity-related network entity decides to not establish data bearers, the receiver receives limitation parameters from the connectivity-related network entity, related to the processing of uplink data received in the connectivity-related network entity. The processor determines the uplink data to be transmitted, based on the received downlink small data packets. The processor decides whether to establish data bearers to transmit the uplink data, depending on the received limitation parameters and based on the determined uplink data to be transmitted. In case the processor decides to establish data bearer, the transmitter, receiver, processor establish the data bearer. The transmitted transmits the uplink data using the established data bearer, and the receiver receives downlink small data packets using the established data bearer.

A connectivity-related network entity is provided for transmitting downlink small data packets to a user equipment subscribed to a mobile communication network comprising a base station. A transmitter transmits a trigger message to the user equipment to establish connectivity with the mobile communication network via control plane only. A processor, receiver and the transmitter establish control plane connectivity for the user equipment. The transmitter transmits the downlink small data packets to the user equipment using the established control plane connectivity.

According to an advantageous example which can be used in addition or alternatively to the above, when the user equipment is in an IDLE sate, the transmitter transmits a paging message as the trigger message, comprising a control-plane only indication. In said case, the connectivity-related network entity is a mobility management entity of the user equipment.

According to an advantageous example which can be used in addition or alternatively to the above, the transmitter transmits the downlink small data packets using non-access stratum messages of the control plane.

According to an advantageous example which can be used in addition or alternatively to the above, the user equipment and the connectivity-related network entity have context information stored, relating to the establishment of user plane connectivity and control plane connectivity. The processor of the connectivity-related network entity decides to establish control plane connectivity only, and later during establishment it is made sure that only the control plane is established.

According to an advantageous example which can be used in addition or alternatively to the above, the processor determines to trigger the user equipment for control plane connectivity only, based on the time point of the connectivity establishment, and/or on the interface from which the receiver receives a trigger to trigger the user equipment.

According to an advantageous example which can be used in addition or alternatively to the above, in case the downlink small data packets are received by the connectivity-related network entity, the transmission of the trigger message is triggered by the receiver receiving the downlink small data packets. Alternatively, in case the downlink small data packets are received by a gateway of the mobile communication network, the transmission of the trigger message is triggered by the receiver receiving a connection initiation message from the gateway, the connection initiation message including information on the downlink small data packets.

According to an advantageous example which can be used in addition or alternatively to the above, the receiver receives from the user equipment characteristics of uplink data to be transmitted by the user equipment in response to the downlink small data packets. The processor decides on whether to establish data bearers, based on the received characteristics of the uplink data. In case the processor decides to establish data bearer, the receiver, processor and transmitter establish data bearer. The transmitter transmits downlink small data packets to the user equipment using the established data bearer. The receiver receives uplink data using the established data bearer.

According to an advantageous example which can be used in addition or alternatively to the above, the decision is further based on limitation parameters related to the processing of uplink data received in the connectivity-related network entity.

According to an advantageous example which can be used in addition or alternatively to the above, in case the processor decides not to establish data bearer, the processor determines limitation parameters related to the processing of uplink data received in the connectivity-related network entity. The transmitter transmits the determined limitation parameters to the user equipment, for the user equipment to decide on whether to establish data bearer to transmit the uplink data. In case the user equipment decides to establish data bearer, the receiver receives uplink data using the established data bearer, and the transmitter transmits downlink small data packets to the user equipment using the established data bearer.

BRIEF DESCRIPTION OF THE FIGURES

In the following the invention is described in more detail with reference to the attached figures and drawings.

FIG. 25-28 show the different possible routes for SMS delivery according to the prior art.

DETAILED DESCRIPTION

Definitions

Figure 1:
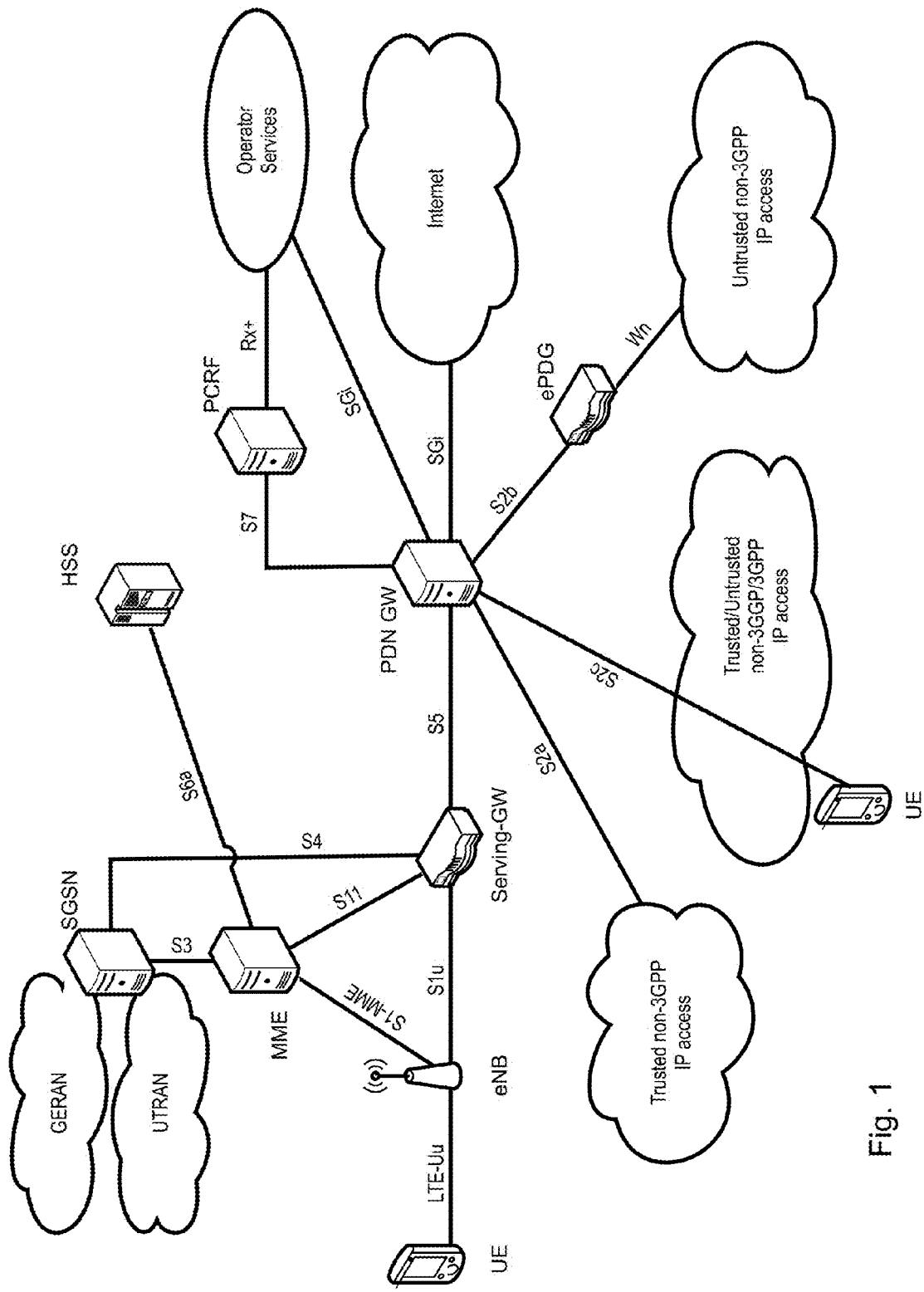
FIG. 1 shows an exemplary architecture of a 3GPP LTE system.
Figure 2:
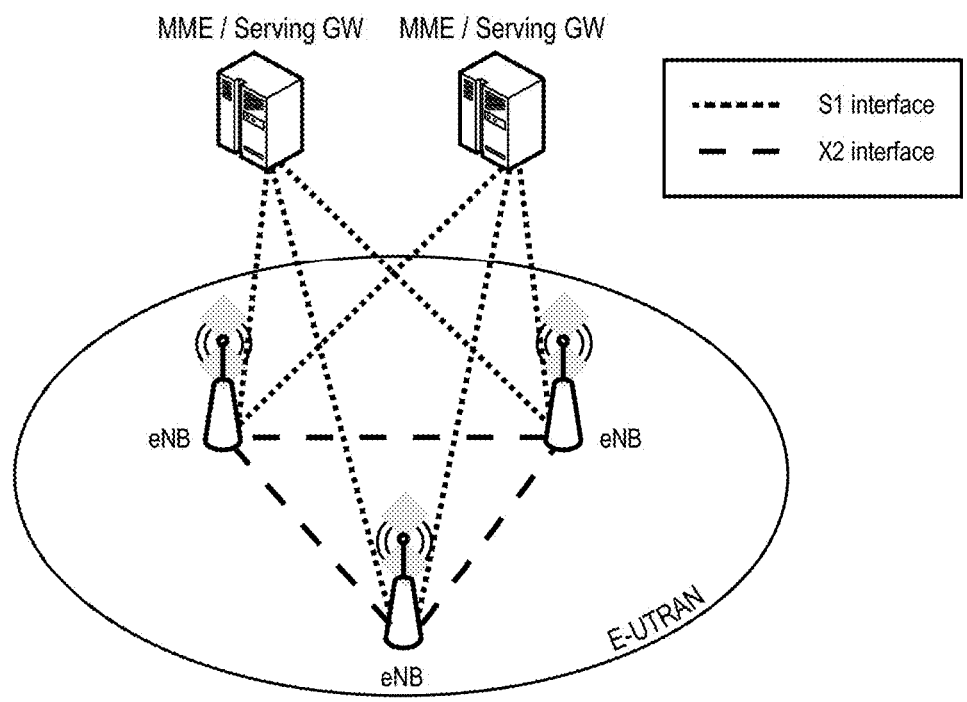
FIG. 2 shows an exemplary overview of the overall E-UTRAN architecture of 3GPP LTE.
Figure 3:
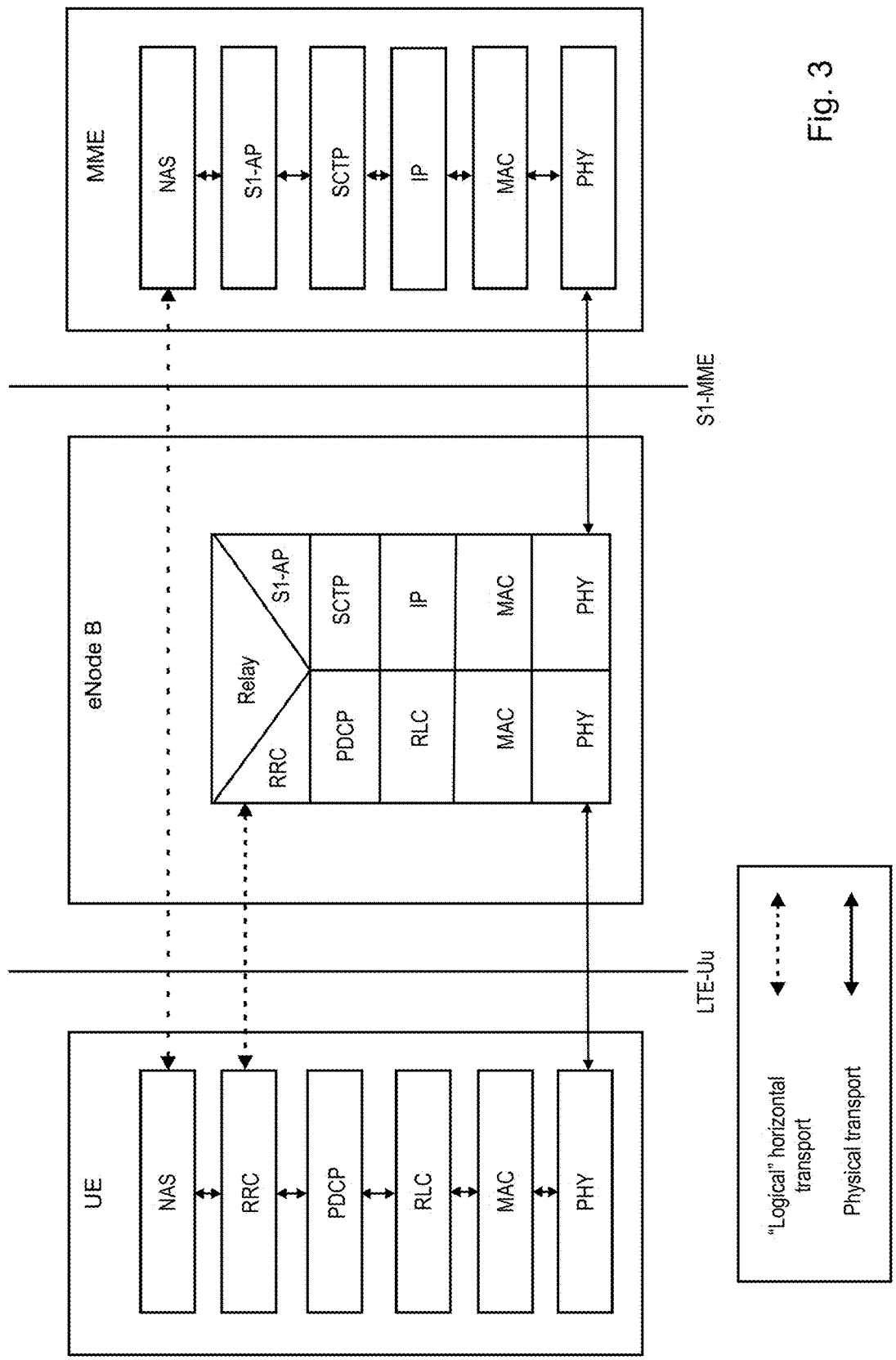
FIG. 3 shows a control-plane protocol stack between UE and MME as used for LTE, including the access stratum and non-access stratum protocols.
Figure 4:
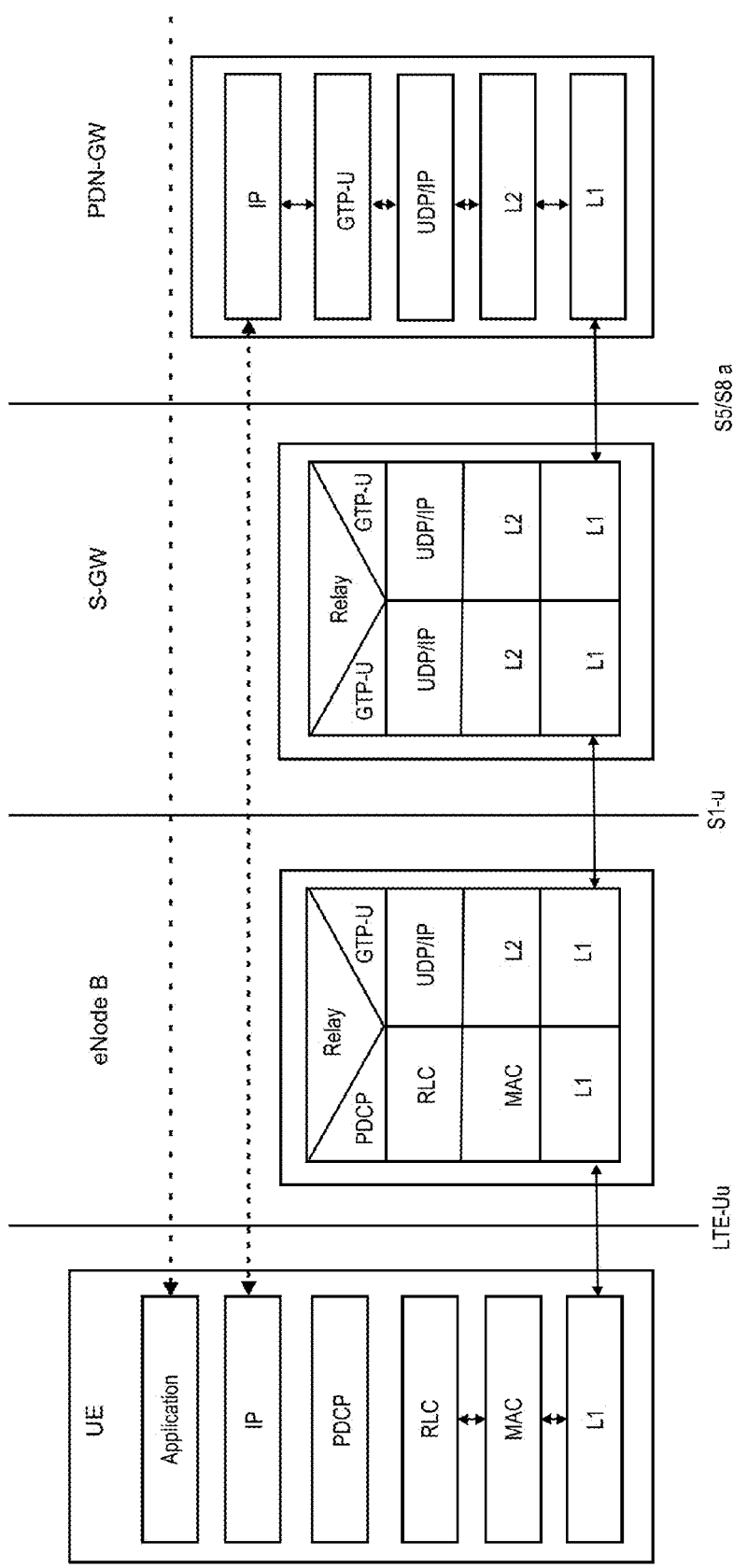
FIG. 4 shows a user-plane protocol stack between the UE, eNodeB, S-GW and PDN-GW.

In the following a definition of a few terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

An MTC device may be understood as a functional entity within a communication network, which may or may not be co-located with a mobile node. The MTC device is adapted or optimized to the requirements of Machine-Type communications.

Small data may be understood as small chunk of data, which could be a small IP packet (e.g. up to 1000 bytes), SMS or some other application specific data. Though the term "small data" is already used in the current standardization, its exact meaning is not decided. A common, though not mandatory, understanding is that the data is small enough to fit in an SMS. Correspondingly, small data can be smaller than 140 bytes, which is the payload of an SMS. Therefore, in the present invention small data may also be understood as an SMS. However, as explained above, a decision will be taken in the near future by the standardization in said respect. The present invention and its embodiments are then applicable to the small data as decided.

The term "subscribed" may be understood as that, when a user equipment is subscribed to utilize the network resources, the network at least knows enough to support the user equipment to attach to the network. In particular, this could be an identification of the user equipment, such as the IMSI, information which resources the user equipment is allowed to utilize in the network, information about the user capabilities. Furthermore, in order to allow an efficient "search" for the user equipment, the network may know an approximate location of the user equipment. In case the user equipment is in IDLE mode, the network has stored context data in the core network, including the IMSI, possible tracking area(s), bearer contexts (EPS, SRB), so as to enable paging of the user equipment.

Some embodiments distinguish between data bearer (or data connection) and control plane connectivity (i.e. signalling connection/bearer). Basically, data bearer are associated and part of the user plane, and are established to transport user data; in contrast to the control plane and signalling bearers which in general transport control signalling between the user equipment and the network.

The term "attach" or "attached" as used in some of the embodiments can be understood as that the user equipment is registered with the network to receive and send data. In "attached" state the network knows, at least approximately, the location of the user equipment, so that the user equipment is reachable for arriving data (mobile terminated data).

The term "handover" is used mainly in the context of CONNECTED mode mobility; "handover" also means that the uplink or downlink data is forwarded or re-directed from the source point (BS, NodeB, eNodeB, or just access network) to the target point (BS, Node, eNodeB, or just access network).

In the following, several examples will be explained in detail. The explanations should not be understood as limiting the invention, but as a mere example of the invention's embodiment to better understand the invention. A skilled person should be aware that the general principles of the invention as laid out in the claims can be applied to different scenarios and in ways that are not explicitly described herein.

According to one example, some of the problems of the prior art are solved by triggering the user equipment to only establish a connection for the control plane and not the user plane, when the small data is to be pending for the user equipment. A detailed explanation is given with reference to FIGS. 7 and 8.

Figure 7:
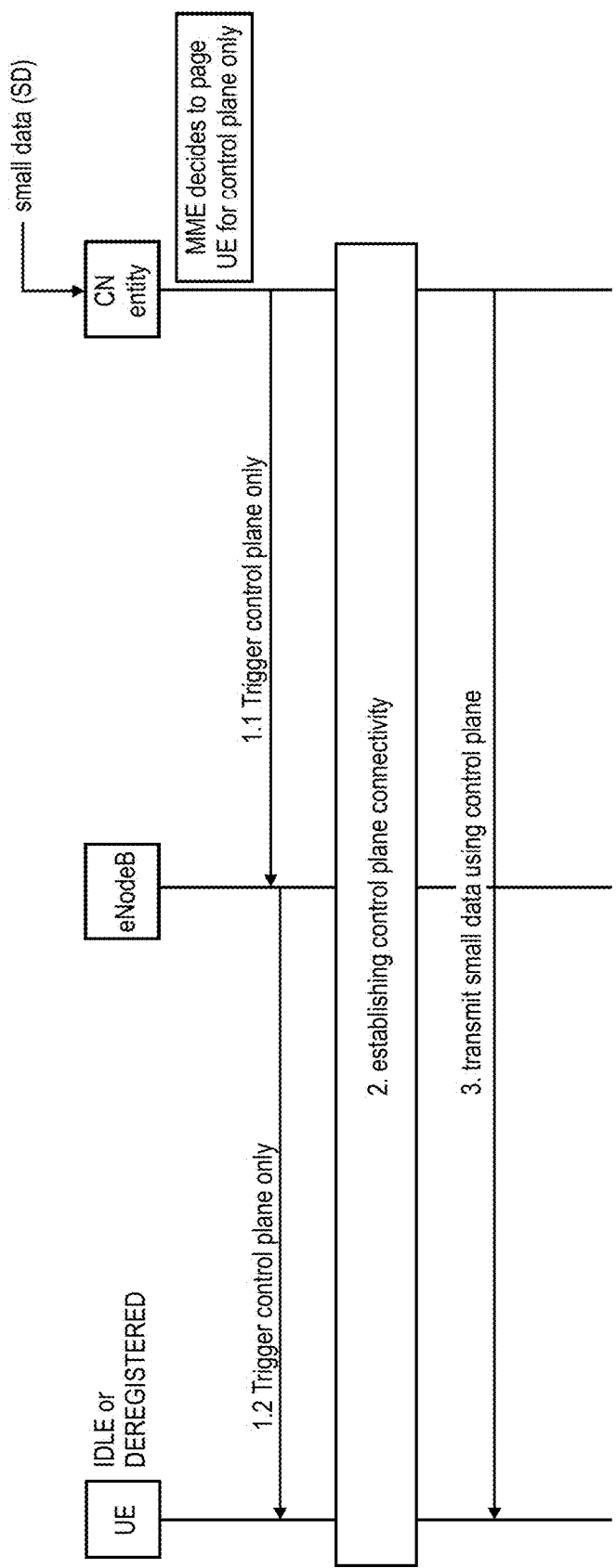
FIG. 7 is a signalling diagram illustrating control plane only paging in connection with small data transmission.

FIG. 7 discloses a basic example, in which it is assumed that the core network, i.e. a core network entity, receives small data destined for the user equipment. The user equipment is not attached to the network, i.e. is deregistered, or in idle mode; in any case does not have connections with the network to receive the small data. The core network entity (denoted in the following: connectivity-related network entity) responsible for triggering the user equipment to connect to the network when downlink data is pending, triggers the user equipment via the eNodeB of the radio cell in which the user equipment camps. Since the downlink data is small, the connectivity-related network entity decides to trigger the user equipment only for control plane. Correspondingly, the trigger message comprises an appropriate indication, such as a flag, to instruct the user equipment to only establish and expect control plane connectivity. The user equipment and the connectivity-related network entity establish a control plane connection between them, over which the downlink small data can be transmitted.

The advantages of using control plane only are among others that signalling, delay and overall traffic can be reduced, resources in the network can be saved and processing power in the UE can be lowered. Since the number of bytes consumed by the small data are usually much smaller than the number of bytes consumed by the user plane establishment signalling, the overall traffic in the network can be reduced significantly in case many UEs are configured for "small data" and this is likely especially for Machine-Type devices. Further, due to the use of only control plane signalling, the UE does not need to transit to CONNECTED state and therefore, radio measurement reporting, mobility on eNodeB level and consequently UE power can be saved.

As explained above, the connectivity-related network entity decides to page the user equipment for control plane only when it receives small data. In other words, the connectivity-related network entity determines whether the received data is "small data", i.e. and correspondingly pages the user equipment with or without the control-plane-only indication. In other embodiments the decision to page for control plane only does not only depend on whether the received data is small or not, but may depend on further aspects, such as the time of the day, the interface from which the data was received, or only in case a special indication is received in addition to the small data. Based on those aspects the connectivity-related network entity may be able to determine whether further data will be transmitted or whether load on some network entities will become critically and therefore use of user plane is preferred.

Another aspects relates to the contexts that the user equipment have stored when the user equipment is in IDLE mode. In particular, when the user equipment changes from CONNECTED to IDLE mode, the network (e.g. the MME) and the user equipment store the user equipment contexts, including the contexts relating to the data bearer and user plane. In the prior art, when a user equipment is paged by the network, all bearer for which a context is available are established, i.e. control plane and user plane connections.

According to the example, the user equipment is paged for control plane only. Thus, even if the network and/or the user equipment have user plane bearer contexts available, only control plane connections are established. Those data bearer in the user plane for which context is available are not established.

Figure 8:
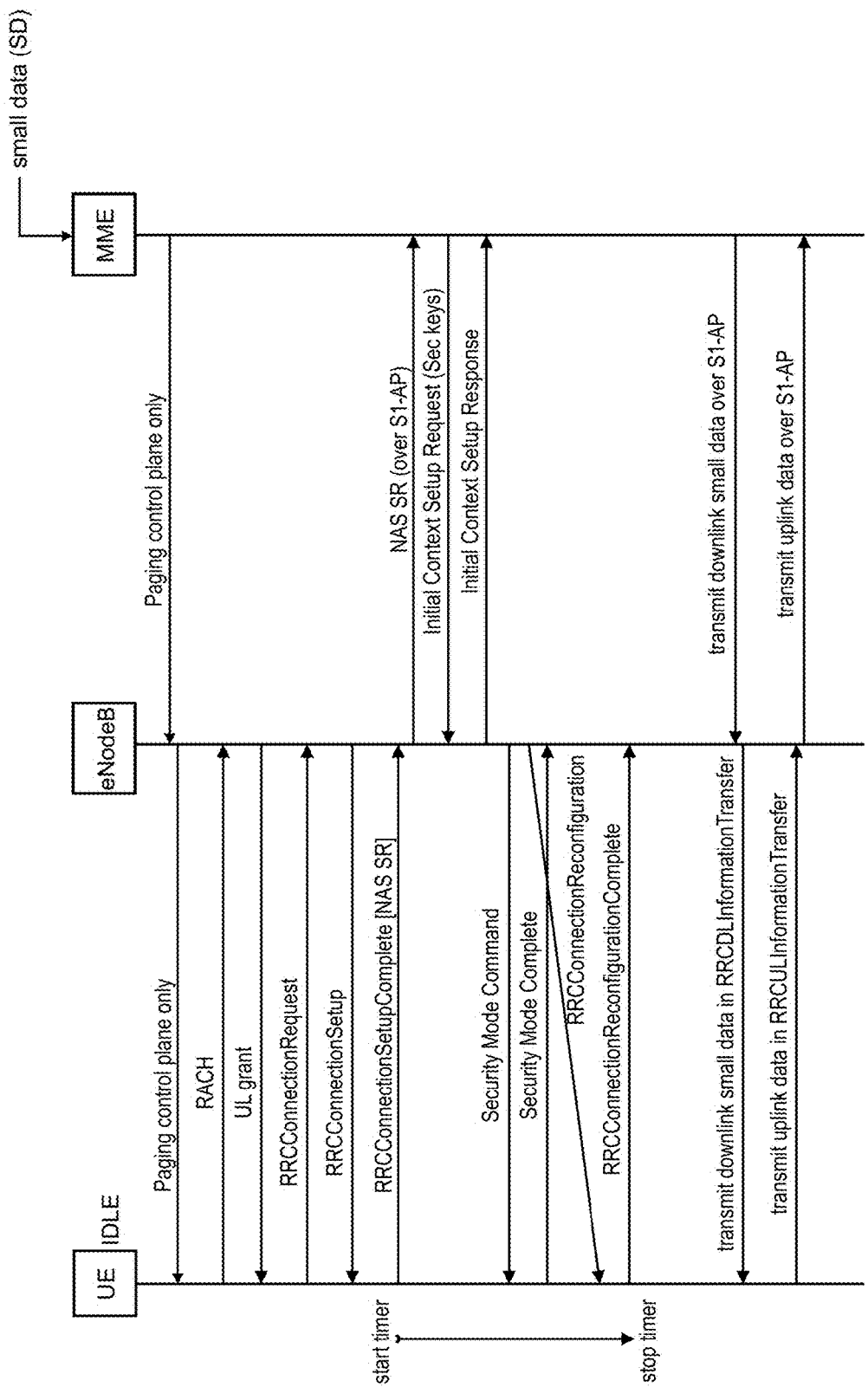
FIG. 8 is a signalling diagram illustrating the establishment of the control plane for small data transmission.

FIG. 8 is based on the above-explained example of FIG. 7, however implements these principles in the particular system of LTE.

The following assumptions are made in the example of FIG. 8. The user equipment is in IDLE mode, and the small data is received in the MME using the SMS-o-SGs mechanism as explained in the background section. It is further assumed that the user equipment and/or the network is configured with the special feature of the "small data transmission", i.e. special treatment of small data packets. The "small data" feature is defined for MTC devices as explained in the background section. It should be noted that though in the explanations given in the following reference is only made to a user equipment, the user equipment may also refer to an MTC device.

According to the "small data" feature, the network and user equipment know that small data should be transported over the control plane, not the user plane, if possible, in order to avoid the establishment of user plane connection(s). For instance, in the network the "small data" feature can be configured and stored in the subscription database. During the attach procedure, the MME obtains the configured features from the subscriber database. The "small data" feature can be configured in the UE in several ways. For example, it may be pre-configured in the USIM (Universal Subscriber Identity Module) card; or it may be configured via OMA-DM (Open Mobile Alliance Device Management) or OTA (Over the Air) device management protocols; or it may be configured by the MME during the attach procedure. The so-called "capabilities exchange" between the user equipment and the MME during the attach procedure is a usual mechanism in 3GPP-based mobile networks.

The exact meaning of "small data" is currently not exactly defined in the standardization. The common understanding is that the data is small enough to fit within e.g. one SMS. This would mean around 140 bytes of information, as the SMS payload is 140 bytes. For this purpose, the exact size of the small data is of low relevance. The denotation "small data" means a small chunk of data, which could be a small IP packet, SMS or some other application specific data. So, the "small data" transmission would include the case of SMS transmission between the MME and UE in downlink and uplink.

The entities of the core network participating in the procedure are assumed to be the MME and the Serving gateway. Furthermore, the small data may be received via the MSC from the circuit-switched network. In the future, other or additional entities may be defined for the MTC capabilities. In said case, the examples are applicable to the other entities as well.

The user equipment is in IDLE mode; thus, though the user equipment is attached to the network, there is no control plane connection or user plane connection established. The MME has the UE context stored and can determine where the user equipment should be located based on stored tracking or routing areas, i.e. which eNodeB(s) should be paged to reach the user equipment. The MME also determines that the downlink data is small data and the MME knows that the user equipment belongs to the "small data" feature. Accordingly, only the control plane connection should be used for transmission of the downlink small data.

As can be seen from FIG. 8, the MME pages the user equipment for control plane only. Or the MME pages the user equipment for small data, i.e. including an indication that the data to be received by the user equipment is small data according to the small data feature; the user equipment knows from configuration that the small data should be received via control plane signaling.

One possible implementation of the indication with low additional overhead in the signalling messages can be a single flag. For instance, when the flag is set to "0", the paging is normal (i.e. normal control and user plane connections/bearers are to be established). When the flag is set to "1", the paging is for control plane connection only, i.e. no user plane connections/bearers are to be established. The paging request message sent from the MME to the eNodeB can be extended by a corresponding bit field. The eNodeB calculates the paging occasion for the user equipment, and sends the paging message over the radio interface in the appropriate time slot to the user equipment. The paging message sent from the eNodeB to the UE also includes a corresponding bit field for indicating control plane establishment only (or small data).

Figure 5:
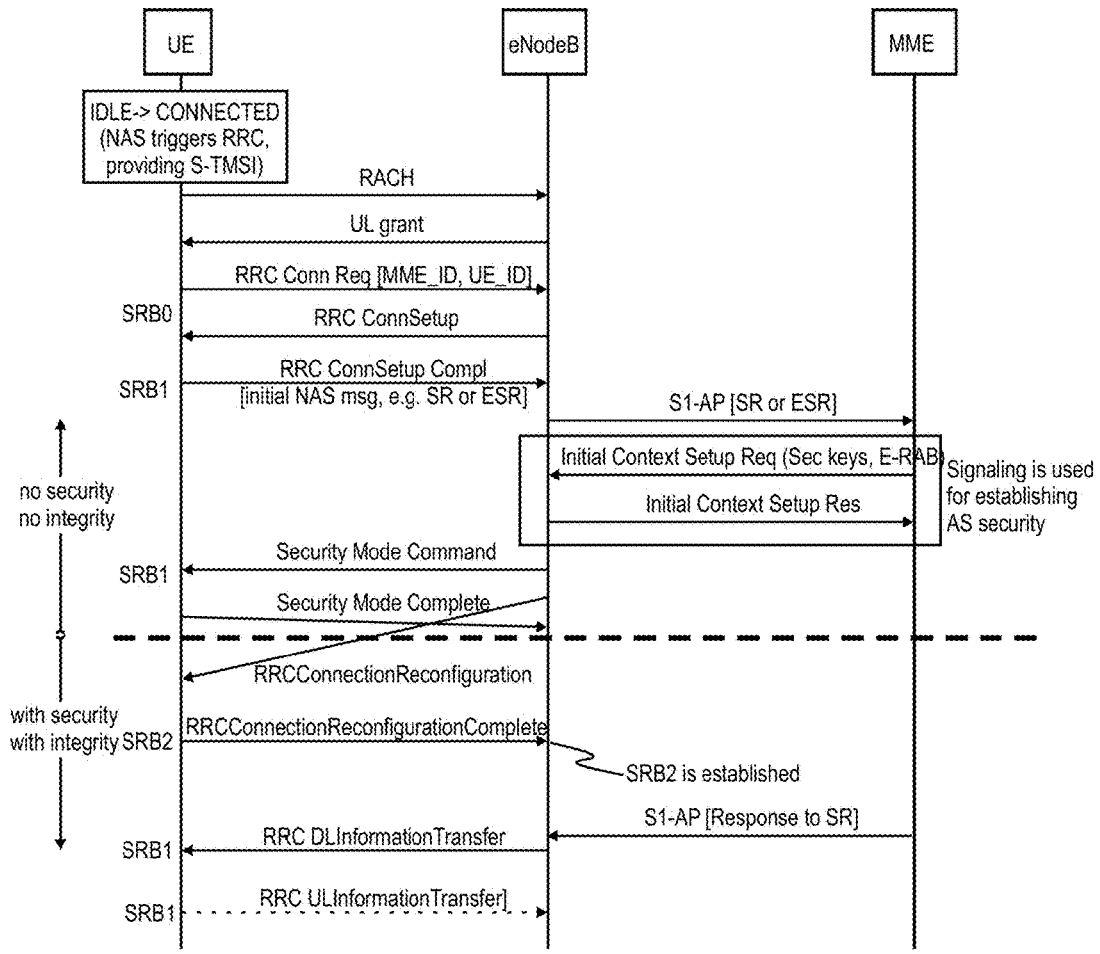
FIG. 5 is a signalling diagram disclosing the RRC connection establishment, including the SRB1 and SRB2.
Figure 6:
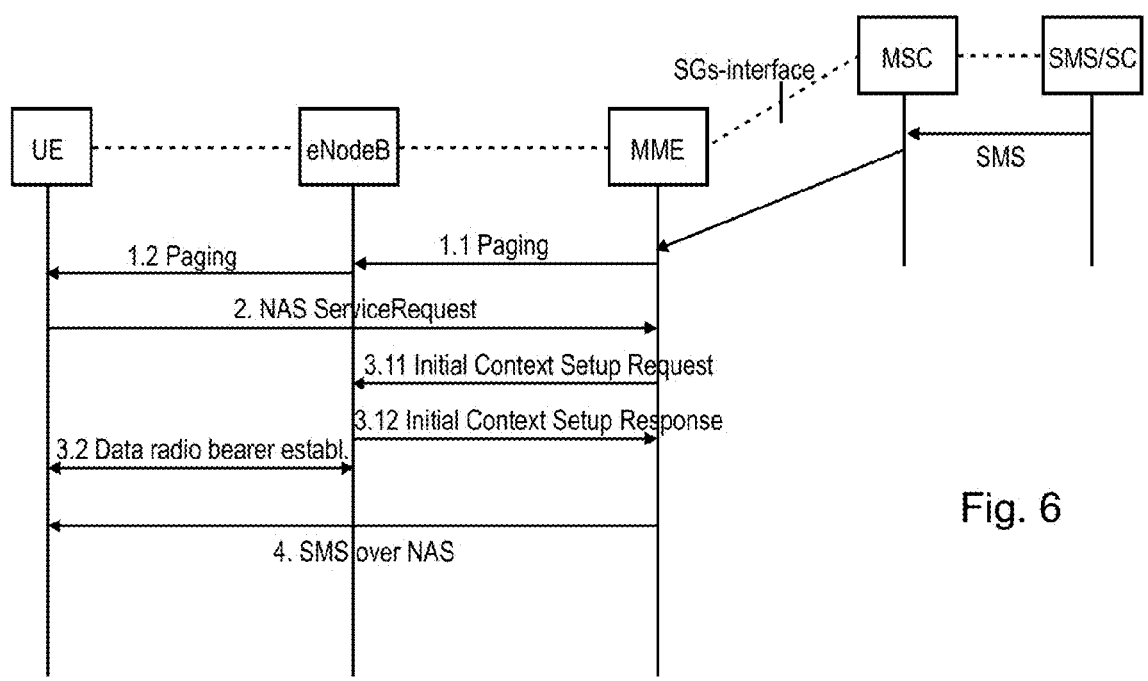
FIG. 6 is a signalling diagram illustrating the transmitting of small data using the SMS mechanism of the circuit switched network.

The user equipment receives the paging message and determines that only the control plane should be established. Accordingly, the user equipment starts with the RACH procedure to achieve synchronization with the network. The following signaling is similar to the one already explained in connection with FIG. 5. The signaling radio bearers SRB0, 1 and 2 are established successively.

In the RRCConnectionSetupComplete message, a NAS ServiceRequest message is transmitted in response to the paging, for triggering the establishment of NAS connection with the MME. When the user equipment sends a Service Request message (SR), or an Extended Service Request message (ESR), the user equipment usually would start the timer T3417 or T3417ext as explained in the background section. However, since only control plane connectivity is established, without any user plane, the timer handling in the user equipment may be adapted in order to avoid any error cases. If the user equipment would start the timer T3417 and no user plane connection is established, the timer T3417 would expire and the user equipment would detect an error and retransmit the NAS Service Request message.

According to an advantageous example, a new timer can be introduced, or the old timer e.g. T3417 can be adapted. The new timer, denoted T34sd ("sd" standing for small data) is started when the user equipment transmits the NAS Service Request or Extended Service Request message within the RRCConnectionSetupComplete message. The timer T34sd can be stopped according to several options. For instance, the user equipment can stop (i.e. clear or terminate) the timer T34sd, when the NAS downlink transport message or correspondingly the "small data" in the downlink is received. According to another option, the user equipment can stop the timer T34sd when the successful establishment of the SRB2 bearer is complete, i.e. when transmitting the RRCConnectionReconfigurationComplete message. Yet another option would be to terminate the timer T34sd when a valid (i.e. correctly integrity protected and/or encrypted) NAS message in the downlink is received.

The Initial Context Setup procedure is performed between the MME and the eNodeB in order to proceed establishing the control plane and establish the necessary UE contexts. The MME generates and sends a S1-AP "Initial Context Setup Request" message to the eNodeB. However, different from the usual procedure according to FIG. 5, the MME does not include the E-RAB context into the Initial Context Setup message, in order to avoid the establishment of the user plane. The MME thus mainly includes security relevant context into the Initial Context Setup Request message, so that the eNodeB can establish the SRB1 and SRB2 radio bearers.

After or while the MME and eNodeB perform the S1-AP Initial Context Setup procedure, the eNodeB initiates the RRCConnectionReconfiguration procedure over the Uu interface to complete the SRB1 and establish the SRB2 radio bearer. Mainly, the eNodeB needs the security context to complete this procedure, as the RRC message sent over the SRB1 and SRB2 are integrity protected and encrypted. The purpose of the RRC connection Reconfiguration procedure is to modify an RRC connection, i.e. to establish/modify/release a radio bearer. Therefore, the RRC Connection Reconfiguration procedure is usually performed to establish the SRB2 and further data radio bearer of the user plane. However, since only control plane connection is to be established, i.e. only signaling radio bearer between the eNodeB and user equipment, the RRC Connection Reconfiguration procedure is only used to establish the SRB2.

The signaling radio bearer SRB0, 1 and 2 are thus established. The S1-AP connection between the eNodeB and the MME is also part of the control plane. The MME can start sending NAS transport messages to the user equipment. The MME generates the NAS Downlink Transport message including the small data, which is transported over the S1-AP interface and RRC interface to the user equipment. When the eNodeB receives the NAS Downlink Transport message, the eNodeB transparently encapsulates the message in an RRC Downlink Information Transfer message to the user equipment. The user equipment thus receives the downlink small data using the control plane only.

One possibility to carry the small data over the control plane is the NAS protocol between the MME and the user equipment, as explained above. One alternative in said respect could be to transport the small data using a hop-by-hop transmission between the MME and the user equipment.

To said end, the small data is encapsulated between the MME and the eNodeB in the S1-AP protocol and between the UE and the eNB in the RRC protocol. The most appropriate messages would be the RRC Uplink/Downlink Information Transfer messages.

According to another advantageous example, the MME may indicate the priority of the NAS transport messages in order to differentiate the priority of NAS messages for signaling purposes (e.g. ESM and EMM signaling), and NAS messages for data transport purposes (e.g. uplink and downlink data transport). The MME may indicate those different priorities either in the S1-AP "Initial Context Setup Request" message to the eNodeB or in the NAS message itself, so that the eNodeB can treat the NAS message including small data with different priority. The disadvantage of including the priority in the NAS message itself is that the eNodeB should inspect the NAS message before sending it over the RRC message over the radio link.

Or, the MME may indicate a lower priority in each S1-AP NAS data transport message carrying the NAS message (i.e. the small data), so that the eNodeB can recognize the priority without a detailed inspection of the NAS message.

In FIG. 8 it has been assumed that the MME decides to page the user equipment with the control-plane-only indication when receiving small data. However, the decision in the MME to page or not with a control-plane-only indication can be more complex. The decision by the MME whether to page the user equipment for "small" or "normal" data could be expanded to also consider the time point of the decision, i.e. the time of the day. For instance, within a time span, e.g. 1:00-2:00 o'clock, the user equipment and the MTC server can exchange "small data"; however, outside this time, only normal data can be exchanged. Or within one time, the control plane can be used for "small data", while at other times, control plane may not be used for "small data". There could be multiple time spans, e.g. 1:00-1:30, 15:00-15:30.

Other alternatives for the MME to decide whether to use the "small data" indication in the paging message consider whether the MME receives the downlink data itself (e.g. in case of SMS), or whether the MME is triggered by downlink data notification (DDN). For example if the MME receives U-plane data packet, then the MME initiates C-plane connectivity only. Otherwise if the MME receives an DDN indication from e.g. S-GW, the MME initiates usual paging for normal data.

Alternatively, the MME may also consider for the decision whether the MME receives an indication (or the small data) by a user-plane entity (e.g. the serving gateway) or from another special entity. For instance, if the data notification is received from a serving gateway, "normal", i.e. control plane and user plane paging is used. However, if the small data arrives from a special MTC gateway, then the MME initiates the paging for small data, i.e. only control plane.

The above has been explained for a user equipment which is in IDLE mode. However, the above principles can also be extended to user equipments that are deregistered from the network. In 3GPP this is known as offline small data transmission because the user equipment is in an Offline state, which is equivalent to detached or deregistered. In said case, the detached user equipment is triggered to attach to the network. A corresponding trigger message is thus transmitted from the MME via the eNodeB to the user equipment. The transmitting can be performed in different ways.

Broadcasting of the trigger message: The UE and the network are configured to use particular broadcast resources where the trigger message is broadcasted.

Paging as trigger message: The UE and the network apply either the same paging mechanism as the one used for UEs in IDLE state or an extended paging mechanism for detached/offline UE. One desirable optimization of the paging mechanism would be to extend the DRX cycle, i.e. the time period between paging occurrences. Currently, the paging DRX cycle can be at maximum around 5 sec, whereas an optimized value for paging of deregistered UEs could be in the order of minutes or hours.

In any case, the trigger message may contain the unique UE ID. Similar to the paging message of the previous examples, the trigger message contains an indication to the user equipment that the network wishes to establish control plane connectivity only. Then, during the attach procedure the user equipment is aware that no default EPS data bearer will be established; e.g. does not start the timer T3417 or T3417ext but the timer T34sd.

Some optimizations for the attach procedure could be introduced as well, e.g. the user equipment does not send the Access Point Name (APN), or the user equipment does not exchange Protocol Configuration Options (PCO) with the PDN-gateway, or the user equipment does not indicate the PDN type (i.e. IPv4 or IPv6). Most optimizations however are achieved on the network side. The MME does not need to establish EPS bearers even if the MME has EPS bearer context. Thus, the signalling from the MME to SGW and further to the PGW, as well as the signalling to the PCC entities can be avoided.

If the user equipment attaches to the network for C-plane connectivity, it could be desirable to terminate the attachment after the small data is transmitted over the control plane (NAS protocol). The reason is that the missing data bearer does not allow the user equipment to send 'normal' uplink data, as well as the 'normal' downlink data cannot be received, because the user equipment does not have an IP configuration and thus, there is no assigned PGW.

The remaining procedure for establishing control plane connectivity and transmitting the small data in the downlink as explained in connection with FIG. 8 remains the same.

In the above explanation, it is assumed that the small data arrives at the MME, and thus triggers the paging or trigger for the user equipment to attach to the network. For instance, the small data may be received from the circuit-switched network and in particular from the MSC, when SMS-over-SGs is implemented. However, in the future small data may also be received as an IP packet at the PDN-GW, to which the user equipment is attached. In said case, the PDN-gateway forwards the downlink small data to the serving gateway. Since the user equipment is in IDLE state or deregistered, there is no S1-U bearer to the eNodeB of the user equipment, and the downlink small data cannot be further forwarded. The serving gateway would thus trigger the MME to page/trigger the user equipment.

The serving gateway is able to determine that the downlink data is "small data" and thus includes a corresponding indication in the Down Data Notification message to the MME. Additionally or alternatively, the serving gateway may indicate the size of the small data in the Down Data Notification message. The MME would then trigger (page) the user equipment to attach to the network, and the MME has to request the serving gateway to forward the data to the MME over the S11 interface in the control plane, e.g. using the GTP-C protocol.

Alternatively, the serving gateway is able to determine that the downlink data is small data and the serving gateway forwards the downlink data to the MME in e.g. the Down Data Notification message. Alternatively another message between the serving gateway and the MME can be used to forward the small data. Thereby, the MME, based on the size of the small data, can determine whether to page the user equipment with or without the control-plane-only indication as previously described.

Further Examples

The above-explained procedure may be extended to include the possibility for either one of or both the user equipment and the MME to decide for user plane connection establishment in addition to the control plane connection establishment triggered by the downlink small data.

Put differently, further examples allow negotiating between the user equipment and the MME whether the data transmission (uplink and downlink) should be carried out in the control plane only, or in the user plane. As explained in more detail below, this "negotiation", which basically consists of exchanging information relevant for the decision, may be performed over the NAS protocol.

The negotiated information mainly expresses the limitation of data and/or resources in the uplink and downlink that is to be allowed over the control plane. Put differently, the new Informational Elements describe the data size and the data time constraints (e.g. periodicity or within a given time period) of the data that can be included in the control plane messages. The user equipment is subscribed or configured for the "small data" transmission MTC feature. Therefore, the data transmitted in the downlink is considered to be small enough so that no user plane is necessary. A negotiation between the user equipment and the MME allows a flexible configuration as to when small data is indeed considered "small".

The negotiation may depend on the load in the control plane, and/or on the load in the MME. For instance, if the MME has considerable load, it may not be desirable to transmit a big amount of data over the control plane; data should be transmitted over the user plane, thus not passing the MME. In contrast thereto, if the MME is less loaded, the MME can participate in the transmission of larger amount of data over the control plane.

Moreover, another scenario may be that the UE (MTC device) can attach to various mobile networks and each network may have different configurations for the "small data" feature. In one network, the small data could be limited to 100 bytes, wherein in another network the small data can be limited to 500 or 1000 bytes.

Therefore, it is advantageous to introduce a negotiation into the small data transmission, with regard to allow either one of or both the MME and the user equipment to decide on whether it is better to also establish the user plane connection to transmit/receive downlink and uplink data.

Figure 9:
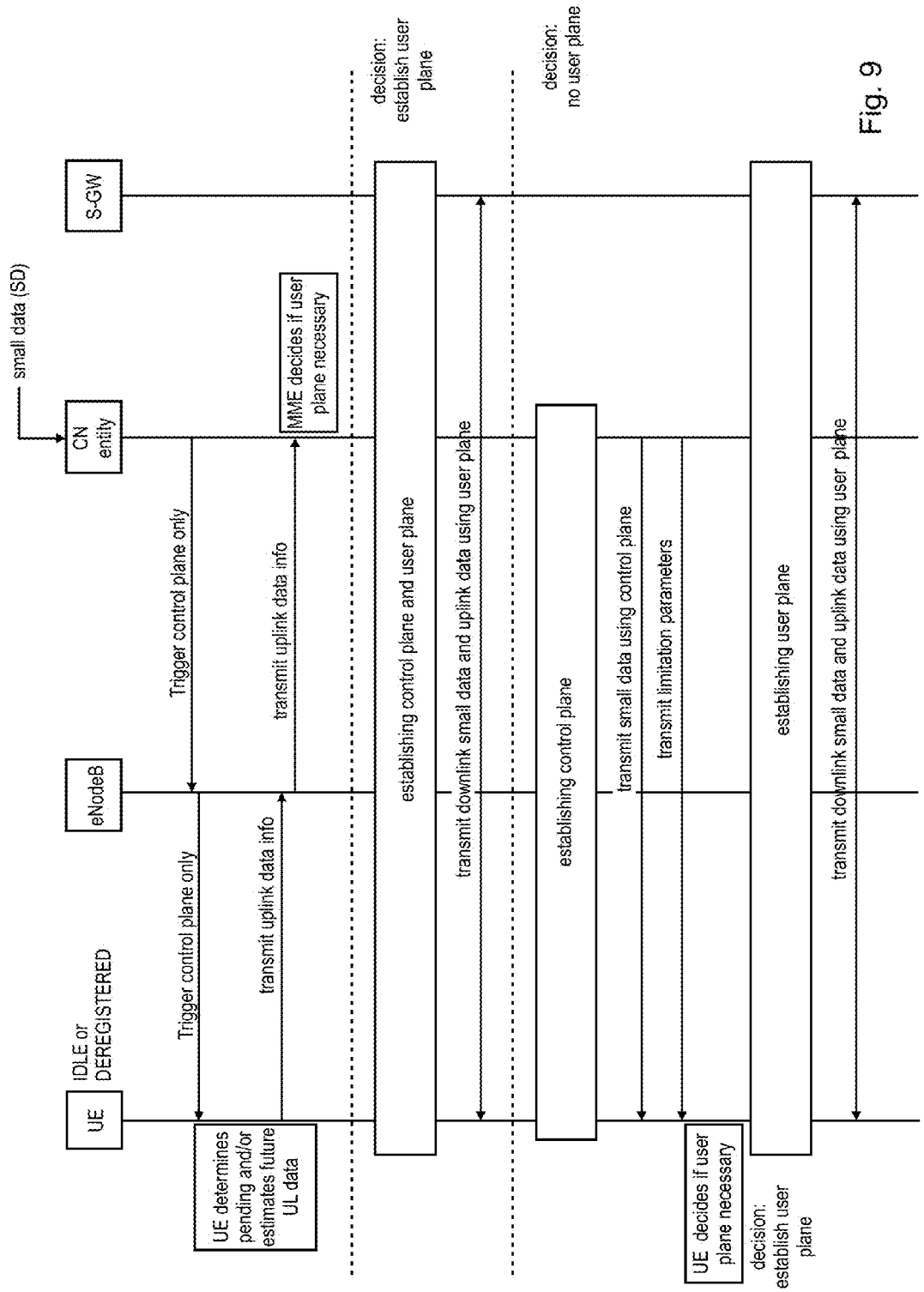
FIG. 9 is a signalling diagram illustrating the control-plane-only paging extended by allowing the connectivity-related network entity and the UE to also decide for user plane if necessary.

FIG. 9 discloses such a procedure in which the user equipment and the MME can decide for user plane connectivity in the course of the procedure. As apparent from the Figure, upon receiving the paging, the UE determines the pending uplink data and/or estimates future uplink data, which is to be transmitted in response to the downlink data for which it was paged. The user equipment starts the establishment of the control plane. The corresponding information on the pending uplink data is transmitted to the connectivity-related network entity, which may then decide on whether a user plane connection is necessary in view of the received pending uplink data information. The MME may also consider particular limitations for processing the uplink data received over the control plane in the MME.

In case the MME decides to establish data bearer in the user plane the downlink data and uplink data can then be exchanged between the user equipment and the network using the user plane connection(s).

In case the MME decides against establishing data bearer in the user plane, only the control plane connection is established, and the downlink small data is transmitted to the user equipment using control plane signalling. Advantageously, the limitation parameters used by the connectivity-related network entity to decide upon user establishment, can be transmitted to the user equipment as well, using the control plane connection. When the user equipment receives the downlink small data, it can determine the exact amount and periodicity of the uplink data and can decide whether user plane connectivity will be necessary to transmit the uplink data. Furthermore, if the user equipment is provided with the limitation parameters, it may compare the determine uplink data against the limitations determined by the MME, and thus decide in favour or against using the user plane for transmitting the uplink data.

If the user equipment decides to establish the user plane connection, the user equipment initiates and completes the user plane connection. Afterwards, the downlink and uplink data can be exchanged between the network and the user equipment using the established user plane connectivity.

Figure 10:
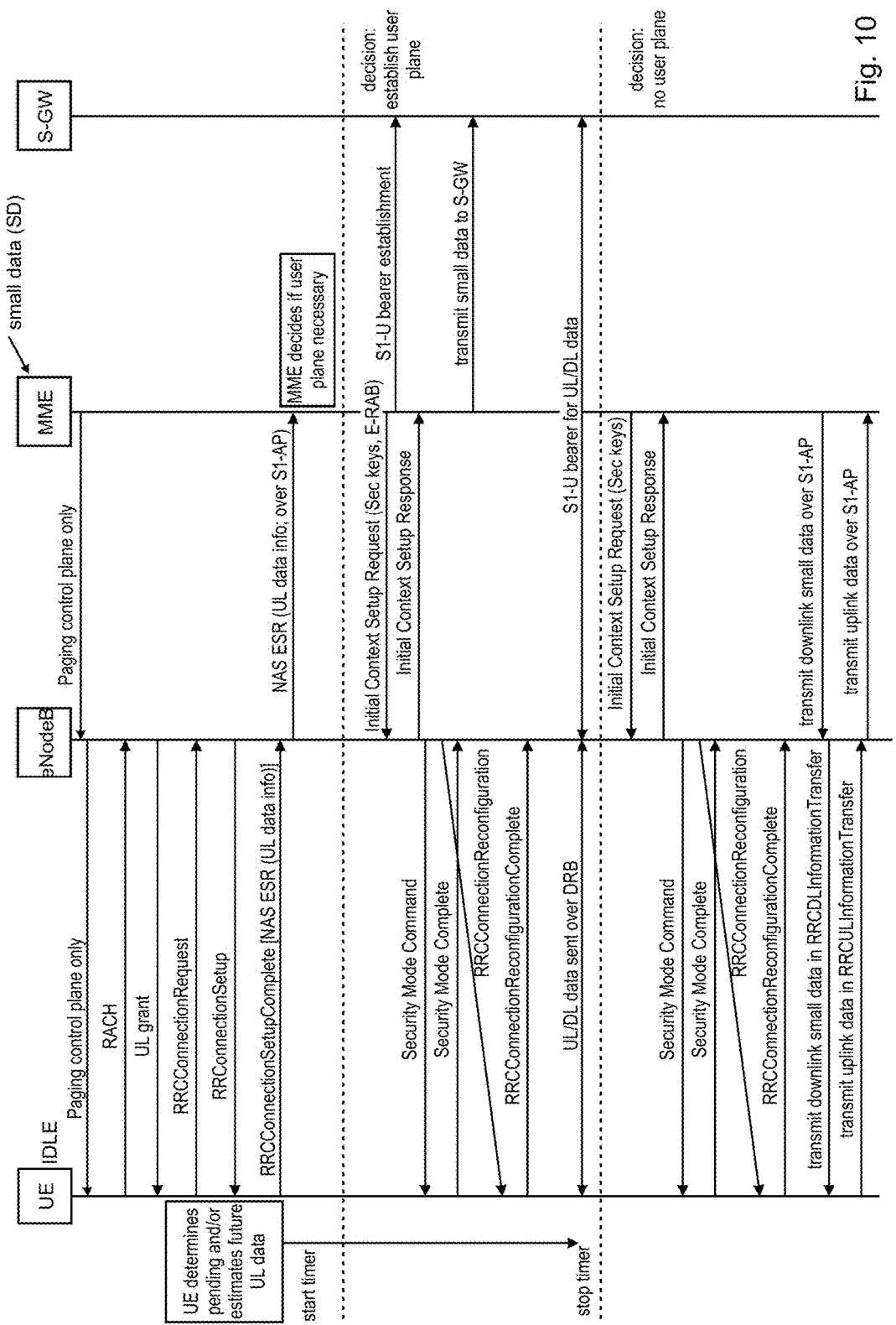
FIG. 10 is a signalling diagram, in which the MME gets the opportunity to decide on whether to establish data bearer of the user plane, based on uplink data estimations by the user equipment.

FIG. 10 discloses one example in which the MME can decide to establish user plane connectivity in view of the uplink data the user equipment needs to transmit. For exemplary purposes, the same assumptions as before are made for the example of FIG. 10. For instance, the user equipment is attached to the network, however is in IDLE mode. Correspondingly, the MME and the user equipment have the UE context stored, which also includes the information on data radio bearer and S1-U bearer in the user plane. The small data is received by the MME, e.g. as SMS from the MSC (SMS-o-SGs).

Upon receiving the data in the MME, the MME pages the user equipment, including an indication that the paging refers to the "small data" feature, i.e. control plane alone suffices for transmitting the small data to the user equipment. In other words, the MME decides to only establish control plane connections, though it stores the context information for the user plane data radio bearer and S1-U bearer. Usually, in the prior art the MME would establish all connections for which it has context information, i.e. user plane and control plane connections.

Correspondingly, in response to the paging, the user equipment initiates the establishment of the control plane connection, in the same way as already explained for FIG. 8 (RACH, UL grant, RRCConnectionRequest, RRCConnectionSetup).

However, in the example according to FIG. 10, the user equipment further determines whether there is uplink data pending to be transmitted. More specifically, the user equipment may be configured to accumulate uplink data (such as periodic measurement results etc) until it is paged, so as to then transmit the uplink data over the connections that is established when it receives downlink data.

In addition or alternatively, the user equipment estimates whether it will be necessary to transmit uplink data in response to the downlink small data for which it was paged. In more detail, based on previous statistics or based on the implementation of the small data application in the user equipment, the user equipment may be able to estimate/determine the amount of possible future uplink data.

For example, the user equipment knows that it usually sends 10 bytes of data, when the user equipment receives small data in the downlink. Or, the user equipment sometimes sends 10 bytes and other times it sends 500 bytes, depending on the small data in the downlink. This may be the case when the small data is a request from a MTC server. Also, it could be possible that the small data in the downlink triggers the user equipment to send periodic reports.

Correspondingly, if such uplink data statistics are available in the user equipment, the user equipment shall send all or part of this information to the MME. In one example, the user equipment can include this uplink data statistics in a special Informational Element in an Extended Service Request (denoted as UL data info). As shown in the background section the NAS ESR contains an optional EPS bearer context status field with 4 bytes. Each byte can be used to encode one piece of information, such as the amount of data, the periodicity, the uplink data rate, QoS parameter, total duration of data transmission etc. Furthermore, a new Information Element can be introduced for the purpose of uplink data statistics transmission.

The NAS ESR is transmitted together with the uplink data info over the S1-AP interface between the eNodeB and MME. When the MME receives the NAS Extended Service Request from the user equipment, the MME can determine from the included uplink data statistics, whether a user plane connection will be necessary for transmitting the uplink data.

The decision of the MME as to whether establish or not user plane connections for data transmission can be further based on limitation parameters relating to the MME. In more detail, the MME can determine the limitation for data transport over the control plane in the uplink and the downlink. For example, the limitation can include the maximum absolute data size to be sent in the uplink (e.g. 500 bytes), and/or the maximum uplink data rate (e.g. 100 Kilobyte/second), and/or the maximum NAS message size (e.g. 100 bytes) and/or the maximum NAS message rate (e.g. 5 messages per second) and/or QoS parameter and/or the duration of transmission or some other limitation parameter.

This information can be used in connection with the uplink data statistics to determine whether the control plane signalling suffices for transmitting the uplink data, or whether it would be advantageous to establish user plane connectivity in order to transmit the uplink data.

In case the MME decides that user plane connection is not necessary, the subsequent procedure as depicted in FIG. 10 is the same as for the one of FIG. 8. In short, only control plane connections are established, e.g. the Initial Context Setup Request message does not include the E-RAB context so as to avoid the establishment of the user plane. The downlink small data is transmitted from the MME to the UE using control plane signalling, such as NAS signalling or S1-AP between MME and eNodeB and RRC signalling between eNodeB and user equipment.

In case the MME decides that the user plane connection should be established, e.g. because the uplink data reported by the user equipment in the NAS ESR message exceeds the limitation for data transport over the control plane, or because the MME may be currently overloaded. The MME thus initiates the S1-AP Initial Context Setup procedure, but in contrast to FIG. 8, the MME includes the E-RAB context for establishment of data radio bearers and the user plane. When the eNodeB receives the InitialContextSetupRequest message, the eNodeB initiates the RRCConnectionReconfiguration procedure for establishing SRB2 and the DRB bearers according to the E-RAB context.

After the RRCConnectionReconfiguration procedure, the user equipment detects that the user plane is established and that it has to terminate the new timer T34sd, that was started when the NAS ESR message was sent. In other words, the cause for termination of the timer T34sd is when the data radio bearer is established; which is practically the same cause as the termination of the T3417 timer.

After the establishment of the data radio bearer (i.e. establishment of PDCP entity, RLC entity DTCH logical channel), the user equipment activates the corresponding EPS bearer, which means that the uplink data is prepared e.g. in an IP packet and sent over the user plane. The establishment of the user plane bearers thus allows the transport of the downlink small data and the uplink data, as depicted in FIG. 10. The uplink data is transmitted using the data radio bearer from the user equipment to the eNodeB, and using the S1-U bearer between the eNodeB and the serving gateway. In the uplink, the serving gateway receives the uplink data and forwards same to the MME (or PDN-GW). Then, the MME (or PDN-GW) forwards the data further on the way to the MTC server, e.g. via an MTC gateway located in the mobile network.

With regard to transmitting the downlink small data it should denoted that for the exemplary scenario of FIG. 10 it is assumed that the downlink small data is received in the MME (e.g. through SMS-o-SGs). When the downlink small data is available at the MME and should be transmitted to the user equipment using the user plane, there are at least the following two possibilities.

The MME forwards the downlink small data to the serving gateway, so that the serving gateway can transmit the data over the S1-U bearer to the eNodeB, as depicted in FIG. 10. In this situation the data forwarding between the serving gateway and the user equipment is performed over the user plane bearer.

Alternatively, one optimization of the above is to allow the MME to forward the data over the S1-AP protocol to the eNodeB. This is currently not available in the standard behaviour because the S1-AP protocol is defined for control plane signalling and not for data. However, this option would offer the opportunity to save resources and signalling over the serving gateway. Additionally, since the data is small is could be acceptable to carry it over the S1-AP protocol. For said purpose, there could be new messages introduced for data transport over S1-AP; on the other hand, also existing messages like the Uplink/Downlink NAS transport messages can be used. In this case, the eNodeB needs to be modified to extract the data from the S1-AP messages and forward the data over the data radio bearers between the eNodeB and the user equipment.

Furthermore, the small data can be received via the PDN-GW and the serving gateway, in which case the serving gateway already has the data, and instead of forwarding the data to the MME, the serving gateway may notify the MME about the availability of the small data. In this case and in case the MME decides to establish the user plane connection, the serving gateway only needs to be triggered by the MME to send the downlink small data to the eNodeB using the S1-U data bearer.

According to another example, the user equipment is enabled to decide on whether to establish the user plane for uplink data transmission. In particular, in case the estimation made by the user equipment at the beginning with regard to the possible future uplink data that is to be transported in response to the downlink small data is wrong, also the decision in the MME may be wrong. It may be assumed that the downlink small data is a request from the MTC server, instructing the user equipment (MTC device) to transmit a lot of data to the MTC server. The user equipment may have estimated only a small amount of uplink data, wherein the actual amount of uplink data is significantly more. In said case, since the decision in the MME is based on the estimated uplink data (which is too small), the MME decides to not establish the user plane. However, in view of the actual uplink data which is to be transmitted from the user equipment to the MTC server, a user plane should be established. Therefore, it is advantageous if the user equipment is able to again decide on whether to establish the user plane connection, after having received the small data in the downlink. Only then, the user equipment can determine the exact amount of uplink data which is to be transmitted in the uplink.

Figure 11:
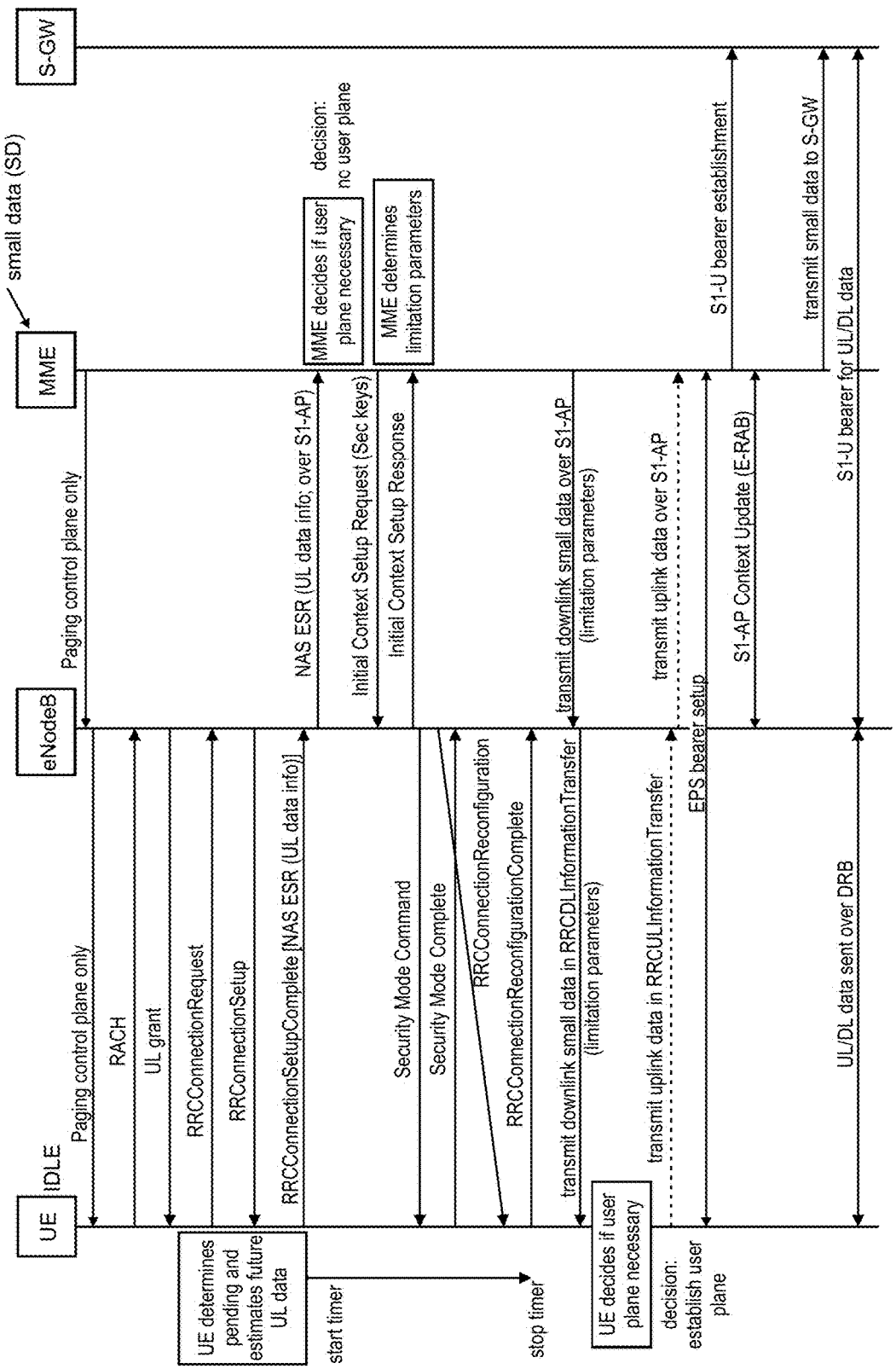
FIG. 11 is a signalling diagram, in which the user equipment gets the opportunity to decide on whether to establish data bearer of the user plane, based on the exact uplink data after having received the downlink small data.
Figure 12A:
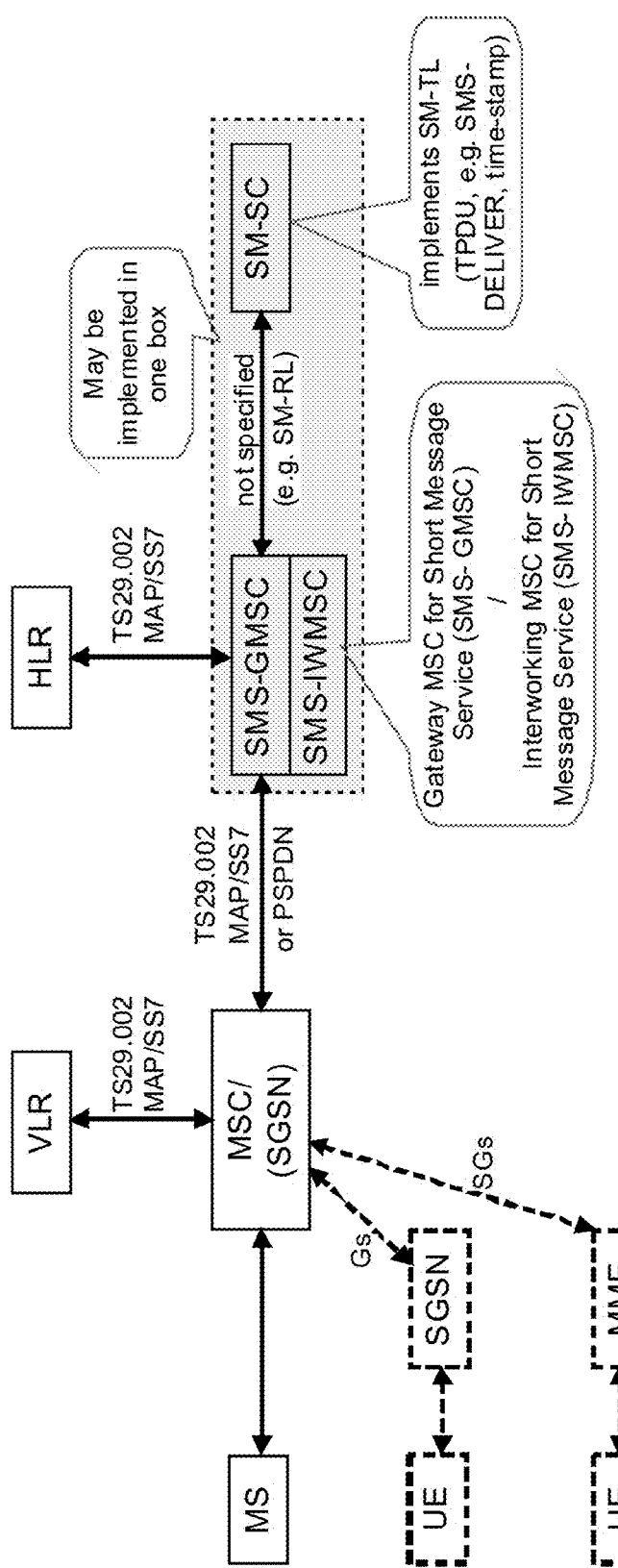
FIG. 12A illustrates the architecture for the SMS transport in a communication network.
Figure 12B:
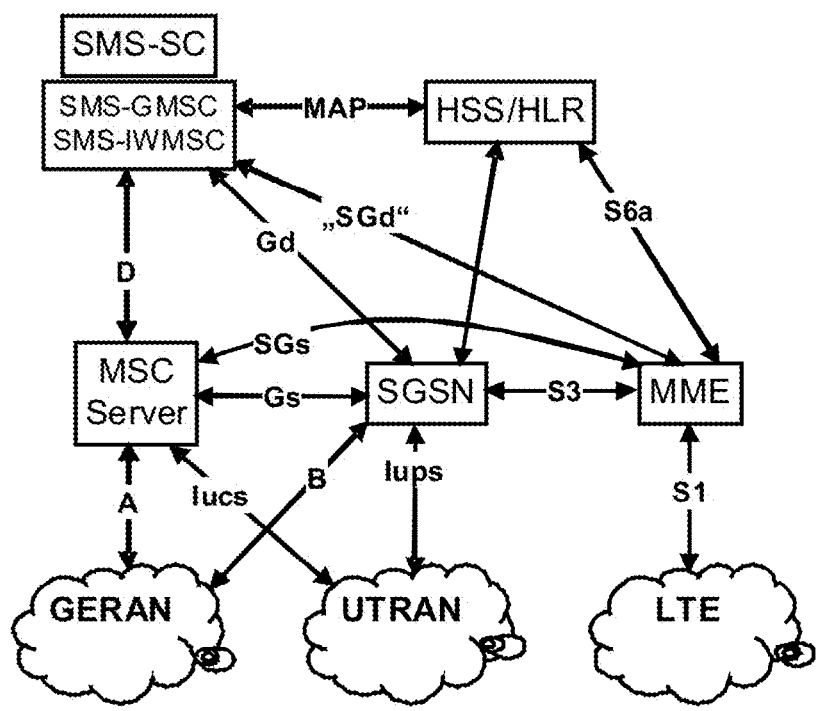
FIG. 12B illustrates a more recent version of the architecture exemplary used for the SMS transport in a communication network.

FIG. 11 is a signalling diagram illustrating the messages exchanged between the user equipment, the eNodeB, the MME and the serving gateway. The example as illustrated in FIG. 11 is similar to the one of FIG. 10 with regard to the beginning of the procedure. In particular, the user equipment is paged by the MME when small data is received in the MME from the MSC. The user equipment starts the control plane establishment, including the transmission of the NAS Extended Service Request together with the uplink data information. It is assumed for this example that the MME decides that no user plane is necessary in view of the reported uplink data, and/or in view of limitations of the MME in said respect. Correspondingly, the MME starts the Initial Context Setup procedure without including the E-RAB context in the request message in order to avoid the establishment of the data radio bearer. The RRCConnectionReconfiguration procedure is performed by the eNodeB and the user equipment in accordance therewith.

After the establishment of the SRB0, 1 and 2, the downlink small data is transmitted to the user equipment using the control plane, i.e. the NAS signalling or S1-AP and RRC. The limitation parameters determined by the MME are also transmitted to the user equipment, e.g. the same way as the downlink small data. The MME can send the limitation parameters to the user equipment using the downlink NAS transport message. Alternatively, the MME can include the limitation parameters in another NAS message and inform the user equipment. When the eNodeB receives the Downlink NAS transport message, the eNodeB transparently encapsulates the message in an RRC Downlink Information Transfer message to the user equipment.

The user equipment receives the downlink small data together with the MME's limitation parameters. The user equipment processes the downlink small data to determine the exact uplink data that is to be transmitted to the network. The user equipment then has a further opportunity to decide on whether to establish user plane connectivity or not, based on said exact uplink data. For example, the uplink data can be a regular reporting within a given time span of some measurements or results. The UE would report each 10 s the certain measurement results and the duration of the report is e.g. 20 min. The whole resulting uplink data can be then exceeding the limitation for data transport over control plane as indicated by the limitation parameters of the MME.

Correspondingly, the user equipment may determine to establish a user plane connection, and thus transmits a NAS Session Management message (PDN connectivity request) to the MME to activate an existing dormant EPS bearer or to establish a new EPS bearer. The reception of the user equipment's request for the EPS bearer in the MME triggers the MME to establish the EPS bearer in the core network (see S1-U bearer establishment in FIG. 11).

Also, the MME needs to reconfigure the radio connection between the eNodeB and the user equipment so as to establish the data radio bearer. To said end, the MME performs an S1-AP procedure to update the context in the eNodeB for E-RAB activation between the eNodeB and the user equipment. After the EPS bearer establishment in the user plane is completed, the MME can start forwarding the downlink data to the serving gateway, and then from the serving gateway the downlink small data is transmitted via the user plane to the user equipment.

The uplink data can also be transmitted using the data radio bearer and S1-U bearer of the user plane from the user equipment to the serving gateway, and then directly to the MME or to the PDN-GW without going over the MME.

In case the user equipment decides not to establish user plane, the uplink data and downlink data is transmitted using the control plane connections as already explained for the previous examples.

One optimization of the above example relates to the transmission of uplink data before the data radio bearer is established in the user plane. In particular, it is assumed that the user equipment decides to establish the user plane, and accordingly initiates the establishment of the user plane. The user equipment can start transmitting the uplink data to the eNodeB and the MME using the control plane until the user plane connections are established. This would shorten the data transmission delay. For instance, the user equipment can transmit the first uplink measurements results using the control plane connections. Then, the second uplink measurements results can be transmitted using the user plane established in the mean time.

Basically, the same can be applied to the downlink data which is transmitted in the beginning using the control plane; however, once the user plane connections are established, further downlink small data can also be exchanged via the user plane instead of the control plane.

According to another example, it is possible that the user equipment cannot estimate the uplink data statistics as assumed above. The reasons can be various and for instance it could that the uplink data varies due to the interactive nature of request/response exchange between MTC Server and user equipment, or that the user equipment does not implement the function of estimation of uplink data.

In such a case, the RRC connection between the user equipment and eNodeB (and thus the CONNECTED state) would continue to exist until the eNodeB triggers IDLE mode transition. Please note that the user equipment cannot trigger IDLE mode transition. IDLE mode is triggered only by the eNodeB. Furthermore, resources (processing in user equipment, eNodeB and MME) could be saved, if the RRC connection is released and user equipment transits to IDLE immediately after the end of uplink data.

In such a case, another assumption could be that the user equipment knows when the uplink data is over and can trigger the IDLE mode transition. A possible solution could be that the user equipment can inform the network (e.g. MME) that the uplink data is over. For example, the user equipment can explicitly signal a kind of "end of uplink data" indication to the MME in the NAS protocol. Then the MME would initiate the "UE Context Release" procedure as described in the Technical Specification TS 36.413, incorporated herein by reference.

Further Alternative Examples

Moreover, the above examples all relate to the case where the MME initiates the procedure, by receiving the small data transmission and triggering/paging the user equipment to attach to the network. However, it is also possible that the user equipment has to send uplink small data and the user equipment initiates the NAS signalling connection establishment. For that purpose, the user equipment initiates the RRC connection establishment. The user equipment can use different options to send the small data in the uplink.

According to a first option, the user equipment encapsulates the uplink small data in the NAS Extended Service Request message. A new Informational Element can be provided in said respect. This may be applied to data which security is not relevant, since there is no encryption on the radio link, and also the NAS ESR message may not be encrypted.

According to a second option, the user equipment can encapsulate the uplink small data in the uplink NAS transport message to the MME, in order to assure the needed security for the transmitted small data. The uplink NAS transport message after the NAS signalling connection is established, and over the radio link the RRC uplink (Downlink) information transfer message is used.

When the second option is used, the user equipment first sends the NAS Service Request to the MME in order to establish the NAS signalling connection. Since the user equipment is configured for "small data" transmission MTC feature (or the user equipment knows that the outstanding uplink data belongs to that feature) and the small data should be transmitted over the control plane, the user equipment can indicate to the MME the desired transport over NAS. For that purpose, the user equipment sends the NAS message, e.g. either a Service Request with a special flag or the UE sends an Extended Service Request with new flag or Informational Element. As the Service Request has limited possibility to be extended, the transmission of the Extended Service Request is preferable.

When the user equipment sends the NAS (E)SR with the special indication for uplink small data, the user equipment starts the special timer T34sd, instead of the prior art timers T3417 or T3417ext. The MME triggers the eNodeB to establish only the Signalling Radio Bearer using the corresponding S1-AP procedure.

Furthermore, according to an advantageous example, the user equipment may indicate uplink data information to the MME; this may be helpful if the uplink data size is not constant but varies. Also, the MME would then have the opportunity to determine whether the control plane or user plane is preferable for the uplink data transport.

According to an alternative solution, one possible optimization would be the use of the paging procedure (when user equipment is in IDLE mode) or the so called "Device Trigger" procedure (when the user equipment is in DEREGISTERED mode) for the transport of "very small data".

Assuming that the downlink small data is very small (e.g. a few bits or bytes), the small data can be encapsulated in the Paging message or in the Device Trigger message. One possibility to ensure the security requirements (integrity protection and optionally encryption) in this optimization is to use MTC application level security.

Control of Radio Resource Release

The present invention provides an improved method for controlling the radio resource release in connection with a mobile node that is exchanging SMS (e.g. with MTC small data) with the core network using the particular radio resources to be released.

In more detail, in order to receive and/or transmit short messages that includes small data, radio resources are established first. In order to avoid that these established radio resources are then released too early, the present invention suggests delaying by the mobile node the radio release instruction to the mobility management entity of the core network. To said end, a timer is implemented in the mobile node. Upon its expiry, the mobile node transmits a resource release indication to the MME of the core network, to indicate that from the mobile node's point of view the radio resources may be released. This indication from the mobile node is different from the CP-Ack message being used as the indication of the prior art.

Figure 17:
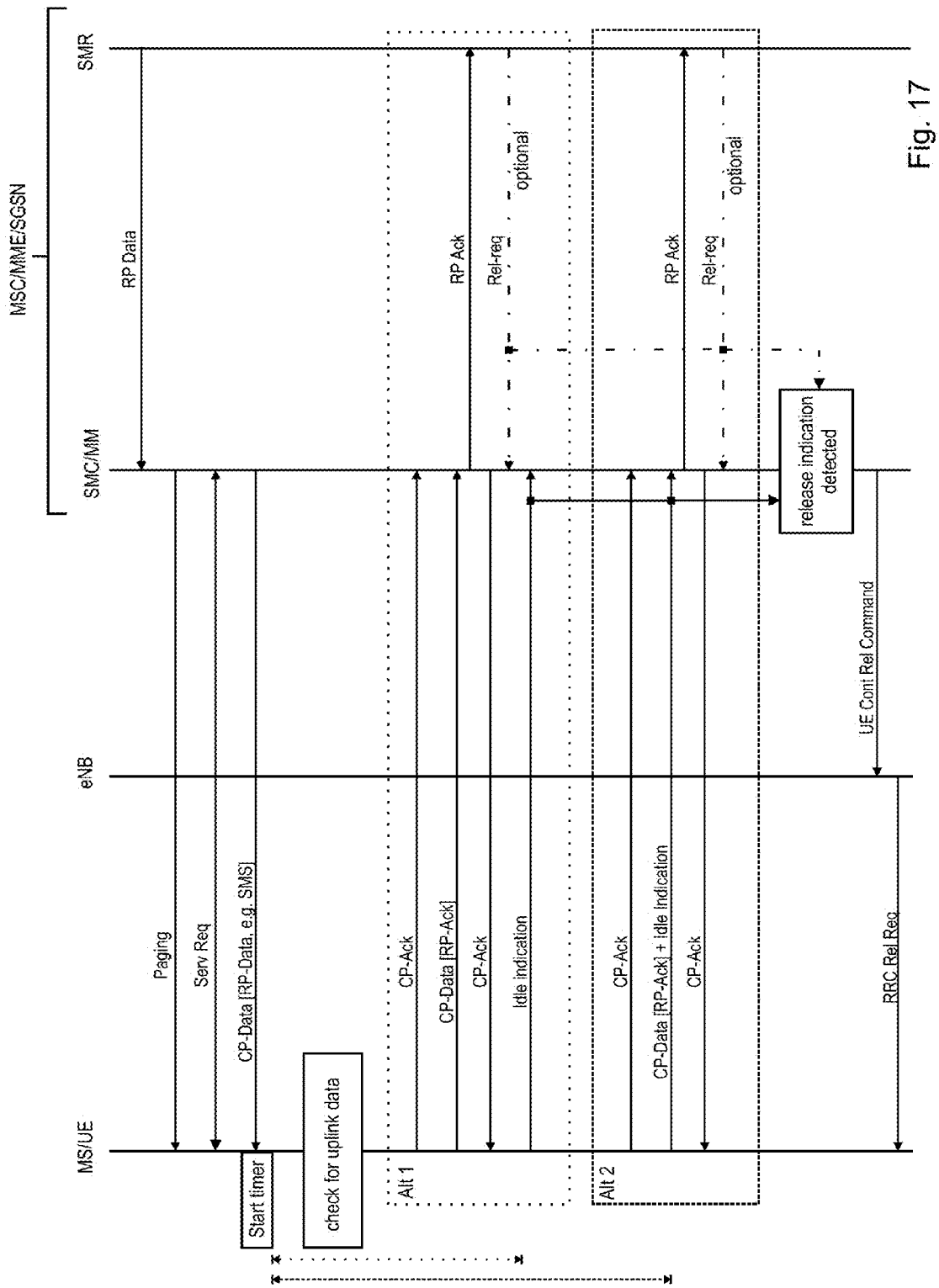
FIG. 17 is a signalling diagram illustrating the signalling exchange for a transmission of an SMS from the SM-SC to the mobile node, including the radio resource release according to various embodiments of the invention.
Figure 18:
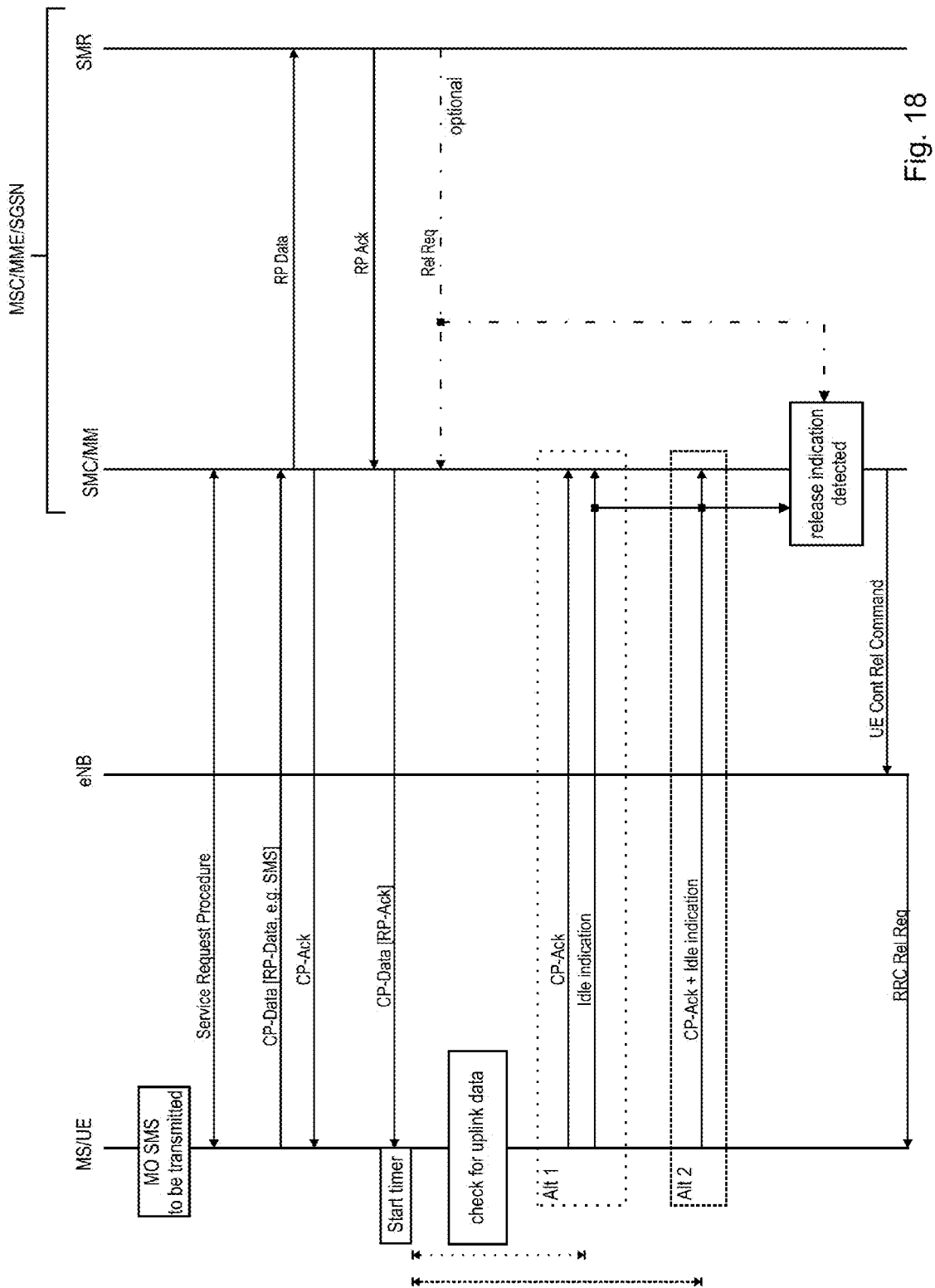
FIG. 18 is a signalling diagram illustrating the signalling exchange for a transmission of an SMS from mobile node to the SM-SC, including the radio resource release according to further embodiments of the invention.

In connection with FIG. 17 and FIG. 18, various embodiments of the invention will be now explained in more detail. In this respect, FIG. 17 is a signalling diagram illustrating the message exchange between the mobile node, eNB and MME for transmitting a mobile-terminated SMS (MT SMS) from the MME to the UE. For illustration purposes only, the link between the MME and the SM-SC for transmitting the SMS (i.e. the mo/mt-FSM[TPDU]) is omitted from these figures, but corresponds to that of FIGS. 14 and 15 respectively.

Since it is assumed that the UE is in IDLE mode, the MME needs to page the UE first in order to establish radio resources for the MT SMS transmission. Correspondingly, the UE transmits the Service Request message back to the MME in response to the paging. Radio resources are established accordingly, including UE contexts in the eNB. Usually in LTE, after the successful Service Request procedure, the SRB1, SRB2 and the DRB(s) are established. However, as mentioned above, an optimized mechanism is possible that only the SRB1 and SRB2 are set up when the MME pages the UE for SMS (or small data) transport. Yet another advantageous mechanism is possible that the MME doesn't set up the security context in the eNB, and thus, no SRB1 and SRB2 (which are per default encrypted) can be established, but merely "unsecure" RRC transport is available. In such a case there is no UE-specific context pushed from the MME to the eNB, thus, the RRC messages between the UE and eNB are unencrypted, or with other words there are not explicit radio bearers established between the UE and eNB.

Once the necessary radio resources (either encrypted or unencrypted as described above) are established, the MT SMS is transmitted further from the MME to the UE. The UE receives the SMS and can process its content. It is first assumed for illustration purposes only that the SMS comprises a trigger for the MTC application of the UE to transmit data in the uplink using either an uplink SMS (mobile-originated) or using other protocols such as the IP protocol.

In systems of the prior art, the radio resource release would be triggered in the MME by receiving the CP-Ack message from the UE and receiving the Rel-Req message from the SMR entity of the upper layer SM-RL in case of MO SMS transmission; or by receiving of Rel-Req message from the SMR entity of the upper layer SM-RL in case of MT SMS transmission. Therefore, despite the imminent uplink transmission by the UE in response to the MTC trigger, the radio resources would be released, only to be re-established shortly afterwards through another service request procedure to transmit the uplink data.

In contrast thereto, the present invention allows taking these situations into account. In the described solution, the MME starts the release of the radio resources after the MME receives either an explicit request for radio resource release from the UE or an implicit request indication which can be the regular acknowledgement to previously sent downlink data. To said end, the UE monitors incoming data, and when it detects the MT SMS, it starts a timer for controlling the radio resource release. The length of the timer is implementation specific, and can be either set beforehand, be UE-specific, be pre-configured or may be configured by NAS signalling. The length may be in the range of several hundreds or thousand of milliseconds.

The timer is configured such that it is aborted for events from which it is clear that the already established radio resources will be used and should not be yet released. For instance, when uplink data is to be transmitted from the UE, be it an MO SMS or user data for which data bearers are to be established first. Further possible abortion events for the radio resources release timer in the UE will be explained later in connection with further advantageous embodiments of the invention.

After the timer is started, the UE regularly checks whether any data is to be transmitted in the uplink. When assuming the SMS includes a trigger for uplink data transmission (either via SMS or differently), the UE would abort the timer and thus not proceed to release the radio resources (not shown in FIG. 17). Instead, the UE would send the uplink data e.g. in an MO SMS to the SM-SC, without having to re-establish the radio resources.

However, in case uplink data is not to be transmitted, the timer would not be stopped but would eventually expire, meaning that indeed the radio resources can be released since it is not apparent that they will be used in the near future; at least from the perspective of the mobile node.

There are various alternatives on how the UE can inform the MME about the radio resource release. Alternative 1 as depicted in FIG. 17 is as follows. Independent from the radio resource release timer and probably previous to its expiry, the reception of the MT SMS is acknowledged by the UE. This may include the transmission of a CP-Ack and an RP-Ack (within a CP-Data CPDU). As apparent from FIG. 17, the RP-Ack, transmitted encapsulated within a CP-Data CPDU is in turn acknowledged by the MME with a CP-Ack. Upon expiry of the timer, an indication is separately transmitted from the UE to the MME, indicating the intention of the UE for radio resource release.

This indication is termed in FIG. 17 "idle indication" for ease of reference without any restriction to its scope. In fact, the indication itself may be of different kinds as will be explained later.

As apparent, in Alternative 1 in FIG. 17 the idle indication is transmitted in a separate message. Therefore, neither the CP-Ack nor the RP-Ack, transmitted previously by the UE, are delayed. This is different in Alternative 2, where the idle indication is included e.g. as an additional information element in the CP-Data CPDU together with the RP-Ack. For that purpose, the transmission of the CP-Data CPDU is delayed until the expiry of the radio resource release timer, in order to reuse said message for piggybacking the idle indication. The advantage of piggybacking is that no explicit NAS message shall be generated and transmitted from the UE to the MME. If the timer is stopped for any reason, the delayed RP-Ack message is transmitted to the MME without the idle indication.

Yet another alternative 3 not illustrated in the Figures relates to delaying the transmission of the CP-Data message carrying the RP-Ack message, instead of transmitting the idle indication. The maximum delay could be less than 12 seconds, i.e. less than the maximum time of the re-transmission timer in the SMR entity for RP-Ack reception. As long as the SMR entity in the MME does not receive the RP-ACK, the SMR entity would not send the Rel-Req indication for NAS connection release to the SMC entity in the MME. In such a case, the NAS connection release in the network would be delayed and the result would be the same as in case of transmission of explicit "idle indication". Put differently, this alternative 3 would not require any protocol changes, but merely internal processing in the UE is changed to delay the uplink RP-Ack message (in case of MT SMS).

In all but the last of these alternatives (in alternatives 1 and 2—explicit, whereas in alternative 3—implicit), the MME will receive the idle indication and will thus learn that the mobile node indicates to release the radio resources previously established for transmission of the MT SMS. Compared to the prior art and current standard procedures, the CP-Ack will no longer be considered for radio resource release (in alternatives 1 and 2); instead the idle indication according to the present invention will trigger the radio resource release by the MME.

As explained, upon detecting and processing the release indication by the MME, the MME will initiate the common radio resource release procedure as already explained in detail in connection with FIG. 14. Specifically, the MME transmits an S1-AP UE Context Release Command message to the eNB, in response to which the eNB deletes the UE Contexts and transmits an RRC Release Request message to the UE. The UE indicates to the NAS layer that the RRC connection was released and the NAS layer transfers to IDLE state.

In the one particular case where the eNB has no UE-specific context, i.e. no RRC message encryption is provided over the radio link, the MME would request the eNB to release the UE radio states and radio identifiers. This release could result in "RRC Connection Release" message sent from the eNB to the UE.

The advantage provided by the above-described processing and control of the radio resource release is that an early release of radio resources can be avoided. Correspondingly, the re-establishment of the radio resources can be avoided. For instance, when the MT SMS includes a trigger indication for the MTC application to send uplink data, the common radio resource release procedure would release the radio resources (initiated by the MME upon reception of the CP-ACK and Release Request from SMR entity) (or merely by reception of Release Request from the SMR entity), even though uplink data is to be transmitted shortly afterwards. In contrast thereto, the present invention takes this event into account for the radio resource release and aborts the timer if it is clear that the radio resources will be used in the near future, e.g. for uplink data transmission.

The above-explained principles apply in a similar way to the scenario where a mobile originated SMS (MO SMS) is transmitted as will be explained in detail with reference to FIG. 18.

In case the UE wants to send uplink data (e.g. small data) within an SMS, it will initiate the Service Request Procedure with the MME. Once the corresponding radio resources are established, the MO SMS is transmitted to the MME. In this particular scenario this is done within an RP-Data RPDU, which is in turn encapsulated within a CP-Data CPDU. The RP-Data is forwarded by the MME to the SM-SC through the MAC/SS7 signalling e.g. using a mo-FSM message, and the CP-Data CPDU comprising the RP-Data is acknowledged to the UE (see CP-Ack). The SMR entity in turn acknowledges the successful reception of the SMS (RP-Data) by transmitting an RP-Ack to the SMC entity. The MME encapsulates the RP-Ack within a CP-Data CPDU.

The UE monitors the incoming data for determining whether an acknowledgement for the MO SMS is received, i.e. whether an RP-Ack message is received. The reception of the RP-Ack starts the radio resource release timer in the UE, similarly to the reception of the MT SMS in the embodiment of FIG. 17.

The UE observes further events in the UE, and in particular whether any uplink data transmission is imminent, e.g. a second MO SMS in case of concatenated MO SMS. In such a case the timer is aborted; in other words, the timer is stopped without sending the resource release indication. However, if the timer is not aborted/stopped, it eventually expires and a resource release indication is transmitted to the MME. The idle indication itself can take various forms, some of which will be explained in more detail later.

FIG. 18 presents two alternatives on how to achieve the transmission of the idle indication to the MME. The resource release indication, termed "idle indication", is either transmitted in a separate (NAS) message to the MME, or as part of another message, e.g. with the CP-Ack as an information element. In Alternative 2 of FIG. 18, when the timer is stopped, the CP-Ack is transmitted without the idle indication to the MME. The MME receives and processes this idle indication, triggering the radio resource release procedure in the MME. Correspondingly, the MME transmits the UE Context Release Command to the eNB, which in turn transmits a RRC Release Request message to the UE. Thus, the radio resources are released.

In one further variant that is not depicted in FIG. 18, the UE does not explicitly inform the MME through an idle indication to request radio resource release, but instead the UE delays sending the uplink CP-Ack message to the MME. Thus, the CP-Ack message serves as an implicit delay indication to the MME.

The advantages provided hereby is that in case several, not concatenated, MO SMS are transmitted, the radio resources would not be released too early, since the timer would be aborted in time. In the prior art, the SM-SC would transmit the Release Request message to the MME, since it doesn't expect to receive further MO SMS; in combination with the CP-Ack for the first MO SMS, the MME would thus initiate the resource release procedure, in spite of further imminent MO SMS transmissions that it is unaware of.

Variants and Advantageous Embodiments of the Invention

Figure 19:
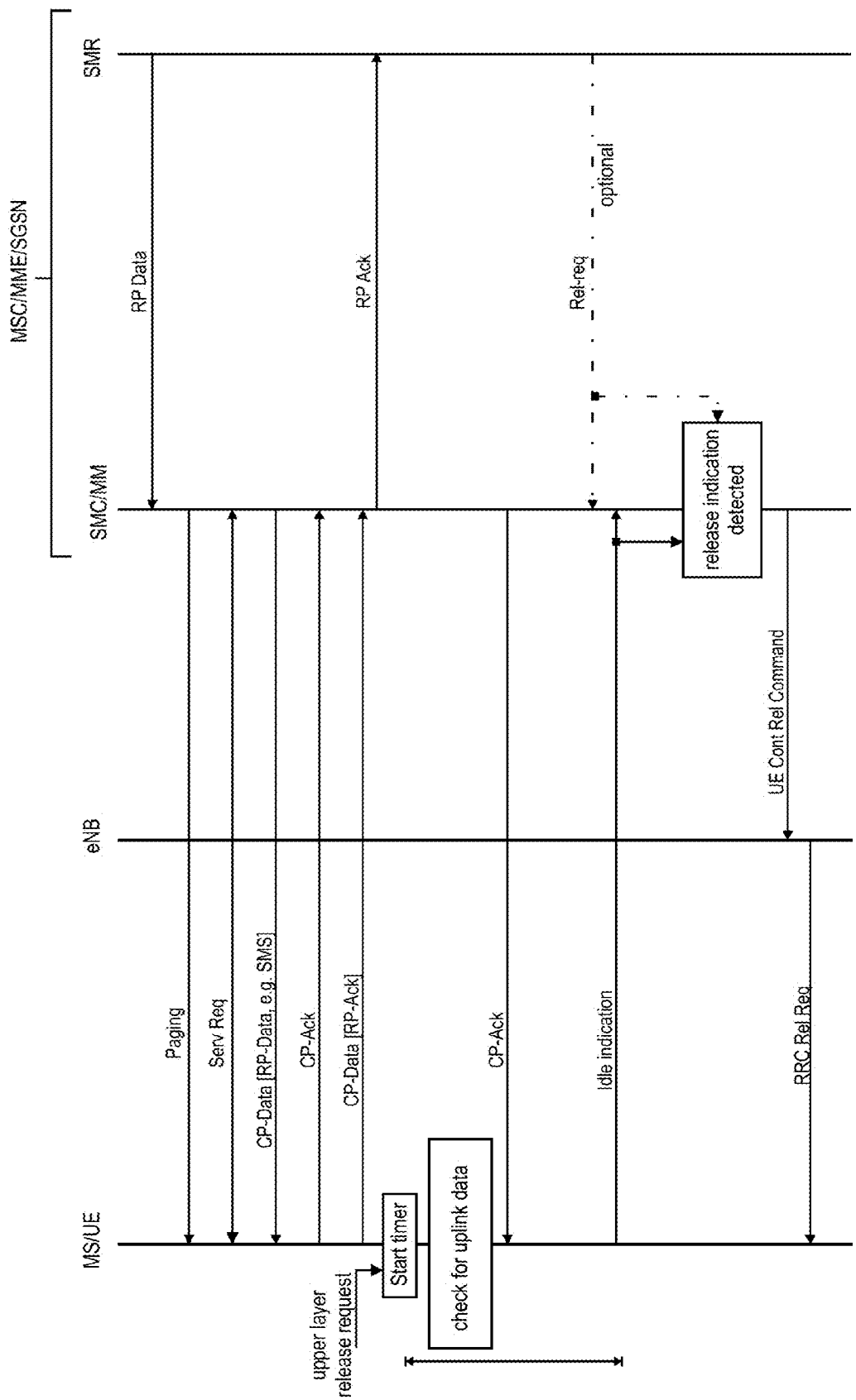
FIG. 19 is a signalling diagram illustrating the signalling exchange for a transmission of an SMS from the SM-SC to the mobile node, including the radio resource release according to various embodiments of the invention.

FIG. 19 discloses an alternative or additional embodiment of the invention, compared to the ones presented with reference to FIGS. 17 and 18. According to this alternative embodiment of the invention, the start of the timer is no longer triggered only with the reception of the MT SMS or acknowledgment for the MO SMS. Instead, a release request indication from the upper layers is used in addition or alternatively as trigger event for starting the radio resource release timer. In more detail, the upper layers in the UE are able to process the content of the received SMS, and can thus decide whether resources are to be further used or not. For instance, if the upper layers know whether the received MT SMS triggers an MO SMS transmission or any other kind of IP connection establishment or uplink IP transmission, and also the time when the transmission will be performed, the upper layer would not indicate Release Request to the UE's NAS layer. In such a case the UE doesn't need to start the radio resource release timer. On the other hand, if the SMS application doesn't know about the trigger of other (possibly MTC) applications, the SMS application can indicate Release Request to the UE's NAS layer, but the UE starts the radio resource release timer based on the Release Request from upper layers as described below. Whether the UE starts the radio resource release timer after receiving the Release Request from upper layers could be based on 1) internal configuration matter in the UE, or 2) an internal decision function in the UE or 3) negotiation between the UE and MME or between the UE and other Core network entities.

A similar triggering of the timer can be applied to scenarios of MO SMS; i.e. also or alternatively an upper layer release request indication may be used as trigger for the radio resource release timer.

Figure 14:
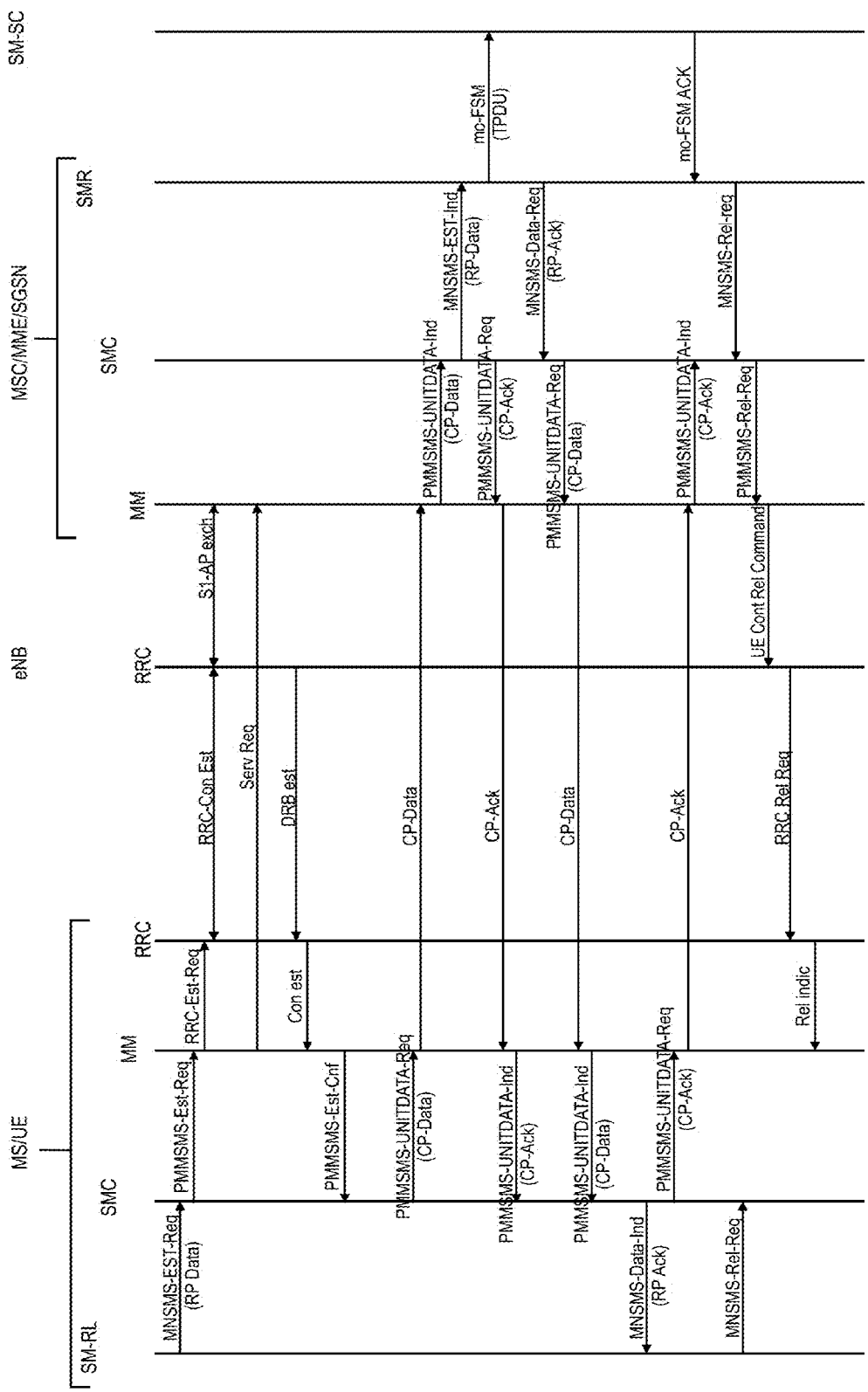
FIG. 14 is a signalling diagram illustrating the transmission of an SMS from the mobile node to the core network (MO SMS), i.e. the short message service center SM-SC.
Figure 15:
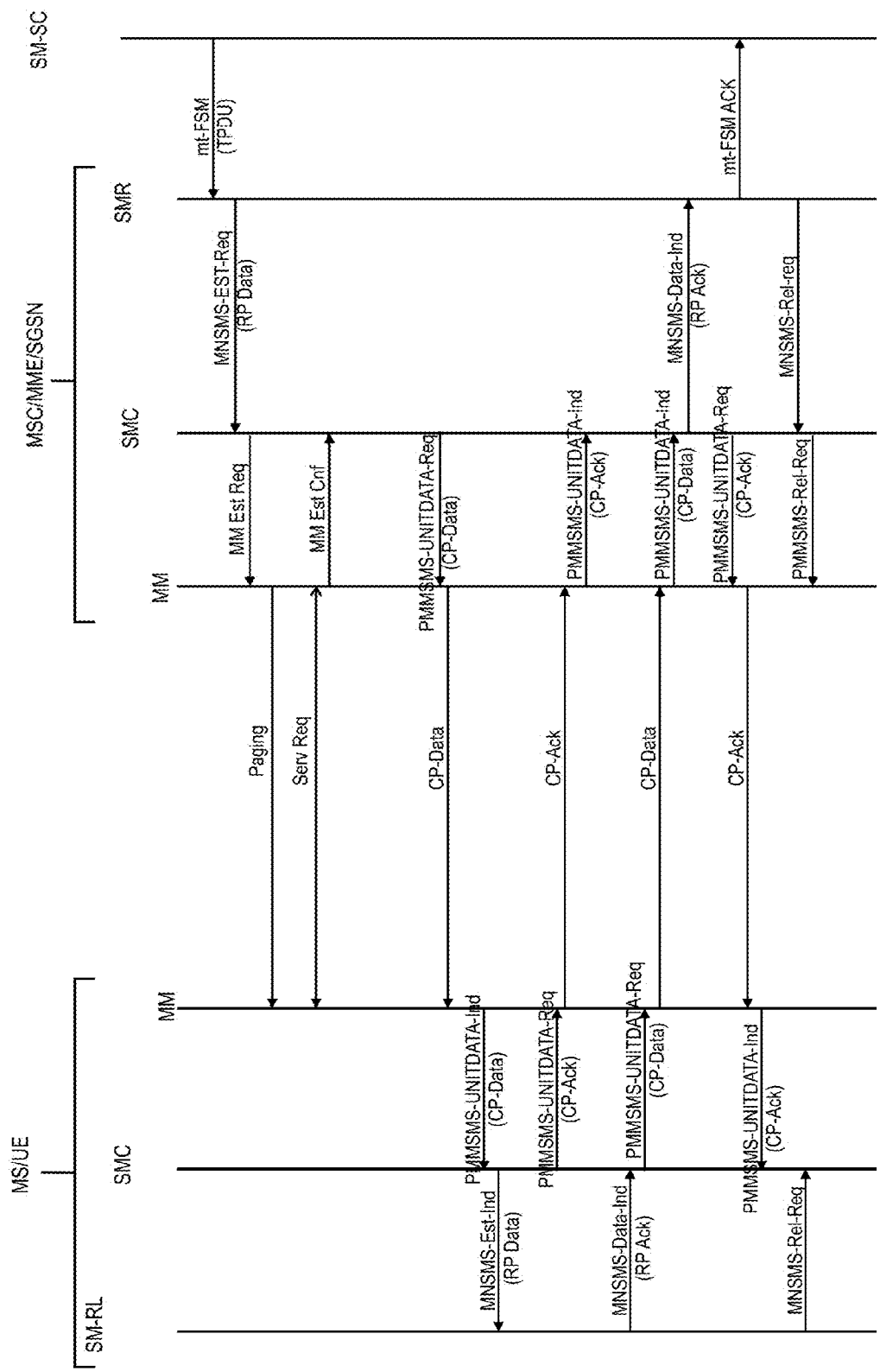
FIG. 15 is a signalling diagram illustrating the transmission of an SMS from the SM-SC to the mobile node (MT SMS)
Figure 16:
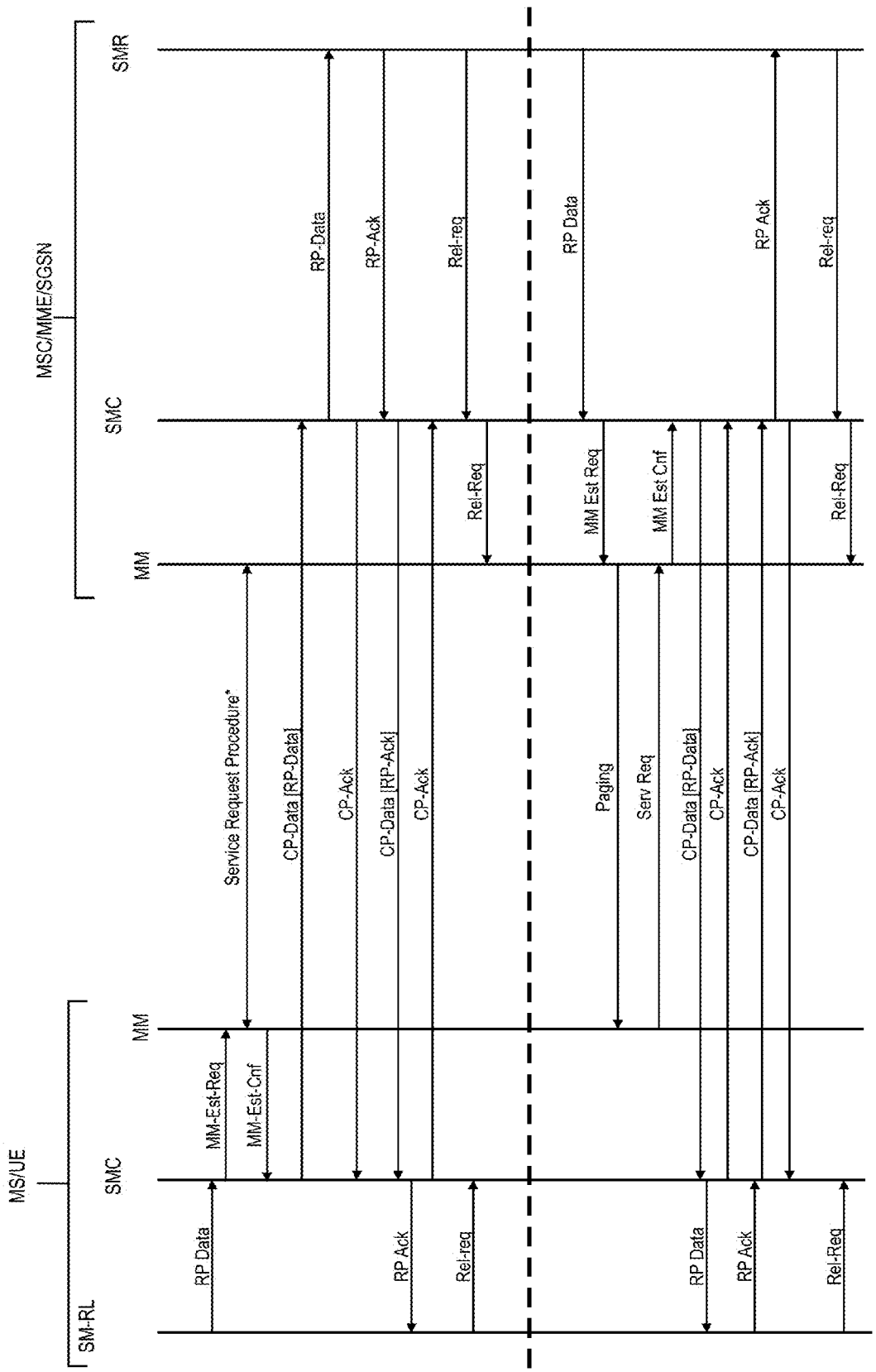
FIG. 16 is a simplified signalling diagram illustrating the signalling exchange for MT SMS and MO SMS according to FIGS. 14 and 15.

The Release Request message transmitted within the UE from the SMR entity to the SMC entity as illustrated in FIGS. 14 and 15 can be used for this purpose. For the MO SMS case, the reception of the RP-Ack for the transmission of the MO SMS triggers the upper layers to transmit the Release Request message; however, assuming that no further uplink transmissions from the upper layer are to be performed in the near future (see FIG. 14). For the MT SMS case, the Release Request transmission is triggered within the UE when receiving the CP-Ack for the transmission of the RP-Ack in a CP-Data CPDU, albeit only if no uplink transmissions of the upper layers are imminent (see FIG. 15).

For the MT SMS case, the remaining procedure after the timer starts changes since the Release Request indication in the UE is only generated after transmitting the RP-Ack message. Correspondingly, the radio resource release indication (idle indication) to be transmitted after expiry of the radio resource release timer cannot be transmitted within another message, but is transmitted separately within e.g. a NAS message. This is shown in FIG. 19. The MME receives the idle indication and thus initiates the radio resource release procedure as explained above.

Figure 20:
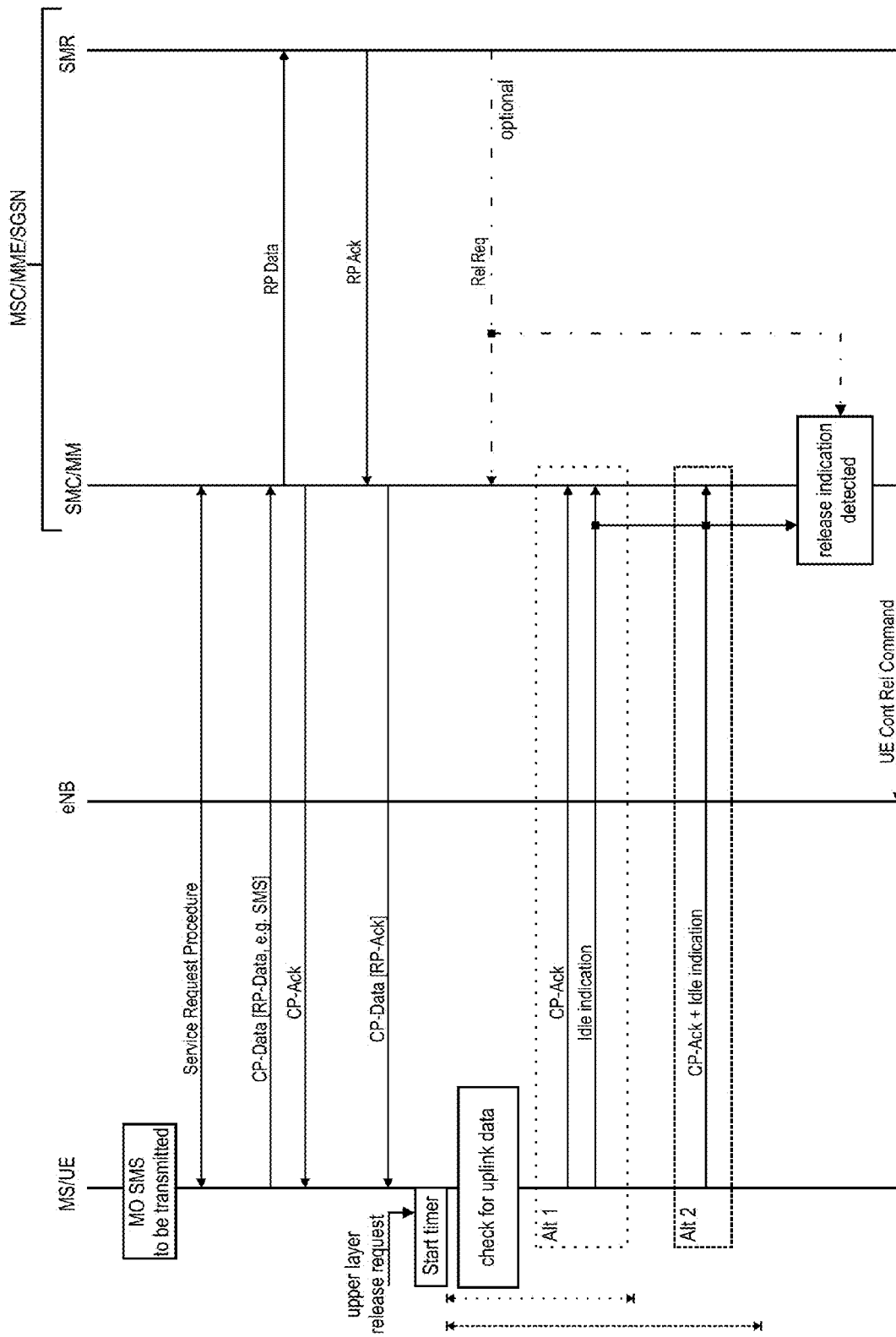
FIG. 20 is a signalling diagram illustrating the signalling exchange for a transmission of an SMS from mobile node to the SM-SC, including the radio resource release according to further embodiments of the invention.

The embodiment of the invention regarding MO SMS with release request trigger for the timer is illustrated in FIG. 20. The procedure in this case is quite similar to the one of FIG. 18. Apart from changing the start event for the radio resource release timer, the transmission of the idle indication upon expiry of the timer remains the same. In particular, the idle indication can be transmitted within the CP-Ack message or in a separate, e.g. NAS, message.

The use of the Release Request indication of upper layers as the start event for the timer can have advantages for particular scenarios. In case the MT SMS includes a trigger command for the UE (i.e. the MTC application of the UE) to transmit with a particular time delay a status report to the MTC server, the embodiment of the invention according to FIG. 17 is not optimal. In this case, the timer would be started (because MT SMS is received) but not aborted (because uplink data is not to be transmitted). The lower layers are not aware of a data transmission which is imminent in the upper layers with a time delay; only the upper layers, i.e. the layers processing the actual content of the SMS, are aware of the time delay. Consequently, the radio resources would be released even if the uplink data transmission is imminent. After the short time delay, the uplink data would have to be transmitted, and service request procedure needs to be performed again to establish the radio resources.

With the embodiment according to FIG. 19, the use of Release Request indication as timer start event avoids this early release of radio resources. The Release Request indication would not be sent to the lower layers to start the timer. Thus, the timer would not be started and would not expire to trigger the resource release.

Another scenario where the Release Request indication is used as timer start event refers to concatenated MT SMS. In case of concatenated MT SMS, the SM-SC sends multiple SMS segments to the UE. Basically, after the first SMS segment out of the concatenated SMS is acknowledged to the SM-SC, the SM-SC sends the second SMS segment. According to the embodiment of FIG. 17, each received SMS segment would trigger the timer, and radio resources would be released each time, if the timer duration is shorter then the time for reception of new SMS segment. A release of radio resources should be avoided for concatenated SMS. Furthermore, if Alternative 2 is used for transmitting the idle indication, a delay would be introduced to the concatenated SMS transmission procedure, since the RP-Ack is always delayed, however needed by the SM-SC to send the next SMS segment of the concatenated SMS. And yet another disadvantage could be the increased processing in the UE, as the release timer is started every time when an MT SMS segment is received.

While the delay may be avoided by using e.g. Alternative 1 of FIG. 17, the release of radio resources would still take place for the embodiment as explained in connection with FIG. 17 if the release timer value is too short. By using the Release Request indication from the upper layers as timer start event, the unnecessary release of the radio resources would be avoided, since the Release Request Indication would be send to the NAS layer only after the last SMS segment is received, as the upper layers (e.g. SMR entity or Transfer Layer) are aware about the concatenated SMS. Further, the processing in the UE would be simplified, since the release timer would not be started after each SMS segment is received.

As explained above, the use of concatenated MT SMS can cause problems with the radio release control of previous embodiments. An advantageous embodiment is presented in the following that allows mitigating said problem. Instead of starting the radio resource release timer everytime a MT SMS is received in the UE, the timer is started only when the SMS is not part of a concatenated SMS or when the SMS is the last RPDU segment of the concatenated MT SMS. To said end, the UE shall analyse the RP-Data, i.e. the SMS and in particular its user data header portion for it should contain an indication that this SMS is part of a concatenated SMS and further comprises information on the total number of SMS composing the concatenated SMS and on the particular number of the just received SMS in the sequence of concatenated SMS. The UE can thus learn the necessary information to start the timer only for not-concatenated SMS and concatenated SMS segment being the last one in a series of concatenated SMS.

A further adaption and/or alternative of previous embodiments of the invention, refers to the inclusion of the Release Request indication transmitted by the the SMR entity in the network, when initiating the Resource Release procedure in the MME. In the embodiments according to FIG. 17-20, the SMR entity transmits a Rel-Req indication to the SMC entity once it receives the RP-Ack (meaning the MT SMS was successfully transmitted by the SM-SC) or once the SM-SC transmits the mo-FSM ACK (meaning the MO SMS was successfully received in the SM-SC). This assumes that no further downlink MT SMS are to be transmitted by the SM-SC.

According to this advantageous embodiment of the invention, the initiation of the radio resource release not only depends on the resource release indication ("idle indication") received from the UE, but also on the Release Request indication from the SMR entity. In other words, only when both indicators are received in the MME, the resource release procedure is initiated by transmitting the UE context release command to the eNB.

This may have particular advantages over the embodiments explained above. For instance, in case further MT SMS are to be transmitted by the SM-SC, this would not be considered by all of the embodiments described above. With this embodiment, since the MME waits for the Rel-Req indication from the SMR entity to initiate the resource release procedure and since the Rel-Req is only transmitted by the SMR entity if indeed no further downlink data, i.e. MT SMS or TPDU, is to be transmitted to the UE, an early radio release can be avoided when several, concatenated or not-concatenated, MT SMS are transmitted. Please note that usually the Short Message Transfer Layer (SM-TL) provides in the TPDU an indication whether or not there are more messages to send which is mainly used in case of concatenated SMS. Thus, the SMR entity can parse this information and learn whether there are further TPDUs waiting for transmission.

The transmission of the "idle indication from the UE to the MME is part of all the embodiments of the invention explained above. The term "idle indication" is mostly used for ease of reference and shall not be misinterpreted to restrict the scope of said feature to how it is termed. How the idle indication can be actually implemented will be explained in detail in the following. In general, this indication from the UE to the MME shall inform the MME that, from UE's perspective, the radio resources are no longer needed and shall be released.

The idle indication may be for instance an explicit indication to change into IDLE state or to release the NAS connection, or may consist of an indication about the uplink NAS transport buffer being zero. As such, the idle indication may be only a flag, set to 0 or 1, from which the MME can infer whether resource release is instructed by the UE or not. As explained above, the MME might interpret the "idle indication" as an instruction and immediately start the radio resource release; or it may wait for a second event such as the Release Request indication from the SMR-entity (as representative of SMS upper layer). It should be further noted that each of the just-explained implementations of the idle indication is compatible with the above-explained embodiments of the invention.

It has been described above for the previous embodiments that the radio resource release timer is aborted/stopped, in case uplink data is to be transmitted from the UE, e.g. in response to an MTC trigger within the MT SMS. According to further embodiments of the invention, the abortion events of the timer are as follows.

One abort event may be the transmission of MO SMS as a result of the received MT SMS. If the radio resource release timer is running (e.g. it was started after the successful reception of MT SMS), the release timer is stopped/aborted when the upper layers (e.g. SMR entity) indicates that MO SMS should be transmitted. MO SMS results in the transmission of RP-Data in the uplink, so that the uplink RP-Data RPDU transmission can be used as termination event for the radio resource release timer.

Further abort events for the timer may be the establishment of data bearers for the user plane. For instance, the received MT SMS may include an MTC trigger indication to establish data bearer for user data exchange between the MTC server and the UE. Correspondingly, the UE would start to establish data bearers in said respect. Though no uplink data transmission may be imminent, it would still be advantageous to maintain the radio resources and thus avoid their release. To said end, the timer shall also be aborted in case the UE detects data bearer establishments.

The length of the radio resource release timer is implementation specific and in general may be either internally determined in the UE (e.g. based on communication history); or may be pre-configured by the network. If it is pre-configured by the network, the configuration of the timer length can be part of the subscription data of the UE, and/or a hard-coded default value such as 500 ms or 1 s. Alternatively, the value of the timer may be announced from the MME to the UE during the attach procedure.

Furthermore, the actual value of the radio resource release timer may have some constraints, providing further advantages to the invention. As the "idle indication" can be transmitted (piggybacked) for example in the CP-Data CPDU carrying the RP-Ack RPDU, the timer value shall be smaller than the re-transmission timer at the RP protocol layer between the UE and the SM-SC. In detail, since in Alternative 2 of FIG. 17 the RP-Ack is postponed until the radio resource release timer expires (for including the idle indication), the MME cannot forward the RP-Ack in time to the SMR entity that is waiting for having the RP-Data (i.e. the MT SMS) acknowledged. In the absence of the RP-Ack in the SMR entity or mt-FSM-Ack in the SM-SC before the expiry of the corresponding re-transmission timer the SMR entity or SM-SC might retransmit the MT SMS. This situation can be avoided by setting the radio resource release timer shorter than the re-transmission timer in the SMR entity or SM-SC. It can be assumed that the transmission reliability, i.e. the retransmission mechanism, of the SMS segments is guaranteed at the SM-RL layer, and therefore, the SMR entity implements a retransmission timer in case the RP-Ack does not arrives on time.

Furthermore, according to another advantageous embodiment of the invention, the radio resource release timer shall be shorter than the inactivity timer in the eNB, which is responsible for triggering the RRC connection release to the MME. In more detail, the eNB has an inactivity timer configured for the UE, and monitors data exchanged to and from the UE. If for a particular time no data is transmitted or received by the UE, i.e. the UE is inactive, and the corresponding inactivity timer expires, the eNB will trigger the resource release procedure in the MME and send a corresponding request to the MME. This would trigger the release of resources before the delayed RP-Ack is transmitted, thus leading to a re-establishment of radio resources to just transmit the RP-Ack. To avoid this situation, the value of the radio resource release timer in the UE may be set smaller than the inactivity timer in the eNB.

Currently under discussion in the standardization of 3GPP is the idea of disposing of the CP Ack. In other words, it is proposed that the CP-Acks in the CP-Layer are not used, since the acknowledgment procedure of the RP layer is deemed to be robust enough. Since the current mechanism for resource release controlled by the MME is based on the reception of the last CP-Ack (together with the Release Request message from the SMR entity), the adoption of this proposal to dispose of the CP-Ack would make it necessary to adapt the standard resource release procedure, and in particular its triggering. Should this be indeed adopted in the standard, the above-described embodiments which do not make use of CP-Acks are still usable, and thus can be an option on how the resource release procedure can function without the use of CP-Acks. For instance, the above-described embodiment of the invention, where the idle indication is transmitted with the CP-Ack message would not be possible (see e.g. FIG. 18, Alt 2). However, the remaining embodiments are feasible, even if the use of CP-Ack would be abolished in future standards.

Another advantageous embodiment of the invention proposes another way to use the idle indication from the UE to the MME. Previous embodiments of the invention suggest sending the idle indication upon expiry of the radio resource release timer, whereas the radio resource release timer is started upon SMS reception/transmission events. However, if the UE has data applications exchanging e.g. IP packets over the EPS data bearer in parallel to the SMS transmission, the radio resource release indication shall not be sent based on the SMS transmission alone. In addition or alternative to the timer trigger, the idle indication may also be transmitted by the UE to the MME when the particular data application informs the NAS layer in the UE about the end of data exchange. The NAS MM layer can thus be aware that the EPS data bearer(s), i.e. the U-plane connection is not needed anymore. The UE thus transmits the idle indication to the MME, which in turn initiates in response thereto the radio resource release procedure with the eNB. The idle indication may be included in a NAS message, e.g. UPLINK NAS TRANSPORT message. It should be noted that the default EPS data bearer is not released, but merely the radio resources in C-plane and U-plane.

In case that multiple applications exchange data, then the UE should assure that all active applications indicated "the end of data exchange" as explained above, before determining to send the "idle indication" to the MME for releasing radio resources.

In summary, the idle indication is not only generated and sent from the UE to the MME when the radio resource release timer expires, but also when a specific indication from the upper layers (e.g. application layer) is received as to that the data exchange is terminated. An advantage provided by this embodiment of the invention is that the idle indication is triggered earlier than when using the radio resource release timer and thus radio resources are released earlier but not too early. Furthermore, compared to the inactivity timer in the eNB, the radio resources are released earlier too.

Figure 13:
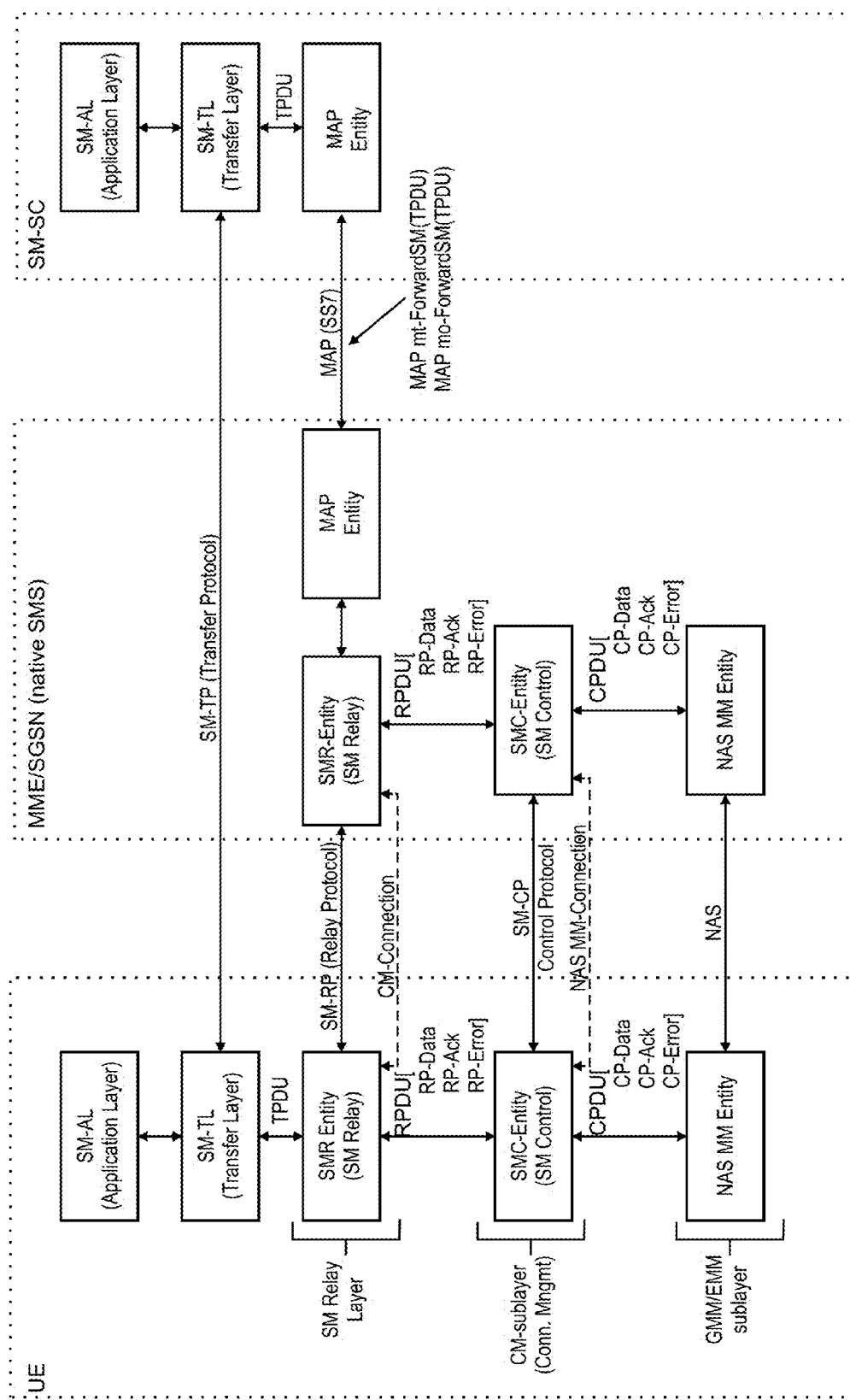
FIG. 13 shows the protocol stack for SMS transmission in a communication network.

In order to implement the various embodiments of the invention described above, both the UE and the MME are to be adapted compared to standard procedures in said respect. Both entities should be able to receive and process the idle indication on the NAS layer. It should be further noted that the idle indication can be either processed in the CM sublayer or in the NAS MM sublayer (see FIG. 13). Further, changes to one of the NAS layer protocols are needed, i.e. either in the SM-CP (Short Message Control Protocol) or in the NAS MM protocol. If the downlink small data is included in the MT SMS, a possible option is to implement the idle indication in the connection management (CM) sublayer. Since the described solution is applicable to other small data application where the CM sublayer is not implemented, the idle indication can be sent over the NAS MM protocol.

The MME should be aware about the capability of the UE to indicate that the NAS MM signalling connection is not need any longer (i.e. the UE sends an idle indication to the MME). Some UEs may implement this capability of the invention and other UEs may not implement this capability. Therefore, the MME needs to know how radio resource release is to be controlled; whether based on standard prior art procedures (CP-Ack and Rel-Req in case of MO SMS; or just Rel-Req in case of MT SMS) or according to one of the various embodiments of the invention. To said end, the UE inform the MME during the Attach procedure. For instance, the UE may include a specific indication (informational element) to the MME in the Attach Request message, informing the MME that this particular UE support the "idle indication" transmission for radio resource release according to the invention.

Another solution as to how the MME shall know about the UE's capabilities for radio resource release, would be to store the UE capability in the subscription database. Then, during the attach procedure, the MME would obtain the UE capability information (support of idle indication according to the invention) from the HSS/HLR.

In general, if the MME is informed that the UE supports the idle indication, then the MME shall not initiate the NAS MM and RRC connection release upon reception of the Rel-Req from the SMR entity and/or CP-Ack from the UE, but shall perform same according to one of the various embodiments of the invention.

In all the embodiments of the invention described until now a timer is implemented in the UE. It should be noted that this radio resource release timer of the invention is different from the timer T3440 already present in the UE, as will be explained in the following. The T3440 timer is started when the UE obtains Attach Reject, Detach Request, TAU reject (with special reject cause), Service Reject (with special reject cause) and/or TAU accept. When the T3440 timer expires, the UE releases the MM signalling connection implicitly and enters (or remains) in IDLE state. The UE's MM sublayer also indicates to the RRC layer that the RRC connection is not needed. Though apparently similar in some respects to the timer of the invention, there are various differences. For instance, the radio resource release timer of the invention is started by the reception of the SMS or SMS-Ack. Further, the duration of same may be limited by the SM-CP protocol procedures. When the timer expires different actions are executed as well. Thus, the radio resource release timer is different, and the T3440 timer cannot be re-used for the purpose of implementing any of the various embodiments of the invention.

In a variation of the above embodiments of the invention, it is suggested to implement the idle indication as the CP-Ack. In other words, instead of providing an explicit idle indication different from the CP-Ack message known in the prior art to be (one of) the trigger for initiating the resource release procedure, it is suggested to maintain the last CP-Ack message to trigger the MME to initiate the release procedure (preferably together with the Release Request message from the SMR entity). However, this embodiment of the invention suggests to delay the CP-Ack message according to the radio resource release timer, already known from the previous embodiments of the invention.

Accordingly, the UE starts the timer, buffers and delays the CP-ACK CPDU, and checks whether uplink data is to be transmitted, and/or whether data bearers are to be established. Upon expiry of the timer, the UE forwards the CP-Ack to the MME, which then can trigger the radio resource release procedure (preferably after having received also the Release Request indication from the SMR entity).

Figure 21:
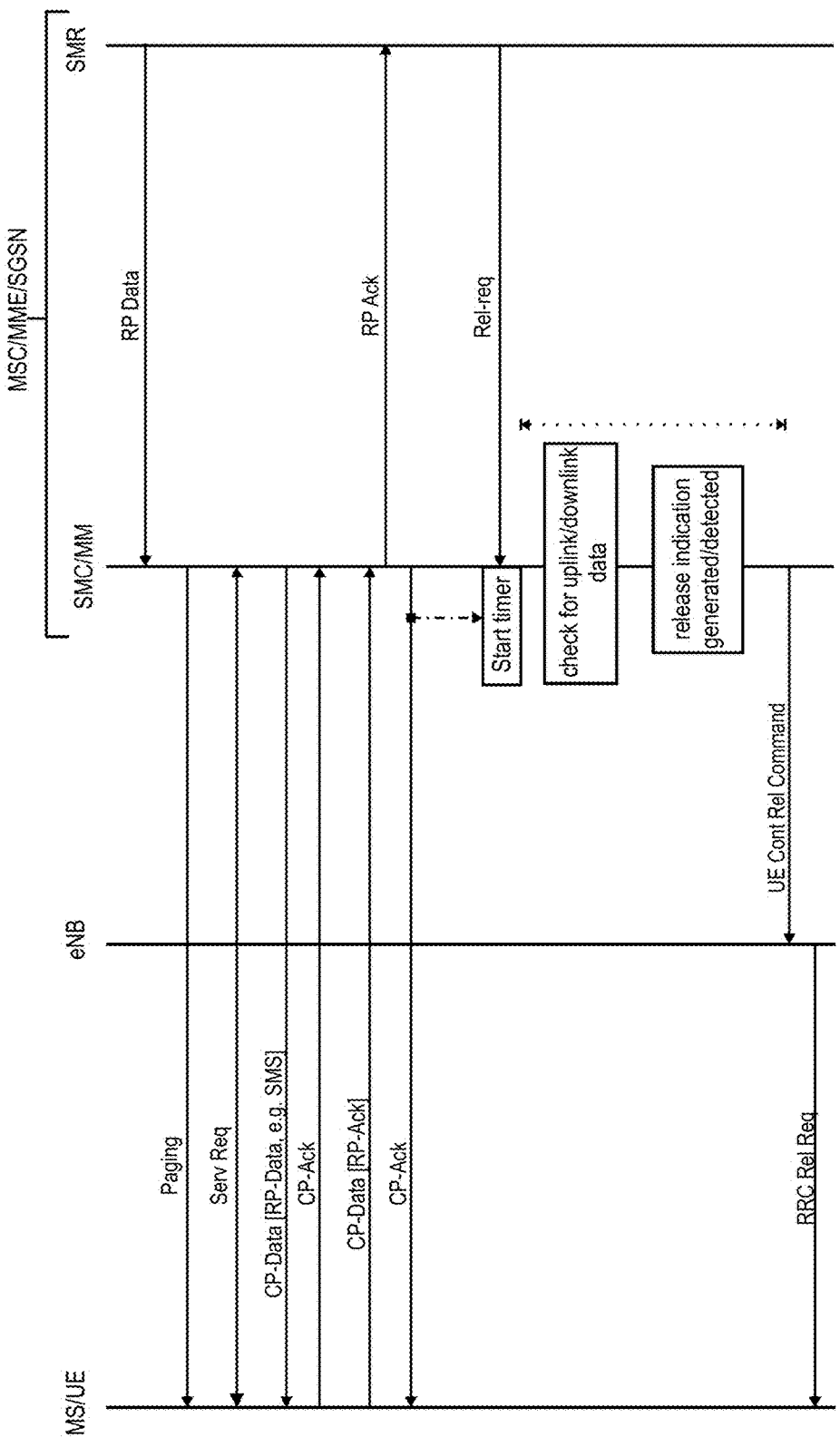
FIG. 21 is a signalling diagram illustrating the signalling exchange for a transmission of an SMS from the SM-SC to the UE, including the radio resource release according to other embodiments of the invention.

Yet another embodiment of the invention refers to the implementation of the radio resource release timer in the MME instead of the UE. FIG. 21 discloses this embodiment of the invention, and in particular illustrates the embodiment exemplary in connection with an MT SMS. Of course, the implementation of the timer in the MME is equally applicable to the various scenarios of MO SMS.

In the exemplary embodiment in FIG. 21 the timer is started when receiving the Release-Request indication from the SMR entity-. Instead of immediately starting the resource release procedure, the MME waits for the radio resource release timer to expire before initiating the resource release procedure.

The timer is started, and the MME continuously checks whether uplink or downlink data transmissions to/from the UE are imminent. Also, the establishment of data bearers or PDP context from the UE can be considered as an event to stop the radio resource release timer. If so, the timer is stopped, and the internal "idle indication" is not generated, thus avoiding the early release of radio resources even though the SMR entity may have indicated Release Request. On the other hand, if no such downlink/uplink data transmissions or bearer establishment are to be performed, the timer eventually expires and the idle indication is internally generated by the MME. This triggers the radio resource release procedure (i.e. UE Context Release command to the eNB, etc).

In a variation of the above embodiment of the invention, the MME starts the radio resource release timer only when both the Release-Request indication from the SM-SC is received and the last CP-Ack message from the UE is received.

Alternative embodiments allow the timer in the MME to be started when receiving the RP-Ack from the UE referring to the MT SMS which the MME previously forwarded to the UE; in this case, in might be preferable to start the timer only, when also receiving the Release Request indication from the SMR entity Alternatively, the timer may be started when receiving an uplink SMS (i.e. MO SMS).

There are several advantages of providing the timer in the MME instead of in the UE. One of these advantages is that the UE doe not need to send an explicit "idle indication" to the MME; instead, indications within the MME itself suffice, thus saving radio resources over the air.

Another advantage of implementing the timer in the MME, is that the network has the control of the duration of the NAS and the RRC connections which is desired by some operators.

Figure 22:
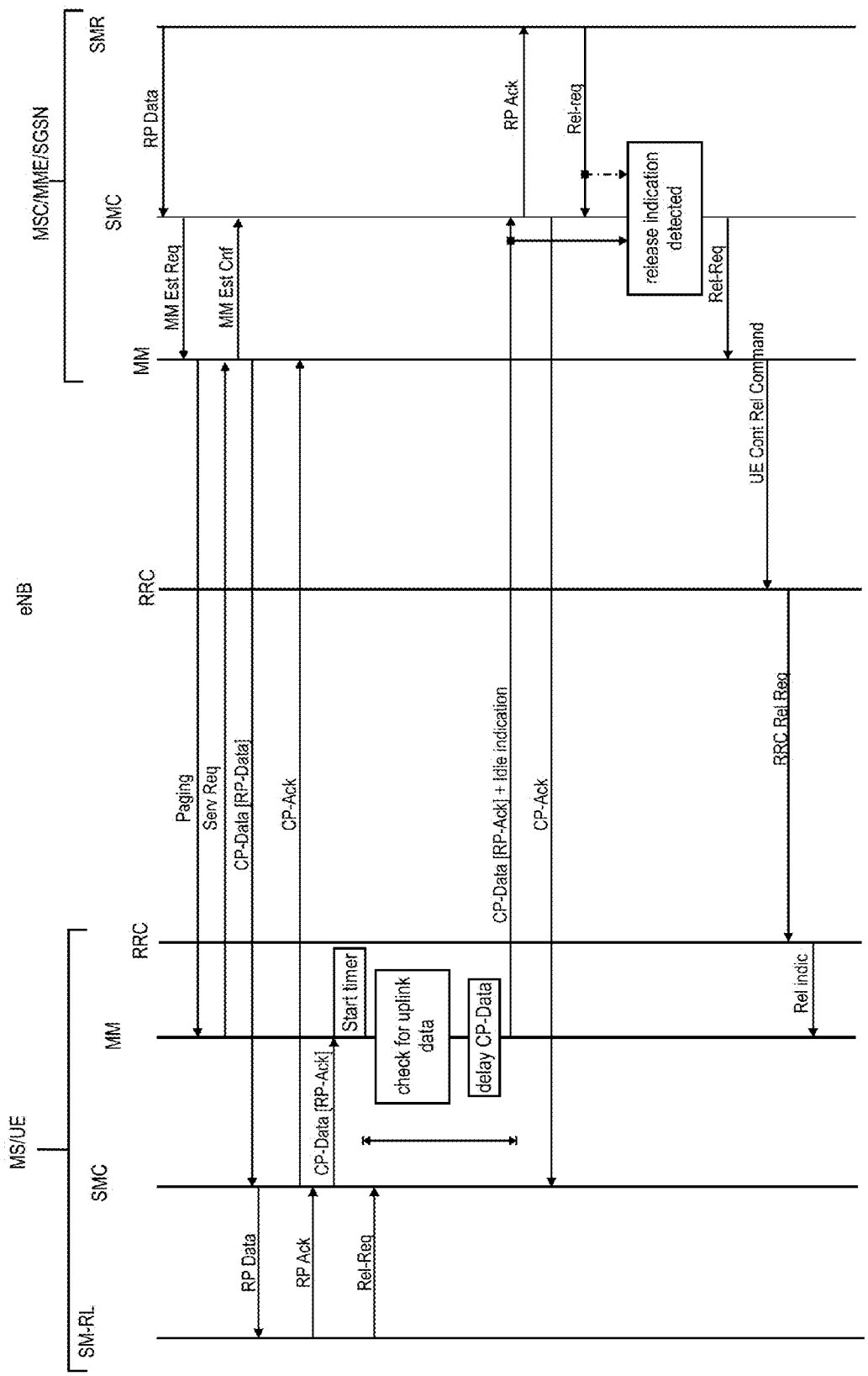
FIG. 22 is a signalling diagram illustrating the signalling exchange for a transmission of an SMS from the SM-SC to the UE, including the radio resource release according to other embodiments of the invention, wherein the SMS entities in the UE, MME and SM-SC are depicted in more detail.

FIG. 22 discloses an embodiment of the invention in which the various entities of the SMS are visible in the UE, MME and SM-SC, and an MT SMS (e.g. with small data) is transmitted from the SM-SC to the UE. In this particular embodiment of FIG. 22 the radio resource release timer is started in the UE when the MM layer receives the RP-Ack in the CP-Data CPDU from the SMC entity of the UE.

Alternatively and in a corresponding way to the some of the previous embodiments of the invention, the timer may also be started when receiving the SMS, i.e. the RP-Data RPDU containing the MT SMS; or when an upper application layer provides as indication to the MM layer.

As with previous embodiments of the invention, the UE continuously checks for imminent uplink data transmission and/or data bearer establishments for possibly aborting the timer and thus avoiding the early radio resource release. In the particular embodiment of FIG. 22, the idle indication is transmitted within the CP-Data CPDU containing the RP-Ack. Thus, after the timer is initiated, the CP-Data CPDU is delayed until the timer is either aborted or expires. If the timer is aborted the CP-Data CPDU with RP-Ack included is transmitted to the MME. If the timer expires, the CP-Data CPDU with RP-Ack is extended with the idle indication (e.g. as an informational element) and then transmitted to the MME.

Depending on the reason of aborting the timer, the UE can send NAS ESM message to request establishment of a new data bearer or an activation of radio resources for existing data bearers (the latter assuming the only the C-plane radio bearers are activated and no DRBs as described above in the current invention).

The MME receives the CP-Data CPDU with the RP-Ack, forwards the RP-Ack to the SM-SC and detects the resource release indication. Optionally, the SMC entity waits for the Rel-Req indication from the SMR entity to initiate the Resource Release procedure. As already explained before, waiting for the Rel-Req from the SMR entity before initiating the release of radio resources is advantageous to avoid the situation that several MT SMS are transmitted in a row, thus leading to various re-establishments of the radio resources.

The MM layer in the MME is internally informed with a Release Request indication, which triggers the transmission of the UE-Context Release command (or other possible instruction for radio resource release) from the MME to the eNB.

It should be noted that the embodiment of FIG. 22 merely gives a more detailed view into the internal composition of the various entities and how the features of previous embodiments can be implemented in more detail. As a consequence, all the variations and embodiments of the invention explained before for the MT SMS scenario (see e.g. FIGS. 17 and 19) are also implementable into the various entities as depicted in FIG. 22.

Figure 23:
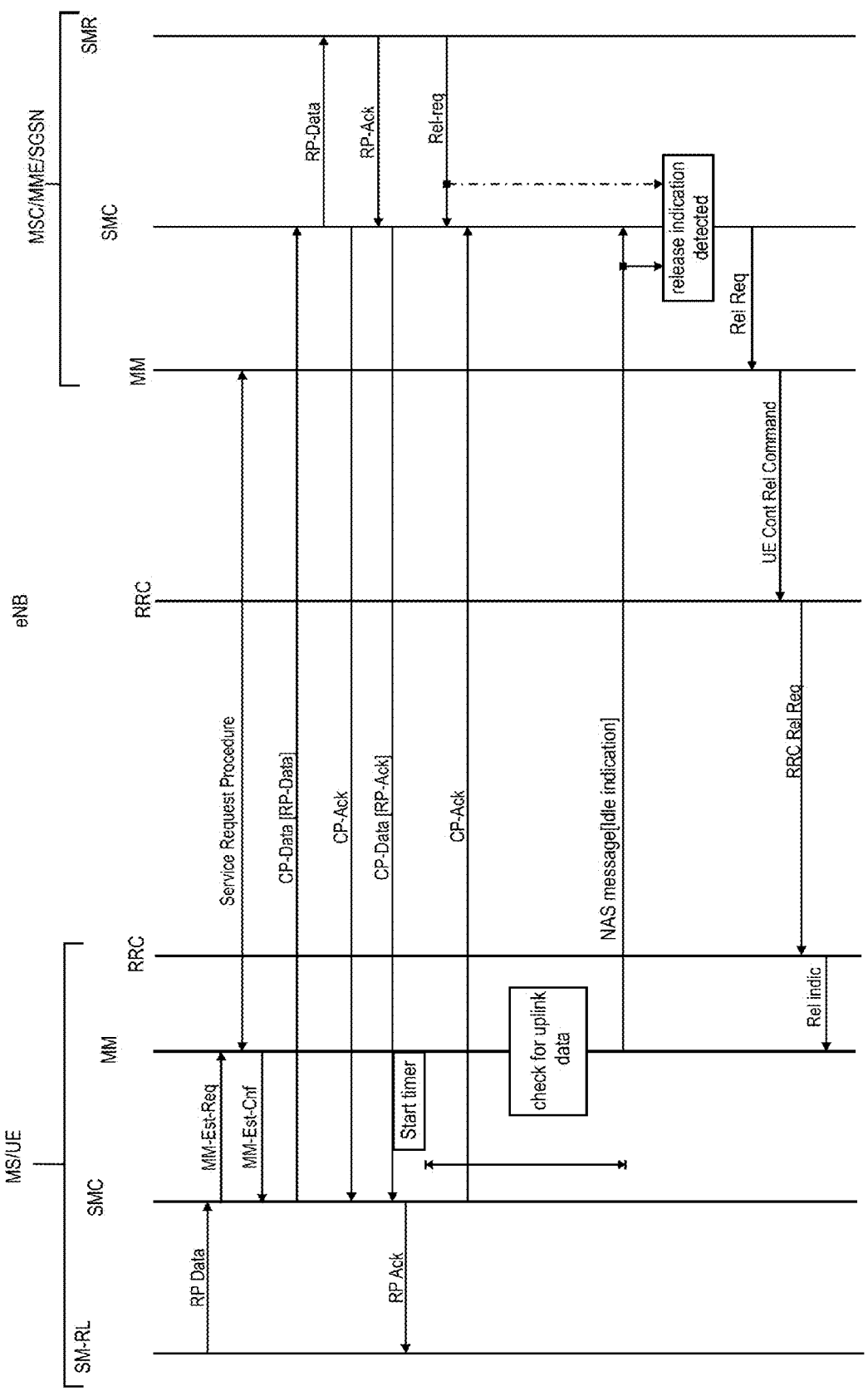
FIG. 23 is a signalling diagram illustrating the signalling exchange for a transmission of an SMS from the UE to the SM-SC, including the radio resource release according to other embodiments of the invention, wherein the SMS entities in the UE, MME and SM-SC are depicted in more detail.

FIG. 23 is similar to FIG. 22 in that the particular SMS entities in the UE, MME and SM-SC are detailed. FIG. 23 refers however to the transmission of a MO SMS from the UE to the SM-SC. In this particular embodiment of the invention, the NAS radio resource release timer is initiated with the detection of the RP-Ack received in the UE in response to the transmission of the MO SMS. Again, other start events for the timer are possible too; please refer back to the description concerning FIGS. 18 and 20.

After expiry of the radio resource release timer, the idle indication is transmitted separately in a NAS message to the MME or with the CP-Ack message. The idle indication is used as a trigger for the radio resource release procedure (optionally together with the Rel-Req message from the SMR entity). It should be noted that the embodiment of FIG. 23 merely gives a more detailed view into the internal composition of the various entities and how the features of previous embodiments can be implemented in more detail. As a consequence, all the variations and embodiments of the invention explained before for the MO SMS scenario (see e.g. FIGS. 18 and 20) are also implementable into the entities as depicted in FIG. 23.

Figure 24:
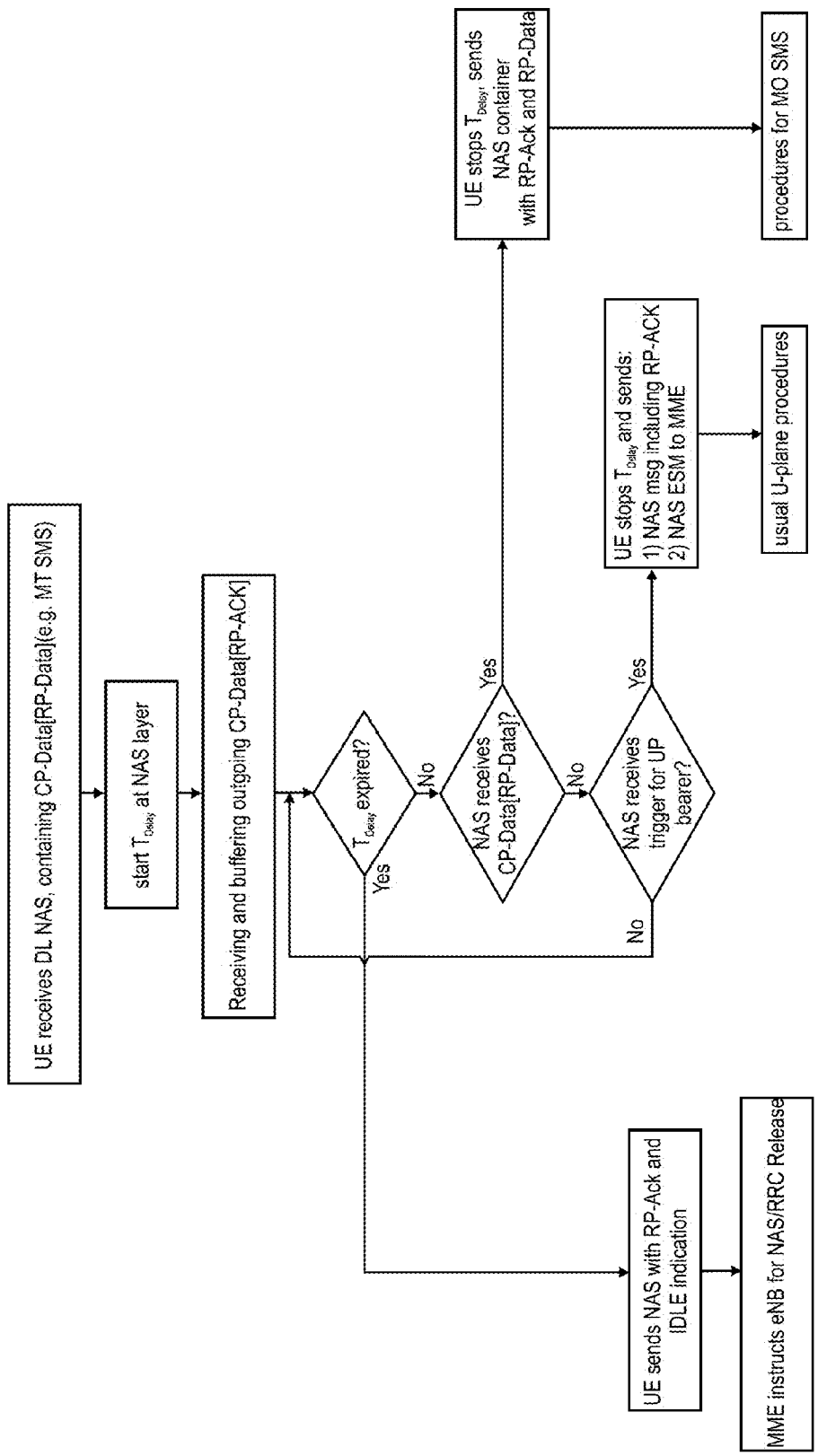
FIG. 24 is a flow diagram illustrating the steps performed for a general embodiment of the invention.

In the embodiments of FIGS. 23 and 24, the timer and also the procedure for checking for uplink data is described and depicted as being implemented in the MM-entity of the UE. In alternative embodiments of the invention however the timer functionality and the corresponding monitoring mechanism for stopping the timer may be implemented in the SMC-entity too.

FIG. 24 is a flow diagram showing the various steps that are to be performed for one particular embodiment of the invention.

The flow chart of FIG. 24 refers to the case of MT SMS and starts with the UE receiving the MT SMS (RP-Data RPDU) within a CP-Data CPDU. According to this embodiment, the reception of the MT SMS triggers the radio resource release timer. Further it is assumed for this particular embodiment that the idle indication is transmitted together with the RP-Ack message, which is acknowledging the successful reception of the MT SMS. To said end, the uplink CP-Data CPDU containing the RP-Ack is buffered and delayed in the NAS layer of the UE until the radio resource release timer expires.

The radio resource release timer, termed $T_{Delay}$ in FIG. 24, is checked continuously to determine when it expires. If it expires (branch "Yes"), the UE sends the CP-Data CPDU with the RP-Ack and the idle indication to the MME, as the explicit idle indication is optional as described previously. In response thereto, the MME starts the radio resource release procedure with eNB, by instructing the eNB for NAS/RRC release (e.g. send UE Context Release command).

While the timer does not expire (branch "No"), the UE further checks whether the NAS layer of the UE receives CP-Data CPDUs including RP-Data (not the RP-Ack). In other words, the UE checks whether uplink data is to be transmitted. If so (branch "Yes"), the UE stops the timer $T_{Delay}$ and sends the CP-Data CPDU with the RP-Ack and the RP-Data, that aborted the timer, to the MME.

If no uplink data is detected (branch "No") for MO SMS, however the UE receives a trigger for uplink data bearer establishment indications (in case no DRBs are setup) or data bearer utilization (in case DRBs are setup) from upper layers non-SMS applications in the UE (branch "Yes"), the UE also stops the timer and sends the NAS message with the CP-Data CPDU with RP-Ack and a corresponding NAS (E)SM to the MME.

It should be noted that the simultaneous running of radio resource release timers in both UE and MME is not desirable, as this could lead to too large delay in the release of MM and RRC connection. For example, if the MME start the radio resource release timers after receiving the CP-Ack (in case of MO SMS) or CP-Data carrying RP-Ack (in case of MT SMS), wherein the CP-Data were already delayed due to the running radio resource release timer, then the delay for the release of NAS MM connection would take too long time. Therefore, either a configuration, or some negotiation between the UE and MME should be possible to avoid the activation of the radio resource release timer in both entities simultaneously.

Further embodiments of the invention will be described in the following.

Yet another embodiment is described where the downlink small data or MT SMS is carried from MME to UE in a single Downlink NAS message that shall be also used to trigger a RRC connection release (whereas the RRC release may be conditional) in the eNB.

As apparent for example in connection with FIG. 8, after the MME pages the UE, the UE sends a Service Request message to the MME. Then, the MME initiates the establishment of the UE's context in the eNB.

This new embodiment assumes that an optimization of this procedure is performed as to that the establishment of the UE context in the eNB can be optional, i.e. that the MME may omit the UE context establishment because there is only 1 (or few) message to be transmitted. The omission of the UE context establishment in the eNB results in no RRC message encryption over the radio interface.

In said case, the UE may send an RRC indication to the eNB to release the RRC connection. However, besides the RRC connection, there could be a NAS connection in place between the UE and the MME. It could be noted that it is a definition matter if the NAS connection can be considered as established when the NAS encryption is in place but not RRC encryption is applied. In order to have synchronized states in the network and in the UE, it is desirable to also notify the MME about NAS connection release. The need for that notification from UE to MME is that the MME indicated 'conditional' release to the eNB, so that the MME doesn't know whether the radio resources are kept or released, which, putting it differently, means the MME doesn't know whether additional downlink NAS messages can be sent or not.

One possible solution is to apply the "IDLE" indication from UE to MME as described above in connection with the embodiments of FIG. 17-24. In more detail, when the MME receives the "IDLE" indication (and Rel-req from SMR entity), the MME sends either S1-AP "UE Context Release" or some other command to the eNB to release the radio resources. However, in the scenario described above, there is no UE context in the eNB, so the S1-AP message for UE-Context Release would make no sense. Thus, it may be needed to change the semantic of the S1-AP message or to specify a new S1-AP message in order to implement the new meaning of just RRC connection release. On the other hand, when the UE receives an "RRC Connection Release" Request from the eNB, the UE should be able to verify the RRC message so as to avoid intrusion.

In the following, the possibilities for the realization of the DL NAS message are described. One possibility is to encapsulate the DL small data or MT SMS in a modified NAS Service Reject message. The NAS Service Reject message may have a new reject cause or an additional flag or indication that DL data is carried in the message and the NAS reject is not due to processing error (or congestion).

Another possibility would be to use the existing "Downlink NAS Transport" message for the DL small data transport, however, to include a request for RRC and/or NAS "connection release". The "connection release" indication can be implemented in different ways:

The "connection release" indication is included only in the S1-AP message from MME to eNB. After the reception of the indication, the eNB would release the RRC connection.

The "connection release" indication is included in the S1-AP message from MME to eNB and in the DL NAS message (carrying the small data) from MME to UE.

In general, the optimization proposed in this embodiment is that only a single NAS message is sent from the MME to the UE fulfilling 2 functions: a) carrying the DL small data and 2) triggering the NAS MM and RRC connection release.

The problem with the above described solution is that the immediate release of RRC and NAS MM connection does not allow the UE to send any uplink data or ACK to the MME. Therefore, another embodiment of the invention proposes proposed to implement a conditional RRC connection release.

Usually, the S1-AP message carrying the DL NAS message would additionally include an "UE CONTEXT RELEASE COMMAND" to indicate to the eNB the deletion of the UE context. According to the new solution, the S1-AP message carrying the DL NAS message (e.g. Service Reject message) instead includes an "RRC conditional release" command to eNB. This conditional release command would mean that the eNB does not automatically delete the UE context, but the eNB deletes the UE context (i.e. releases the RRC connection) only if the UE does not explicitly indicate "keep RRC" in following UL RRC message. Further, if the MME is aware that the downlink message is RP-Data as part of MT SMS transmission, the MME would know that at least one uplink NAS should be expected, i.e. uplink NAS message carrying the RP-Ack RPDU. Thus, the MME shall not indicate immediately RRC release after the transmission of the single downlink NAS message. One possibility is that the MME indicates in the S1-AP message carrying the single downlink NAS message that the RRC connection shall be release after the reception of at least one uplink RRC message from the UE carrying the RP-Ack RPDU.

The notion of the indication "keep RRC" is symbolic and generally means that the UE would like to keep the RRC connection. The "keep RRC" indication can be implemented e.g. as an explicit RRC indication in the UL RRC message, or by sending a consecutive NAS message to the MME, or by the establishment of DRBs that are triggered by the MME during the E-RAB establishment procedure.

The eNB may have a specific timer (e.g. termed Tcond_rel) to wait for the UL RRC message with the indicatio "keep RRC". The value of this timer in the eNB can be either signalled from the MME per UE, or may be statically configured in the eNB, or the timer value can be calculated in the eNB based on various conditions.

Please note that the eNB usually has a further timer for triggering the IDLE mode transition for each UE and is configured by the network operator in the eNB. If the UE does not receive or send any packets within the duration of that timer, the eNB sends an S1-AP "UE CONTEXT RELEASE REQUEST" message to the MME. Then, the MME initiates the RRC connection release by sending a "UE CONTEXT RELEASE COMMAND" message to the eNB. The timer running in the eNB for IDLE mode transition is re-started each time when a UE UL or DL packet is sent over the air interface.

The timer in the eNB to implement "RRC conditional release" procedure (Tcond_rel) is different from the timer for IDLE transition. One difference is that the Tcond_rel timer is started by the RRC connection release indication ("UE CONTEXT RELEASE COMMAND" message) from the MME. The duration of the Tcond_rel timer is also much shorter than the duration of the timer for IDLE transition. And a further difference is that the Tcond_rel timer is terminated by the symbolic "keep RRC" indication from the UE.

The "keep RRC" indication can be also implemented in the NAS layer (e.g. "keep NAS"), e.g. the UE sends in the UL NAS message an indication to the MME that the NAS MM connection should not be release.

In this embodiment as described above, 2 options are possible for the RRC connection establishment: a) the UE's context is pushed in the eNB or b) the DL NAS message (with the small data or MT SMS) is sent over an unencrypted RRC connection to the UE. The DL NAS message itself can be encrypted, as the UE would be able to decrypt the message.

One advantage is that this optimization saves S1-AP and RRC signalling for explicit triggering of the IDLE mode transition as described currently in the standard. However, changes to the eNB may be needed. For example, the eNB should be able to map the DL NAS messages over unencrypted SRB1 bearer instead of encrypted SRB2 bearer.

If the DL small data is a single message, including the small data in a modified Service Reject message is beneficial because there is no expected UL data. However, usually when the MT SMS has to be transmitted, the UE must send at least RP-ACK to the network; in this case, the NAS MM and RRC connection shall not be released immediately after the transmission of the DL NAS message so as to be able to transmit the RP-Ack to acknowledge the MT SMS.

In one example, a new kind of "unreliable MT SMS delivery service" can be specified, for which the MME does not need to receive an acknowledgement that the Service Reject message was successfully received. Respectively, the SM-SC also does not need to receive an acknowledgement for the delivery of the RP-DATA, i.e. the MT SMS. This sub-option can lead to problems if there are radio link problems and the NAS Service Reject message cannot be delivered error-free to the UE.

In another example, if the MT SMS is a Device Trigger message (meaning that UL data shall be send in response thereto), the subsequent U-plane bearer establishment, or the MO SMS, or the UL small data may be used as the acknowledgement for the delivery of the DL NAS message carrying the Device Trigger message, i.e. MT SMS. The disadvantage of this sub-option is that the UE needs to initiate RRC connection and NAS MM connection establishment after the reception of the NAS Service Request message.

The general disadvantage of the solutions proposed in this embodiment is that the UE needs to send an explicit indication ("keep RRC") to the MME and/or eNB if the UE would like to keep the NAS MM connection. This would mean in some cases an additional NAS message that needs to be sent.

The following procedure describes the complete signalling flow:
  the UE is paged (possibly with a special indication for MT small data as described previously in the invention);
  the UE sends a Service Request (possibly with a "small data" indication as described previously in the invention) to the MME;
  the MME sends to the UE a NAS DL message (modified Service Reject or DOWNLINK NAS TRANSPORT) carrying the MT small data and including a "release" indication to the eNB and/or to the UE. Note the MME can decide to use this option if the MME is aware that the DL small data is a single downlink message, i.e. not a part of a concatenated SMS;
  after receiving the DL NAS message and after processing the content of the message, if the UE needs to send UL data, the UE may proceed in the following way:
    if the UL data would result in U-plane EPS data bearers, the UE sends a second NAS MM Service Request or NAS (E)SM message (e.g. PDN connectivity request) to the MME indicating the need for data bearers;
    if the UL data would result in C-Plane connection utilization (e.g. for MO SMS), the UE sends an UL NAS message carrying UL data. The UE indicates to the MME (and possibly to the eNB) that the NAS connection shall not be released. The UE further may apply the mechanism disclosed previously in this invention, i.e. the applicability of radio resource release timer and "idle indication" to the MME.
  the eNB does not release the RRC connection.
  either the UE or the MME decides for the termination of the NAS MM connection and RRC connection based on the amount of UL and DL data to send (please see above).

Yet further embodiments of the invention will be explained in the following. An additional embodiment of this invention deals with the scenario of an UE having multiple MTC Applications, where at least one of the MTC Applications is delay tolerant. "Delay tolerant" means that the UE may have data for transmission, but a delay in the transmission of the data is not critical. A reason to delay the transmission could be to save radio resources and power consumption and transmit the delay tolerant data when the connection to the network is triggered by other applications or scheduled TAU procedure. The UE could then send the UL data for the delay tolerant MTC Application when transiting from IDLE to ACTIVE state.

As has been previously described, UE sends UL data statistics in the Extended Service Request to the MME, so that the MME may decide whether EPS data bearer establishment is needed. In case the UE has outstanding UL data from MTC delay tolerant application to send, the UE can indicate also this outstanding data in the Ext. Service Request. One problem with this solution is that the indication from UE may be unclear and the MME decision may not be correct (e.g. use C-plane/NAS, but the UE sends data to different PDN connection). Therefore a solution is needed to tackle this problem.

The solution in this embodiment of the invention is based on an explicit indication from the UE in the Ext. Service Request which particular data bearer (which PDN connection) is additionally needed, along with the UL data (e.g. SMS transport) resulting from the MT small data or MT SMS. Consequently, MME establishes DRB for delay tolerant MTC Application and MT SMS transport (and potentially resulting MO SMS) over NAS is performed in parallel.

Optionally, the UE can send usual Service Request (not an Ext. Service Request as response to paging) and later using ESM (EPS Session Management) messages can activate a particular EPS bearer for the delay tolerant MTC application. For example, after sending the Service Request and receiving the DL small data or MT SMS (e.g. encapsulated in DOWNLINK NAS TRANSPORT message) meaning that no EPS bearers are established, the UE may send an ESM PDN connectivity request to the MME in order to explicitly request the establishment of EPS bearer to a given APN for the delay tolerant MTC Application. If the network decided to setup EPS data bearers after the UE sent (Extended) Service Request, however the delay tolerant MTC application needs a separate EPS bearer the following options can be possible:
  If the delay tolerant MTC application needs a different APN, the UE sends a PDN connectivity request to the MME to establish a new PDN connection to the different APN;
  If the delay tolerant MTC application needs a dedicated EPS bearer, the UE sends an EPS Bearer Modification request in order to trigger (if the network decides to) the dedicated EPS bearer establishment.

Short Message Handover Procedure

In the following various embodiments of the invention will be described, relating to an improved handover procedure that allows the mobile node to change the radio access technology with a reduced impact on the radio resources.

Figure 31:
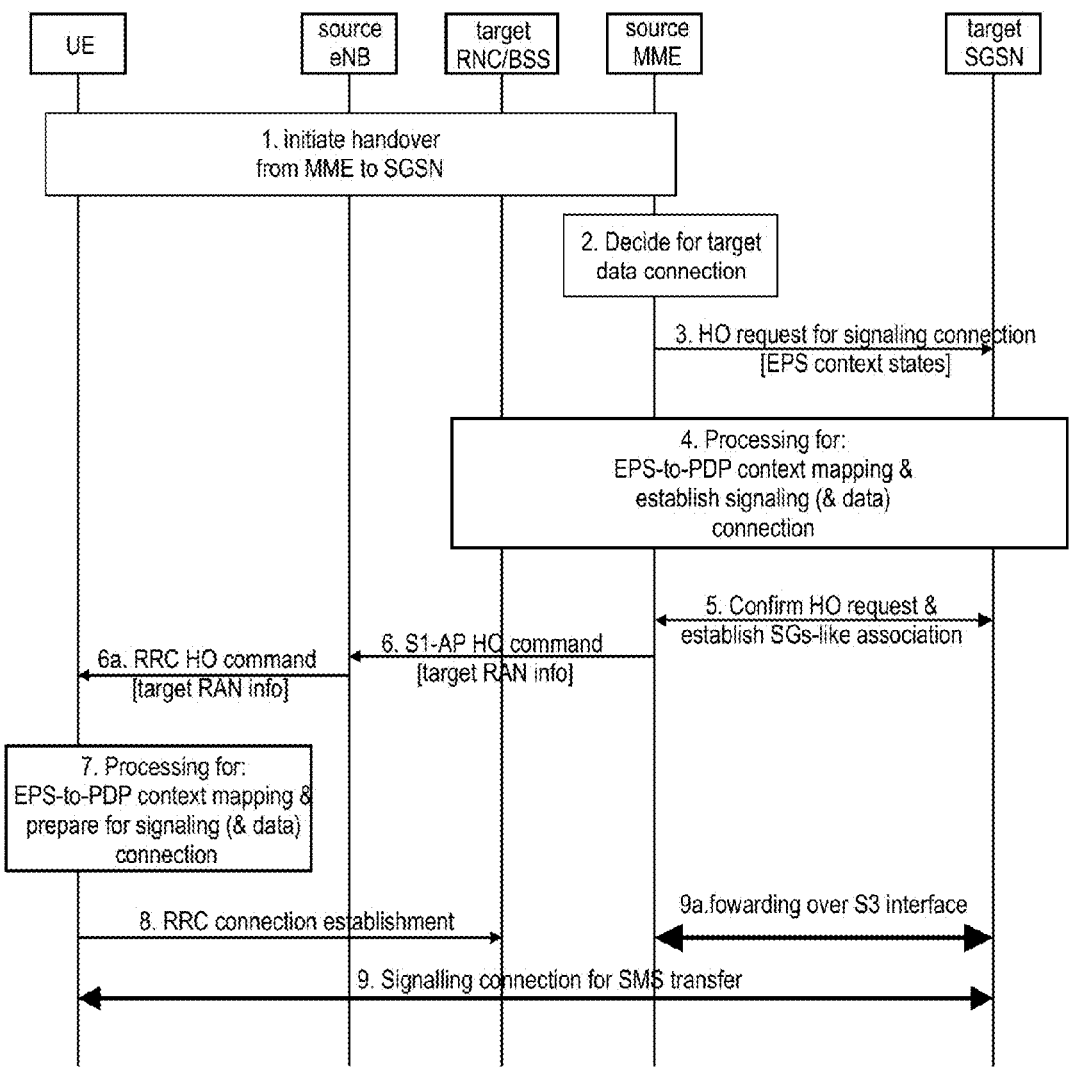
FIG. 31 shows an exemplary message exchange for an embodiment of the invention, where an improved handover procedure is performed during SMS-only transmission.

More specifically, FIG. 31 illustrates a high-level and exemplary signalling exchange between the entities implementing the principles used for this embodiment of the invention. The following scenario is assumed for illustration purposes only.

It is assumed that the mobile node is currently exchanging SMS with the network, i.e. the SMS-SC, For now, it should be assumed that the UE is located in E-UTRAN and is exchanging the SMS via the MME; either, directly with the SMS-SC over the SGd interface or natively via the SGs interface to the MSC server.

The UE will always have signalling bearers (e.g. SRB0, SRB1, SRB2) between the UE and the eNB and at least one default data bearer (DRB, Data Radio Bearer) established within the LTE network; optionally, further dedicated EPS bearers are established for user data transmission. The eNB has a control plane connection with the MME and user plane connection with the SGW for each active UE. The default data bearer is established independent from whether it is actually used for user data transmission or not. Thus, if only small data (i.e. over signalling connection) is exchanged in the LTE network with the mobile node over the control plane, the default data bearer is still established and active in the LTE network for the mobile node.

Step 1)

The eNB wants to handover he mobile node to another target access (e.g. served by the SGSN) according to measurements reported by the UE while the SMS exchange is ongoing, i.e. before the SMS exchange is completed. Correspondingly, the eNB initiates the handover by indicating this to the MME. Step 1 thus can also be considered to include the radio measurements performed by the UE and reported by the UE to the eNB.

Step 2)

Now it is necessary to decide whether a corresponding data connection in the UTRAN is to be established or not. In the exemplary embodiment of FIG. 31, it is assumed that the source MME takes this decision. However, this decision might be performed not only by the MME but also by the UE and/or the eNB; in general, it can be said that one of the entities in the LTE network involved in the small data exchange of the mobile node performs the decision.

Furthermore, how this decision is taken may differ as well from one embodiment of the invention to another, as will be explained in the following.

According to one embodiment, it may be determined whether the default EPS data bearer of the LTE network is actually used for data transmission at the moment. If it is determined that no data has been exchanged in the uplink or downlink since the activation of the S1-U bearer (or just not exchanged within a given time), it may be decided that a data connection is not necessary in the UTRAN. This determination may be based on data statistics from the UE, Serving Gateway or eNB relating to the user plane data exchange via this default data bearer. Correspondingly, the node performing the decision (e.g. the MME) will acquire the appropriate information from one or more of the other nodes (e.g. the UE, Serving-Gateway or eNB).

According to a particular embodiment, the MME may also configure the eNB during the S1-U bearer establishment to report the S1-U statistics to the MME, at the time when the eNB informs the MME that inter-RAT handover is required (step 1). Correspondingly, in step 1, the UE reports the radio measurements to the eNB, and when the eNB decides that an inter-RAT handover is needed, the eNB informs the MME via e.g. an S1-AP message, to prepare the inter-RAT handover. Preferably, the "handover required" message (step 2 of FIG. 29 of standard preparation phase) may be extended so that the eNB can inform the MME about the statistics of the data exchanged in the uplink and downlink after the establishment of the S1-U bearer to the Serving-Gateway.

According to an alternative embodiment of the invention, the UE (instead of the eNB) informs the MME about the data exchange. Either the MME asks the UE directly for the data statistics (e.g. upon receiving the "Handover Required" message in the MME from the eNB); or, the UE might inform the MME without explicit request, since the UE has established the U-plane bearer only for SMS transmission over the signalling connection and thus may know that the network may need such information for the determination in step 2). One option for the transport of the data statistics is that a separate NAS signalling message from the UE to the MME is used. Another option would be to specify a new informational element which is carried in an existing NAS message, e.g. NAS EMM Informational message.

According to a further embodiment of the invention, instead of transmitting a lot of information about data statistics, the UE can transmit an indication as to whether data exchange over the user plane data bearer was or is being performed or will be performed in the near future. Again, this indication may be transmitted in a separate NAS signalling message from the UE to the MME or alternatively piggybacked in a NAS message used for the SMS transmission; e.g. as a bit ("active bit"). Please note that the UE needs to be modified for this and the previous embodiments in order to perform such information exchange with the MME.

According to still other embodiments of the invention, the decision on whether to establish or not the data connection in UTRAN can be taken without the need for data statistics or indications from the UE as explained in the embodiments above. In particular, in case that the UE was in CONNECTED state before the SMS transmission began, it can be assumed that the data bearer in the LTE network was indeed used, and might thus be used again after the handover to the UTRAN. Each EPS bearer is assigned an ARP value (Access Retention and Priority) relating e.g. to the UE having ongoing emergency, MPS (Multimedia Priority Service) or IMS services. If this ARP value for the default data bearer in the E-UTRAN is high (i.e. higher than a pre-defined threshold value), then a corresponding data connection shall be established in the UTRAN, independent from the current usage of the data bearer in the E-UTRAN. Also, when it is known that the UE is triggered to transmit data is response to the SMS received (SMS used for device triggering), then it can be inferred that the UE will start data transmission once the SMS transmission is completed. In this case also, a data connection shall be established in the UTRAN, independent from the current usage of the data bearer in the E-UTRAN.

Above, various ways have been described how to determine whether a data connection (corresponding to the default data bearer in the E-UTRAN) is to be established or not. Furthermore, independent from which entity exactly takes the decision (be it MME, UE, eNB), the MME needs to know the result of the decision, i.e. needs to know whether the handover procedure shall also be such as to establish a data connection in the target network (UTRAN) or not, since the MME shall continue with the handover procedure according to the following step 3).

For the further handover procedure, it is mainly assumed that it was decided to not establish a data connection in the UTRAN, unless otherwise described.

Step 3)

The MME, termed source MME in FIG. 31, informs the target SGSN that the mobile node will perform a handover to it, and transmits the EPS bearer contexts of the LTE network to the SGSN. The EPS bearer contexts relate to the data bearer established and active in the LTE network for the UE that wants to perform the handover; there are no EPS bearer contexts for the SRBs in LTE.

In the assumed exemplary scenario, since only the default data bearer is established in the LTE network (only SMS data exchange), only the EPS bearer context for this default data bearer is transmitted to the SGSN. Furthermore, since the MME (or another node) decided that no data connection is necessary and shall be established in the UTRAN, the MME also informs the SGSN that the PDP context (corresponding to the EPS default bearer context of the LTE) shall be kept in "preserved" state. "Preserved" basically means that the SGSN may contact the Serving-Gateway (SGW) to establish the S4 association or tunnel for this PDP context (see Step 4) below), however the SGSN does not request the target access network (i.e. RNC/BSS) to establish corresponding radio access bearer (RABs); thus, the PDP context is not activated (using the 3GPP terminology the PDP context is "preserved" in the SGSN and core network)

According to one embodiment of the invention, this is initiated by the MME by informing the SGSN about the state the EPS bearers shall have, by including the E-RAB ID (of the default data bearer) and indicating for this E-RAB ID of the default data bearer the state "preserved". This is to explicitly inform the SGSN that no activation of the PDP context (RAB in the GERAN/UTRAN) is needed. Correspondingly, the message transmitted from the source MME to the target SGSN includes not only the EPS bearer context(s) but also the state of each context.

Additionally, the MME may inform the SGSN that SMS PDUs will be forwarded after or during the handover process, as there is ongoing SMS transmission between the MME and the UE. This can be used as indication to the SGSN that the control plane connection in the target access (UTRAN/GERAN) will be used for SMS transmission.

Step 4)

This step includes the processing performed by the SGSN and the target network. As usual, the EPS contexts are mapped to PDP contexts by the SGSN and stored. Furthermore, in case the SGSN did not previously store context for the mobile node (depending on whether a connection to the Serving-GW has already been established previously for the mobile node e.g. UE was already attached to the SGSN previously or the ISR was activated for the UE), the SGSN might need to establish a connection with the Serving-Gateway, in particular an S4 association or tunnels, for the PDP context.

The SGSN might also generate a PDP context ID for each PDP context mapped out of the received EPS bearer contexts; the PDP context ID will be used in the further handover procedure as apparent from below.

Correspondingly, the SGSN stores the PDP contexts (mapped from the received EPS bearer context(s)) and does not contact RNC/BSS to establish contexts there and thus establish a data connection in the UTRAN network.

However, the SGSN contacts the target RNC/BSS to inform about the outstanding handover and to establish the signalling radio bearers in the target access network in correspondence with the signalling radio bearer of the E-UTRAN. For that purpose the RNC contacts the target NB and in the BSS the BSC (base Station Controller) contacts the BTS (Base Transceiver Station) to prepare for the coming UE. Further, the Iups or Gb association between the RNC or BSC and SGSN is established for the UE. Please note that the BSS includes the BSC (which may include PCU, Packet Control Unit for connection with the SGSN) and BTS.

In summary, in step 4) it is achieved that by providing the "preserved" state information regarding the EPS bearer context of the EPS default data bearer in the E-UTRAN, the SGSN avoids establishing a corresponding data bearer in the UTRAN or GERAN network which might waste radio resources, but the SGSN prepares the radio access entities for the control plane connection.

Step 5)

This step is termed "Confirm HO request" to make clear that the target SGSN basically confirms to have correctly received the handover information, and also the indication about the preserved state of the PDP context. Furthermore, the SGSN replies to the MME, including radio specific information, to be used by the UE. As already explained, the SGSN may confirm the establishment of the "preserved" PDP contexts. Assuming that various EPS bearer contexts were transmitted from the MME to the SGSN, since some of the PDP contexts may not be established by the SGSN (e.g. due to congestion), it is advantageous to inform the MME about the result of the requested establishment/preservation of PDP contexts. The result could be e.g. "success" and "non-success". Also, the generated PDP context ID is transmitted to the MME; usually, the RAB ID would be transmitted to the MME, but since no data connection (i.e. RAB) is established in the SGSN, as explained in Step 4), no RAB ID exists.

Additionally, in this step, an association may be established between the SGSN and the MME that is like the SGs association between MSC and MME, i.e. allowing the transport of SM-CP PDUs (and paging) between the MME and the SGSN.

Step 6, 6a)

The MME compiles the information that shall be carried to the UE and sends it to the eNB e.g. using an S1-AP message, and further to the UE. The transmitted information allows the UE to know which bearers were activated in the target UTRAN network (i.e. SGSN). In general, the target RAN information transmitted to the UE includes information on parameters related to the target access (i.e. UTRAN). In the current standardization, this would include the RAB ID of the PDP contexts that are established (activated) in the target access, however no explicit state of the bearer contexts is transmitted, i.e. "preserved", "active" or "deleted". Currently, the bearer context that is not established in the target access is deleted in the SGSN/MME and preserved in the UE.

According to one embodiment, the target RAN info might thus include the PDP context ID of the PDP contexts established in the SGSN but kept in "preserved" state. Optionally, the target RAN info might include the EPS bearer context ID and the state of the EPS bearer context in the target access, similar to Step 3).

According to a further embodiment, if the HO command message of step 6, 6a) does not contain RAB ID(s) of the PDP contexts for the target access, the UE may interpret the message with missing RAB ID(s) such that it only has to establish the signalling bearers/connection in the UTRAN, despite the EPS contexts stored in the UE for the E-UTRAN; the EPS contexts for UTRAN are mapped to corresponding PDP contexts and kept in "preserved" state, i.e. merely stored in the UE but not further used or activated. Put differently, according to this further embodiment, the bearer context state is not reported from the MME to the UE, but rather only the established signalling bearer(s) in the target access, such that the UE sets the EPS bearers from the E-UTRAN access to PDP contexts in preserved state for the "not-indicated" (missing) RAB-IDs. In the particular scenario of the invention where only signalling connection is established in the target access, the handover command message would contain info about the target NB or BTS (optionally channels or time slots to be used, assigned temporary radio identifiers and core network identifiers) but no info about the established user plane bearers (i.e. no RAB IDs). During later RAU/TAU procedures or Service Request procedures the PDP bearer context kept in the network and those kept in the UE can be aligned i.e. the PDP/bearer context(s) deleted in the network would be then deleted in the UE.

In this connection it might be also mentioned that currently, if no data bearers can be established in the target access, the inter-RAT handover would fail (see e.g. TS 23.401, Section 5.5.2.1.4). This of course shall be differently handled in the present embodiments; the inter-RAT handover is successfully finalized even though no data bearers were established in the target access.

MME should keep the EPS bearer context(s) for which PDP context(s) were established in the SGSN (i.e. MME does not deleting the EPS bearer context and the corresponding S11 connection with the Serving GW). This is different from the prior-art shown in FIG. 29, as in FIG. 29 the EPS bearers are deleted in the MME (and no corresponding PDP context is stored in SGSN) if there is no corresponding RAB ID in Step 5.

Step 7)

As already hinted at above in the description for Step 6,6a), the UE needs to process the Handover command received from the MME, respectively eNB. This includes that the UE sets the PDP context for the target access in the preserved state, according to the explicit or implicit indication from the MME (see step 6,6a).

According to further embodiments of the invention, the state of the PDP context could also be "deleted", in which case the UE deletes the corresponding EPS bearer contexts for an active EPS bearer in response to the handover command message.

According to more specific embodiments, the UE might also ignore or immediately overwrite the instructions received in the HO command message regarding to or not to establish the data connection (i.e. regarding the state of the data connection) in the UTRAN. For example, the UE may set a bearer context to the state "preserved" in response to the Handover Command message, but decide to immediately initiate the activation of the context after the establishment of the signalling connection in the target access. This processing opposing the MME's instructions within the HO command message may be advantageous in case the MT SMS is used for device triggering, i.e. triggers the UE to transmit user data in the uplink using the data connections; thus, the data connection is still established and used for sending the uplink data after the SMS transmission is completed in the target access (GERAN/UTRAN). Similarly, when the state indicates "deleted" for an EPS context, the UE would not delete the EPS bearer context but actually initiate the data bearer establishment in the target access. To this end, the UE would request the user-plane bearer establishment e.g via a dedicated PDP context activation signalling to the SGSN over the target access.

Step 8)

In this step the UE performs the radio specific procedures for the inter-RAT handover, by initiating the RRC connection establishment with the target RNC/BSS. This includes the establishment of the signalling radio bearers with the RNC/BSS according to the information indicated in the target RAN info of step 6, 6a).

After step 8) the UE has basically a signalling connection with the SGSN (and under the premises of the assumed exemplary scenario no data bearer connection), and can continue to exchange SM-CP PDUs or other NAS signalling messages.

Step 9, 9a)

Figure 32:
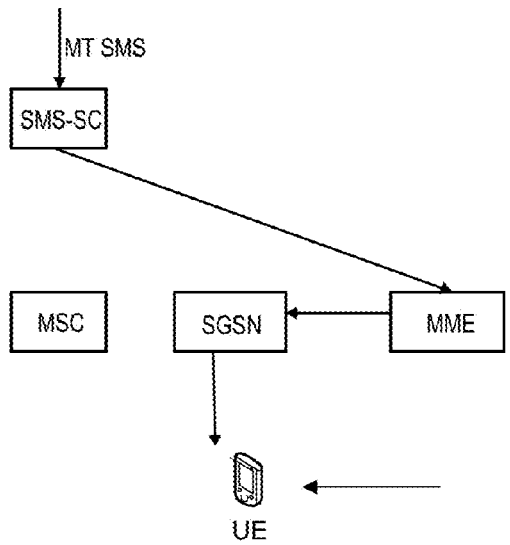
FIG. 32 illustrates the SMS delivery route according to one embodiment of the invention, as explained in connection with FIG. 31

The exchange of the SMS PDUs is performed via the source MME and the target SGSN (see step 9a) over the SGs-like association of the S3 interface. The SMS can then be delivered in the UTRAN to the UE. FIG. 32 illustrates the SMS delivery route for an MT SMS after the handover according to the above embodiments is performed.

Please note that after successful completion of the handover procedure, the MME continues to keep the ESM bearer context(s) that were established in the SGSN in preserved state; this is to allow for a later activation of ISR. The MME keeps the association with the Serving-Gateway for the preserved PDP bearer context(s) in order to be able to receive paging messages from the Serving-Gateway, or to allow the registration of the UE (when the UE sends NAS ServiceRequest message). In this way the SGSN can set the ISR indication to the UE in the NAS signalling to indicate to the UE that ISR is activated. However, if the ISR shall not be supported, which can be negotiated between the SGSN and the MME e.g. in steps 3-5 of FIG. 31, the MME can delete the Session Management (SM or aka ESM) context for the UE, and keep only the Mobility Management (MM or aka EMM) context.

The above procedure can also be implemented in already existing standard procedures specified by 3GPP. In particular, for a more detailed and exemplary embodiment of the invention, the above explained steps 1-9) are implemented into the preparation respectively execution phase of TS 23.401 as explained in connection with FIGS. 29 and 30. As explained in the following, the embodiments of the invention change some of the steps performed in the standard and/or add additional processing (e.g. at the MME, UE and SGSN) not yet defined in the standard. Those steps of the standard procedure of FIG. 29, 30 not mentioned in the following can thus be considered to basically remain the same.

Figure 29:
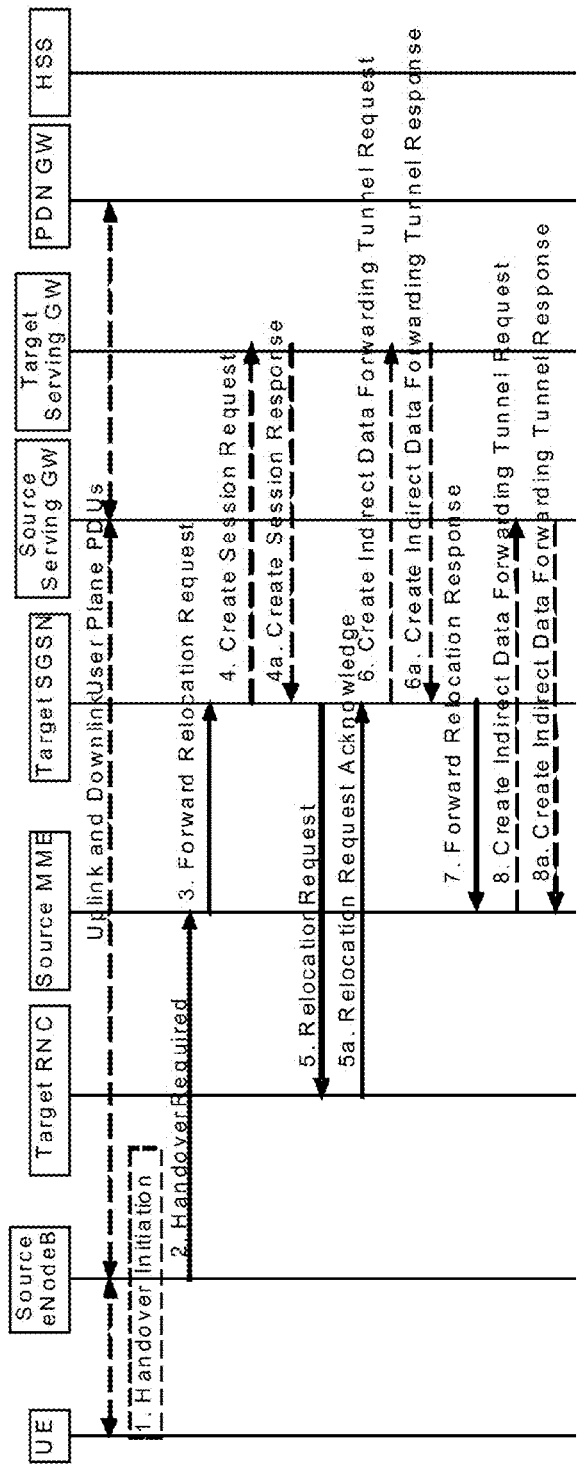
FIG. 29 illustrates the preparation phase of a inter-RAT handover from E-UTRAN to UTRAN.

In particular, step 1) of FIG. 31 corresponds basically to steps 1) and 2) of the preparation phase of FIG. 29. Step 2) of FIG. 31 is a new step not performed by the MME according to standard procedure in FIG. 29.

Step 3) of FIG. 31 corresponds to step 3) of the preparation phase of FIG. 29, and in particular to the Forward Relocation Request message exchanged therein. The processing of the SGSN according to step 4 of FIG. 31 is mostly different from the one of the standard, but can be considered to be associated with steps 4, 4a, 5, 5a (and 6, 6a) of the preparation phase of FIG. 29.

Step 5 of FIG. 31 can be compared to step 7 of FIG. 29, and in particular to the Forward Relocation Response message, however with the additional changes as explained above. The Handover command message of step 6) of FIG. 31 corresponds to the Handover Command message of steps 1 and 2 of the execution phase of FIG. 30.

The processing of step 7) of FIG. 31 overlaps with the processing necessarily performed in the UE during the standard handover procedure (not properly defined in the standard document), but further includes the changes as explained above.

Figure 30:
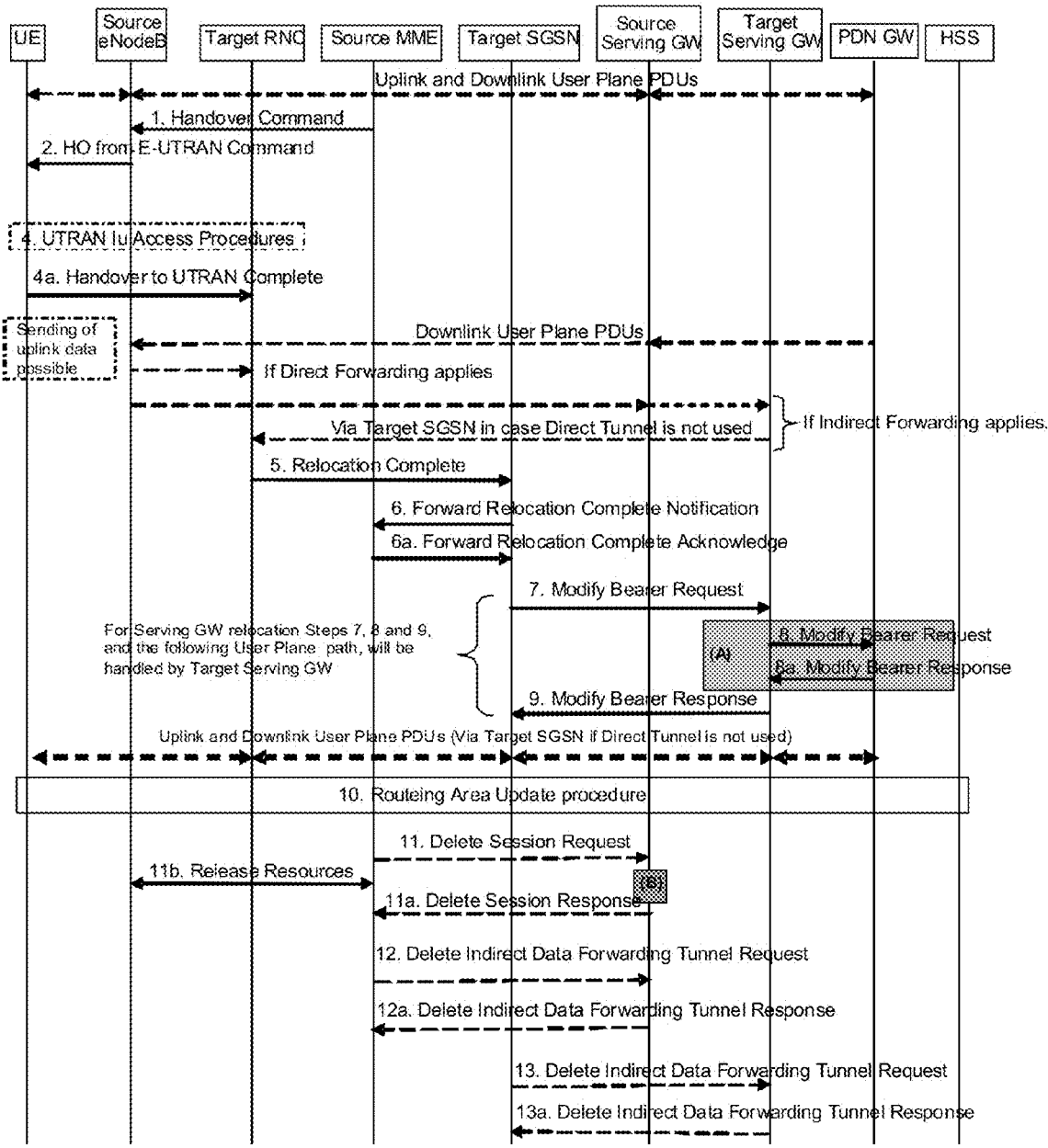
FIG. 30 illustrates the execution phase of a inter-RAT handover from E-UTRAN to UTRAN.

Step 8) of FIG. 31 may be considered to correspond to step 4, 4a in the execution phase of FIG. 30, albeit with the changes as explained above.

Further Variants

An alternative to the above decision by the MME whether U-plane bearers are needed in the target access is that the eNB detects and decides the need for U-plane bearers. Therefore, when the MME receives an SMS for a UE in IDLE mode, the MME may inform the eNB in the paging message that the paging is for SMS only. The eNB may store this information and initiate UP data exchange monitoring when the UE is transferring to CONNECTED mode. Then, when during the SMS transmission over the NAS connection the eNB decides, based on measurements from the UE, to handover the UE to GERAN/UTRAN, and no UL/DL data traffic exchange was monitored since the UE is in CONNECTED mode (or alternatively for a given time period), the eNB may decide to not establish the data radio bearers in the target RAT and therefore include an SMS-only indicator into the "Source to Target Transparent Container" in the "Handover Required" message. Based on the SMS-only indicator, the target RNC follows the instruction to not establish some or all radio bearers and save resources. The RNC informs the SGSN about the decision and the SGSN keeps the non-established bearers in preserved state.

Another alternative to avoid U-plane bearer establishment in the GERAN/UTRAN access when a handover is triggered by the eNB is to not perform a handover, in case the MME is aware by one of the mechanisms mentioned further above that U-plane is not needed, but to release the S1-AP signalling connection with an indication to redirect to GERAN/UTRAN and optionally an indication that this is for SMS only. In this case the eNB releases the RRC connection to the UE together with additional information about the target GERAN/UTRAN network. The UE moves to the new GERAN/UTRAN cell, using the provided information from the eNB, and establishes only the radio signalling connection (and if necessary indicates "Terminating Signalling" or "Terminating High Priority Signalling" as RRC establishment cause) and sends a Routing Area Update message to the SGSN. The MME, when triggering the S1 release, may already forward the UE context information to the SGSN (and optionally indicates UE redirection) to accelerate the mobility procedure, i.e. when the RAU is received at the SGSN, the UE context information is already available.

The above-described embodiments are basically applicable to handovers during MO or MT SMS transmission, considering the corresponding route direction change of SMS delivery.

Furthermore, it should be repeated that although the above has been described with reference to SMS mostly, the embodiment are applicable to small IP data transferred in the signalling connection (C-Plane) e.g. over NAS in LTE too. It is however necessary that the SGSN supports the small IP data transport over the NAS GMM signalling in the UTRAN/GERAN. So in general, the above embodiments are application to handovers from MME to SGSN for any kind of C-plane connection when the U-plane bearers are not used.

One aspect to be considered is that the network (i.e. MME) needs to know whether the UE supports an inter-RAT handover according to one of the embodiments of the invention. Therefore, during the Attach or TAU procedures to the MME or correspondingly during Attach and RAU procedures to SGSN, the UE may indicate in its UE capabilities the support for this improved handover procedure.

The following aspect refers to the mobile node and how the mobile node can assist the improved handover procedure according to the above-described embodiments of the invention. As explained above, the MME, being the entity which decides on whether a data connection is to be established in the UTRAN or not, uses various kind of information to take this decision. Among other things, the MME can use an indication from the mobile node as to whether (from the viewpoint of the UE) a data connection is (or will be) actually necessary or not, i.e. whether or not to activate the PDP contexts in UTRAN during the inter-RAT handover. Independently from the handover, the UE may know whether it uses or will use a data connection. Consequently, the UE may transmit a message to the MME including such an indication.

For instance, when the UE is in IDLE mode and an MO SMS is to be transmitted, the UE knows that the MO SMS only necessitates the signalling radio bearers but not data connections. Correspondingly, during the NAS Service Request procedure the mobile node can inform the MME about this fact, by using a special "SMS/signalling" indication. Despite this indication, in LTE the MME would set up the data bearer since at least the default data bearer is mandatory in E-UTRAN.

Similarly, when the UE is receiving MT SMS, and the UE knows that the MT SMS is not for device triggering and thus no uplink data connection will be used for user data exchange in response to the MT SMS, the UE can indicate this fact to the MME. As above, this indication can be a special "SMS/signalling" indication transmitted to the MME. One possibility to transmit this indication to the MME would be to use one of the existing NAS EMM messages, e.g. EMM Information message initiated by the UE, or ESM Information procedure initiated by the UE (which would be a modified procedure, as currently the ESM Information procedure is initiated by the network only).

Alternatively, the UE regularly performs measurements of the neighbour cells and/or technologies and reports them to the network (including inter-RAT measurements). Assuming that the signals from the current E-UTRAN are below the threshold for performing a handover, e.g. the better signal strength is from another RAT such as GERAN/UTRAN, the UE can deduce that the eNB might probably decide for an inter-RAT handover. Therefore, the UE in such cases might send additionally to the measurements report a corresponding indication targeted to the MME regarding "SMS/signalling" only needed in the target access.

The above embodiments of the invention refer to a handover from the LTE to the UTRAN network, i.e. from MME to SGSN. In the following it is described how a handover from UTRAN to LTE can be improved considering the principles used in the other embodiments of the invention. Correspondingly, it is assumed that the UE is attached to the UTRAN without the activated PDP contexts (but the PDP context(s) may be in preserved state); such kind of attachment over the GERAN and UTRAN is possible (in contrast to LTE).

In the current standard of the prior art, during a handover from GERAN/UTRAN to LTE for UEs attached without activated PDP context is that the TAU procedure over the LTE access is rejected, and the UE needs to perform the attach procedure. However, if the UE has an ongoing SMS transmission with the SGSN (and no PDP context is activated), the SMS transmission would fail when the UE performs the handover from GERAN/UTRAN to E-UTRAN. This is a severe problem as the failure of the MT SMS transmission would require the SM-SC to store the SMS for later transmission and result in signalling to the HSS/HLR to indicate the storing of SMS and activate a special "waiting" flag in the HSS/HLR.

One exemplary solution to this problem is explained in the following, and refers to that the handover procedure from GERAN/UTRAN to LTE is allowed for signalling connection only.

The MME should be allowed to accept the handover request from the SGSN, although there is no SGW and PGW configured for the UE. If the SGSN has PDP context(s) in preserved state, the SGSN can inform MME about those context(s), so that the MME can establish the S11 connection with the already configured Serving-GW and PGW. If the SGSN has no PDP context for the UE, the SGSN informs the MME about the handover of signalling connection (e.g. due to SMS or small IP data transmission) and MM (GMM) context that is stored in the SGSN.

The handover can thus be completed just for the signalling connection, so that the SMS transmission can continue. During the SMS transmission either 1) the UE shall be configured or 2) instructed by the network (e.g. MME) to perform establishment of the default PDN connection. With other words, when the UE receives a handover command from the source UTRAN NodeB or GERAN BSS to perform a handover to the LTE access, the UE performs a kind of modified TAU procedure in the LTE access. The modified TAU procedure means that the UE on one side establishes the NAS signalling connection with the MME and on other side establishes the default PDN connection in LTE. One example to perform the modified TAU procedure is that the UE performs the PDN connectivity procedure by sending "PDN connectivity request" message immediately (or a short time) after sending the TAU request. Another option would be to append the "PDN connectivity request" message to the TAU request message, however, there cold be a problem of having a too large TAU request message. Please note that the TAU request message is specified as short message in order to allow for a fast transmission. Consequently, extending the message may result in a longer transmission time, which might be considered too long.

Optionally the MME may have a timer which is started with the beginning of the handover. If the UE does not perform the establishment of default PDN connection during the predefined time, the MME may initiate the detach procedure. However, the MME may consider to wait with the detach procedure until the SMS transmission has been completed successfully.

The above embodiment (establishing the default PDN connection during or shortly after the TAU procedure due to handover of signalling connection) can be performed in case that the UE does not have PDP context at all, i.e. the UE was just attached in the GERAN/UTRAN. If however the UE has a (not-activated) PDP context in the source GERAN/UTRAN access (which means that the SGSN would also have a PDP context in preserved state), the UE can perform the handover (with or without performing TAU procedure). So, there is no need to perform the "PDN connectivity request" procedure, as the SGSN would inform the MME with the necessary information for the establishment of the default EPS bearer in the SAE system during the "Forward Relocation Request" procedure.

Another possible solution is that during the handover procedure at least the default PDN connection is established by the MME based on the default subscribed APN signalled from the SGSN. Please note the SGSN can know the default APN when downloading the subscription information from the HLR/HSS during the attach procedure. In this case, when the MME receives the "Forward Relocation Request" from the SGSN without established PDP context, but with a default APN signalled from the SGSN, the MME selects a PDN GW according to the subscription context of the default APN. In addition, the MME selects a Serving-Gateway and establishes the respective EPS bearer. Together with or before the "Handover Request" to the eNB, the MME triggers the EPS bearer context setup establishment in the eNB. With the "Handover Request Acknowledge" from the eNB to the MME, the eNB includes the information about the established radio connection in a transparent container for the UE.

Please note that this transparent container is carried from the eNB over the MME, SGSN, target RNC/BSC to the UE. According to this solution, the UE would be informed with the information about the default EPS bearer via the transparent container. When the UE transfers to the target LTE access, the default PDN connection (default EPS bearer) is established in the eNB (i.e. between eNB and Serving GW). * * *

A further aspect of the invention deals with the problem of how small data is to be transmitted in those cases where the UE is in IDLE mode and activates ISR, ensuring that only the PS-domain is used (i.e. no MSC server is involved in the SMS delivery). Again, small data transmission as currently implemented through SMS is considered; however the following embodiments shall not be reduced to SMS only, but their principles are equally applicable to other small data transmissions (e.g. small IP packets).

It should be also noted that if ISR is not configured/activated (i.e. the UE is always performing registration either at the SGSN or MME when changing RATs while in IDLE mode), the configuration of the default SMS serving node for the SMS routing is not needed, since at all times the HSS/HLR knows where the UE is registered and may inform the SMS-SC accordingly upon request.

The main idea to solve this problem according to the following embodiments of the invention is that a default SMS serving node (in core network) is configured for the SMS transmission; be it the MME or the SGSN. The default SMS serving node is the node to which the MT SMS(s) are transmitted by the SMS-SC. By implementing a default SMS serving node, the SMS-SC always obtains from the HSS/HLR one fix node to which to forward the SMS to, independent from where the UE is currently camping in LTE or GERAN/UTRAN when ISR is active for the UE.

The default SMS serving node is either the MME or SGSN. It should be noted that only a serving node supporting native SMS (with SM-CP/RP protocols) can be selected to be a default SMS serving node since it must be able to directly receive the SM-CP PDUs from the SMS-SC. Correspondingly, in Case A (as defined in the Background Section, see also FIGS. 25-28 and corresponding description) either the MME or the SGSN can be selected as default SMS serving node; in Case B only the MME can be the default SMS serving node; in Case C only the SGSN can be the default SMS serving node.

In Case A, the selection of either the MME or SGSN may depend on the network operator decision. When determining the default SMS serving node, the network operator may take into account the capability of the serving CN node to support SMS PDUs transport over NAS. For example, both MME and SGSN can support native SMS transmission, but only the MME may support SMS PDUs transport over NAS. Then the network operator may wish to select the SGSN as default SMS serving node because in case the UE is in the LTE access the SMS can be transmitted. In contrary in this example, when the MME is selected as default SMS serving node and the UE is located in the UTRAN/GERAN access, the SMS cannot be transmitted via SGSN, as the SGSN does not support SMS PDUs transport over NAS.

Furthermore, the default SMS serving node may be UE-specific. For example, for some UEs the SGSN and for other UEs the MME is configured to be the default SMS serving node in the core network. Alternatively, the configuration of the default SMS serving node may depend on the geographical area; e.g. in areas only served by the MME, the MME is selected to be the default SMS serving node. Furthermore, in geographical areas where the MME and SGSN serving areas are overlapping, the network operator may choose to configure the MME or SGSN to be the default serving node for SMS transmission.

The default SMS serving node is then stored in the network, preferably in the HSS/HLR, which is queried by the SMS-SC when an MT SMS arrives.

Figure 33:
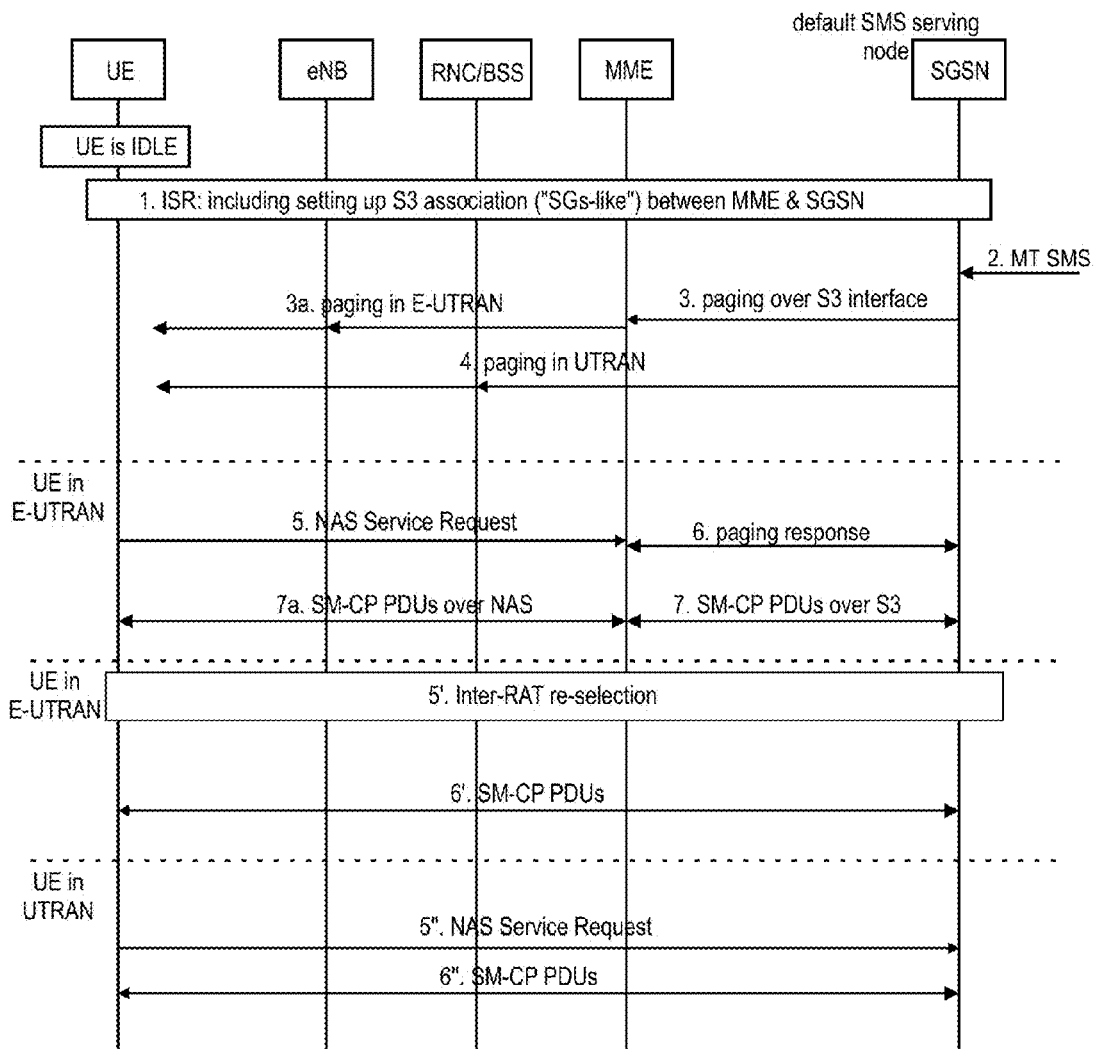
FIG. 33 shows a message exchange according to one embodiment of the invention, where an improved paging and attach mechanism is depicted.

FIG. 33 illustrates one exemplary embodiment of the invention where the SGSN is assumed to be defined as the default SMS serving node. It is assumed that the UE is in IDLE.

Step 1)

ISR mode is activated. In one embodiment of the invention, the activation of the ISR can be used to establish an association between the MME and the SGSN, similar to the SGs-association between the MSC server and the MME. As already explained, during the ISR activation, the SGSN and the MME learn each other's addresses and establish the S3 association including the MM and SM contexts in both SGSN and MME. The S3 association could however be extended to allow for an SGs-like exchange of paging and SMS PDU transmission.

In particular, the S3 interface protocol(s) should be enabled to carry paging messages in both directions, i.e. from SGSN to MME (in case that SGSN is configured as default SMS serving node) and from MME to SGSN (in case that MME is configured as default SMS serving node). Further, after the S3 interface protocol(s) should be enabled to carry SMS PDUs. The non-default SMS serving node should be able to encapsulate the SMS PDUs in NAS MM signaling messages to the UE. Optionally, capabilities regarding the SMS PDU transmission can be exchanged between the SGSN and MME. For example if the non-default SMS serving CN node does not support SMS PDU encapsulation in NAS EMM/GMM messages, the UE should be triggered to change to the default SMS serving node, i.e. the UE is triggered to re-select the access system and attach to the default SMS serving node.

Step 2)

The SMS-SC receives an MT-SMS and requests from the HSS/HLR the SMS serving node for the particular UE. The HSS/HLR storing the SGSN as default SMS serving node informs the SMS-SC accordingly, such that the MT SMS is forwarded to the SGSN identified by the HSS/HLR.

Step 3, 3a)

The SGSN as the default SMS serving node initiates the paging in response to the reception of the MT SMS. In particular, in step 3, 3a this exemplary embodiment initiates the paging for the UE in the other target access, namely the one of the MME. Accordingly, the SGSN must generate a paging message and transmits same to the MME over the S3 interface and using the SGs-like association previously set-up. The MME in turn performs the paging in its network with the received paging message from the SGSN.

Step 4)

The SGSN also pages for the UE in its own UTRAN network in the registered Routing Areas (RAs).

Please note that steps 3, 3a one the one hand and Step 4 on the other hand are interchangeable. It is advantageous that the default SMS serving node initiates the paging for both networks (E-UTRAN and UTRAN) upon receiving an MT SMS.

The paging in steps 3, 3a and 4 may be in general such that it comprises a special indication that the paging is relating to SMS.

FIG. 33 illustrates three alternatives on how to further proceed with the procedure, delimited by the horizontal dashed lines. The paging routes are depicted with dashed lines in FIG. 34. For the first alternative it is assumed that the UE is camping in E-UTRAN, i.e. below MME. The UE thus receives the paging transmitted by the MME.

Step 5)

According to one embodiment of the invention. the UE always tries to register at the serving node of the RAT at which the UE is currently camping. In this case, the UE camps in E-UTRAN, and the UE accordingly performs the Service Request procedure with the MME. Basically, this includes the transmission of the NAS Service Request message to the MME.

Step 6)

After receiving the NAS Service Request message, the MME then informs the SGSN as the default SMS serving node that the UE is located and attaches to the MME.

Step 7, 7a)

The SMS PDUs are then forwarded from the SGSN to the MME over the S3 interface. The MME then can deliver the SMS PDUs to the UE encapsulated in a transparent NAS EMM container (i.e. over NAS). The SM-CP/RP protocols in the network are terminated at the SGSN and the MME encapsulates these SMS PDUs in NAS EMM messages.

Figure 34:
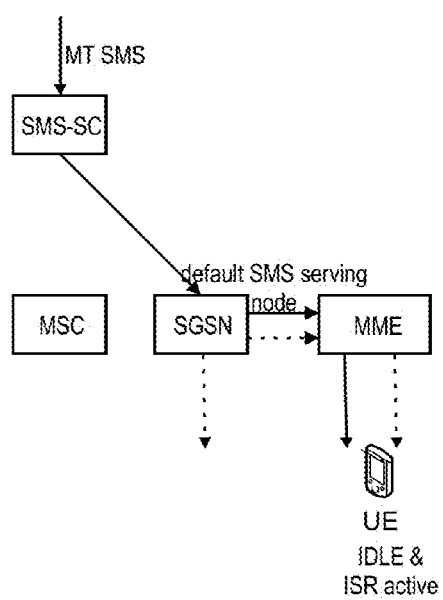
FIG. 34 illustrates the SMS delivery route according to one embodiment of the invention as explained in connection with FIG. 33.

FIG. 34 exemplary illustrates the SMS route for this alternative, where the SMS is exchanged between SGSN and MME, before being delivered by the MME to the UE.

An alternative embodiment is explained in connection with steps 5' and 6', where the UE is paged in such a way, that the UE is pushed to register at the default SMS serving node, independent from where it is currently camping.

Step 5')

Thus, in case the UE is camping in E-UTRAN and MME (which is not the default SMS serving node), after receiving the paging with special indication that MT SMS is to be delivered, the UE performs an inter-RAT re-selection and then registers with the SGSN as the default SMS serving node. For that purpose the UE may need to firstly perform RAU/LAU procedure with the SGSN. During that procedure the SGSN may retrieve or update the UE's context (MM and SM context) from the MME. As the UE was newly registered in the LTE access with the MME, so changes to the MM/SM context might have happened. The SGSN does not necessarily activate the PDP context(s) for the UE if only SMS transmission s to be performed. Please note that the case where the UE receives the paging from the MME, but instead of responding to the MME (with Service Request procedure), the UE initiates RAU/LAU procedure with the SGSN is different from the prior art.

One different variant of this embodiment is that the UE initiates the Extended Service Request (ESR) procedure with the MME in order to initiate the reselection to the SGSN. This is similar, but not identical the CS Fallback (CSFB) scenario where the UE is paged in the LTE access to perform a reselection to GERAN/UTRAN in order to attach with the MSC for voice calls. Here, the UE initiates the ESR procedure to re-select to the GERAN/UTRAN to attach to the SGSN for SMS transmission.

Step 6')

The SMS can then natively be transmitted from the SGSN to the UE.

An alternative embodiment of the invention is illustrated with steps 5" and 6" in FIG. 33. It is assumed that the UE is camping in UTRAN, below the SGSN as default SMS serving node, and thus receives the paging message from the SGSN (see step 4).

Step 5")

The UE in response to the paging performs the Service Request procedure with the SGSN, which includes the transmission of the NAS Service Request message.

Step 6")

The SGSN can then directly transmit the SMS as SM-CP PDUs to the UE in its network. Since the SGSN implements the native transport of SM-CP PDUs and terminates the SM-CP/RP protocols, it is possible for the SGSN to transmit the MT SMS as SM-CP PDUs to the UE.

Figure 35:
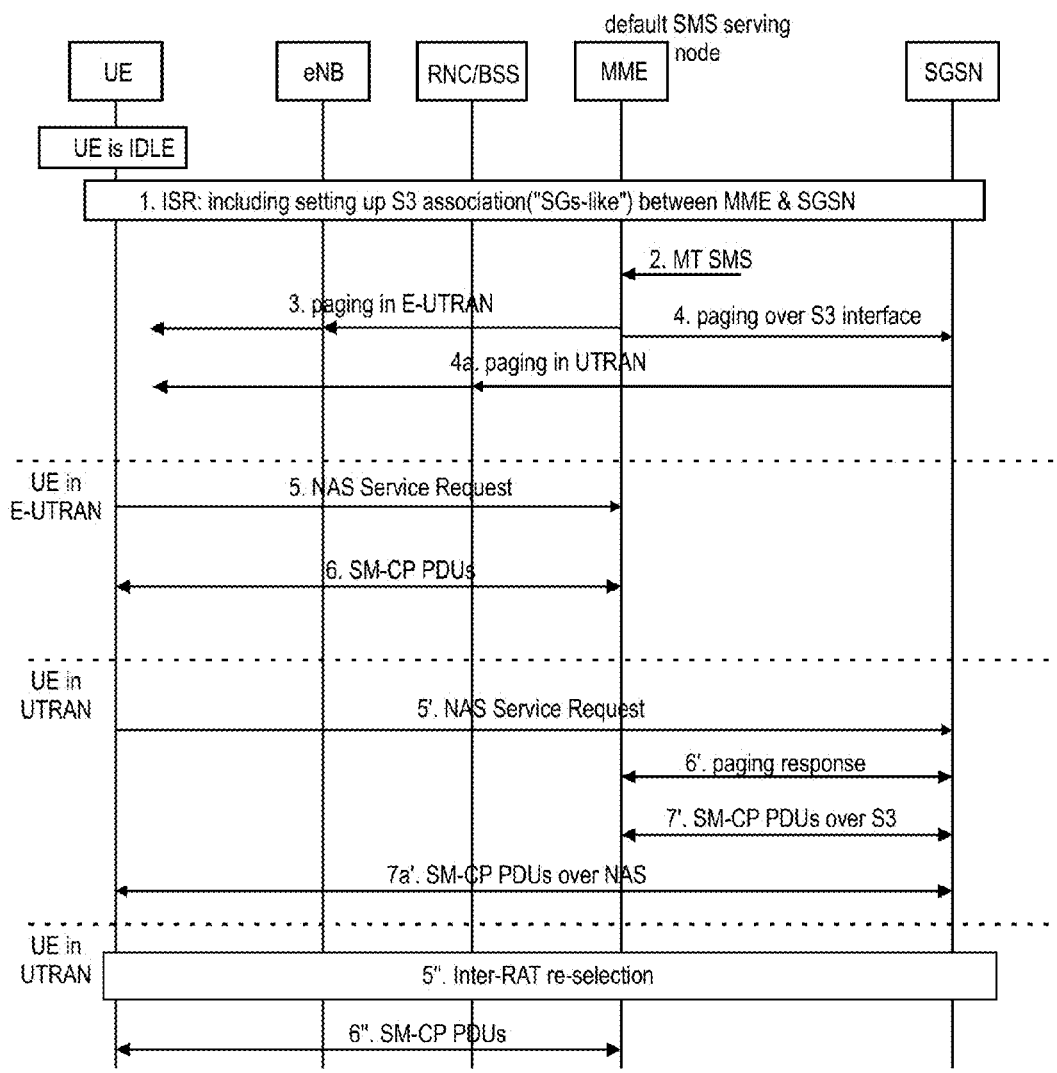
FIG. 35 shows a message exchange according to one embodiment of the invention, where an improved paging and attach mechanism is depicted.
Figure 36:
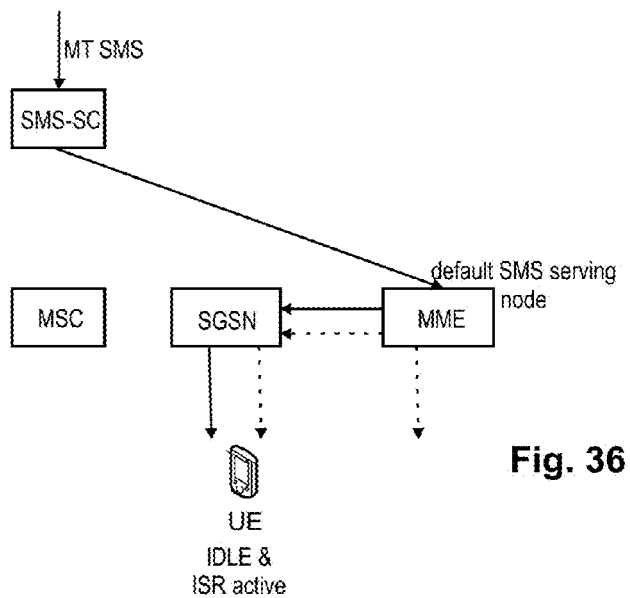
FIG. 36 illustrates the SMS delivery route according to one embodiment of the invention as explained in connection with FIG. 35.

FIG. 35 basically corresponds to FIG. 33, however the MME is configured as default SMS serving node. Step 1) of FIG. 35 is the same as Step 1) of FIG. 33. The remaining steps of FIG. 35 are also self-explanatory in view of the detailed description for FIG. 33.

In step 2) the MT SMS is received by the MME from the SMS-SC which got the information on the MME being the default SMS serving node from the HSS/HLR. Correspondingly, in response to the MT SMS the MME starts paging in its own network (see step 3) and also in the other network, i.e. UTRAN of SGSN (see steps 4, 4a). The paging message sent from the MME to the SGSN indicates the SMS transmission over the PS domain. Thus, the SGSN sends a paging message in GERAN/UTRAN with the PS domain indicator and paging case set to "Terminating Signalling".

In case the UE is camping in E-UTRAN under the default SMS serving node, the UE sends the NAS Service Request message to the MME (see Step 5), and the MME can thus eventually deliver the SM-CP PDUs to the UE.

In case the UE is camping in UTRAN, the UE sends the NAS Service Request message to the SGSN (see Step 5'), which in turn informs the MME about the UE attaching to UTRAN (see step 6'). Due to the indication in the paging relating to PS domain and possible SMS-only indication (or a kind of "signalling connection" only), only the signalling connection is established in GERAN/UTRAN. The SMS can thus be forwarded as SM-CP PDUs over the S3 interface via the signalling connection from the MME to the SGSN, and from SGSN encapsulated in a transparent NAS GMM container to the UE (see steps 7', 7a').

The inter-RAT re-selection may be alternatively performed as already explained for step 5' of FIG. 33.

The "SMS-over-SGs" is a prior-art mechanism for SMS transmission (see FIG. 25). If the UE is configured to use SMS-over-SGs, the UE always includes a special indication "combined EPS/IMSI attach capability" in the RAU/LAU request message to the SGSN/MSC from the GERAN/UTRAN access. If the UE performs combined RAU/LAU procedure with the SGSN, the SGSN checks whether the "combined EPS/IMSI attach capability" is set. If the "combined EPS/IMSI attach capability" is set, the SGSN deactivates the ISR (if the ISR had been previously activated) or does not activate the ISR by not indicating ISR in the RAU Accept message. With other words, according to the prior-art in TS 23.272 section 5.5, the ISR is not activated if the UE is configured to use SMS-over-SGs for SMS transmission.

The following discusses whether and how the ISR can be activated in cases of "SMS in MME" or "SMS over Gd interface" (see FIGS. 26 and 27).

When "SMS over Gd interface" is used for SMS transmission, the UE is PS and SMS-only attached to the SGSN. With other words, the UE is combined CS/PS attached; however, the CS service is the SMS service only. If the ISR is activated, the SGSN should establish an association with the MME. Particularly in the case when MT SMS arrives at the SGSN, the SGSN should forward the paging message to the MME. The MME should then page the UE in the same way as in the case of "SMS-over-SGs" mechanism, and the UE performs the Service Request procedure with the MME. SGSN forwards the SMS PDUs to the MME, and the MME forwards the SMS PDUs over NAS to the UE.

Thus, the decision in the network (SGSN, HSS, MME) whether to activate the ISR is based on the UE's capability to support "SMS over NAS" in the EMM signalling with the MME. Therefore, besides usual UE's capability indication of "SMS-only" to the SGSN during combined Attach/RAU procedures (GMM procedures), the UE may also indicate to the SGSN in the NAS GMM signaling whether the UE is capable of EMM "SMS over NAS". This new indication to the SGSN can be taken into account by the network to decide whether to activate the ISR. Please note that the NAS GMM indication "SMS-only" to the SGSN and the indication "SMS over NAS" EMM capability are independent indications.

When "SMS in MME" is used for SMS transmission, the UE is combined PS/CS (also called EPS/IMSI) attached with the MME. If the ISR is activated, the MME should establish an association with the SGSN. When MT SMS arrives at the MME, the MME should forward the paging message to the SGSN. The SGSN should then page the UE in the UTRAN/GERAN access; two options are possible in said respect:

1) the SMS PDUs are transmitted between UE and SGSN over NAS MM signalling (e.g. transparent NAS GMM container) or 2) after performing the Service Request procedure with the SGSN, the UE is instructed to hand over to MME in order to receive the SMS according to the "SMS in MME" mechanism.

Please note that the transmission of SMS PDUs over the transparent NAS GMM container is a new function which is not available currently in the standard. Further, in order to decide in the network (mainly MME, HSS and SGSN) whether to activate the ISR in this case, the network should take into account whether the UE supports "SMS over NAS" in the GMM signalling. For that purpose it may be needed that the UE indicates to the MME in the NAS EMM signalling that the NAS GMM signalling is capable of "SMS over NAS". Please note that the NAS EMM indication "SMS-only" to the MME during Attach/TAU procedure and the indication "SMS over NAS" GMM capability are independent indications.

To summarize, in order to decide whether to activate the ISR when the native SMS transmission over SGSN (SMS over Gd interface) and MME (SMS in MME) are configured, it is important that the network knows the capability correspondingly of GMM and EMM signalling to carry SMS PDUs over the NAS signalling. These UE indications to the SGSN/MME can be carried e.g. in the UE Network Capability IE (mostly for LTE access related core network parameters) and the MS Network Capability IE (mostly for UTRAN/GERAN access related core network parameters). The UE Network Capability IE and MS Network Capability IE are usually inserted in the Attach request and non-periodic TAU/RAU request messages. For example, the indication of EMM capabilities ("SMS over NAS") in the GMM signalling to the SGSN and correspondingly the indication of GMM capabilities ("SMS over NAS") in the EMM signalling to the MME are considered as a new function in both UE and SGSN/MME, i.e. not yet defined in the standard. These new indications can be also taken into consideration when determining how to forward SMS (SMS PDUs) between the different serving CN nodes (e.g. default SMS serving node and current registered serving node). Therefore, these new functions are needed in order to take decision about 1) the ISR mode activation and 2) the forwarding of SMS between the different serving CN nodes.

The explanations given in the Technical Background section above are intended to better understand the specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A user equipment comprising:
a receiver, which, in operation, receives a trigger message from a connectivity-related network entity to establish connectivity with a mobile communication network via a control plane only and not via a user plane, and
circuitry, which is coupled to the receiver and which, in response to the triggering message, establishes control plane connectivity with the connectivity-related network entity,
wherein, the circuitry starts a timer when initiating the establishment of the control plane connectivity and stops the timer when at least one of a plurality of defined conditions is met.

2. The user equipment according to claim 1, wherein the plurality of defined conditions include at least one of:
a) receipt of a security protected Non-Access Stratum (NAS) message;
b) establishment of a bearer for the user plane; and
c) release of a Radio Resource Control (RRC) connection.

3. The user equipment according to claim 1, comprising:
a transmitter, which is coupled to the circuitry and which, in operation, sends a Non-Access Stratum (NAS) service request to the connectivity-related network entity to establish the connectivity with the mobile communication network.

4. The user equipment according to claim 1, wherein the connectivity-related network entity is a Mobility Management Entity (MME).

5. The user equipment according to claim 1, wherein the timer is a control-plane establishment timer or a radio resource release timer.

6. The user equipment according to claim 1, wherein the timer is T3417 timer defined in 3rd Generation Partnership Project (3GPP) standards.

7. The user equipment according to claim 1, wherein the receiver, in operation, receives downlink small data from a base station in the mobile communication network, using a Radio Resource Control (RRC) message.

8. A method performed by a user equipment, the method comprising:
receiving a trigger message from a connectivity-related network entity to establish connectivity with a mobile communication network via a control plane only and not via a user plane,
establishing control plane connectivity with the connectivity-related network entity, in response to the triggering message,
starting a timer when initiating the establishment of the control plane connectivity, and
stopping the timer when at least one of a plurality of defined conditions is met.

9. The method according to claim 8, wherein the plurality of defined conditions include at least one of:
a) receipt of a security protected Non-Access Stratum (NAS) message;
b) establishment of a bearer for the user plane; and
c) release of a Radio Resource Control (RRC) connection.

10. The method of claim 8, comprising:
sending a Non-Access Stratum (NAS) service request to the connectivity-related network entity to establish the connectivity with the mobile communication network.

11. The method of claim 8, wherein the connectivity-related network entity is a Mobility Management Entity (MME).

12. The method of claim 8, wherein the timer is a control-plane establishment timer or a radio resource release timer.

13. The method of claim 8, wherein the timer is T3417 timer defined in 3rd Generation Partnership Project (3GPP) standards.

14. The method of claim 8, comprising:
receiving downlink small data from a base station in the mobile communication network, using a Radio Resource Control (RRC) message.

* * * * *